(12) United States Patent
Edwin et al.

(10) Patent No.: US 11,454,495 B2
(45) Date of Patent: Sep. 27, 2022

(54) DYNAMIC DISPLAY CALIBRATION BASED ON EYE-TRACKING

(71) Applicant: Magic Leap, Inc., Plantation, FL (US)

(72) Inventors: Lionel E. Edwin, Hollywood, FL (US); Ivan L. Yeoh, Fort Lauderdale, FL (US); Samuel A. Miller, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/744,108

(22) Filed: Jan. 15, 2020

(65) Prior Publication Data

US 2020/0225024 A1 Jul. 16, 2020

Related U.S. Application Data

(63) Continuation of application No. 16/286,049, filed on Feb. 26, 2019, now Pat. No. 10,571,251, which is a
(Continued)

(51) Int. Cl.
*G01B 11/14* (2006.01)
*G01B 11/22* (2006.01)
(Continued)

(52) U.S. Cl.
CPC .............. *G01B 11/14* (2013.01); *G01B 11/22* (2013.01); *G02B 27/01* (2013.01); *G02B 27/017* (2013.01);
(Continued)

(58) Field of Classification Search
CPC ...... G06F 3/013; G06F 2203/011; G06T 3/20; G06T 3/40; G06T 3/60; G06T 15/20;
(Continued)

(56) References Cited

U.S. PATENT DOCUMENTS 5,594,563 A 1/1997 Larson
6,011,581 A 1/2000 Swift et al.
(Continued)

FOREIGN PATENT DOCUMENTS

CN 104155819 11/2014
CN 104641635 5/2015
(Continued)

OTHER PUBLICATIONS

International Search Report and Written Opinion for PCT Application No. PCT/US16/60158, dated Jan. 23, 2017.
(Continued)

*Primary Examiner* — Jacinta M Crawford
(74) *Attorney, Agent, or Firm* — Knobbe, Martens, Olson & Bear, LLP

(57) ABSTRACT

Examples of a light field metrology system for use with a display are disclosed. The light field metrology may capture images of a projected light field, and determine focus depths (or lateral focus positions) for various regions of the light field using the captured images. The determined focus depths (or lateral positions) may then be compared with intended focus depths (or lateral positions), to quantify the imperfections of the display. Based on the measured imperfections, an appropriate error correction may be performed on the light field to correct for the measured imperfections. The display can be an optical display element in a head mounted display, for example, an optical display element capable of generating multiple depth planes or a light field display.

19 Claims, 35 Drawing Sheets

Related U.S. Application Data continuation of application No. 15/341,822, filed on Nov. 2, 2016, now Pat. No. 10,260,864.

(60) Provisional application No. 62/250,925, filed on Nov. 4, 2015, provisional application No. 62/278,779, filed on Jan. 14, 2016, provisional application No. 62/250,934, filed on Nov. 4, 2015, provisional application No. 62/278,824, filed on Jan. 14, 2016, provisional application No. 62/278,794, filed on Jan. 14, 2016.

(51) Int. Cl.
| | |
|---|---|
| *G02B 27/01* | (2006.01) |
| *G06F 3/01* | (2006.01) |
| *G06T 15/20* | (2011.01) |
| *G06T 19/00* | (2011.01) |
| *G09G 3/00* | (2006.01) |
| *G09G 5/02* | (2006.01) |
| *H04N 13/144* | (2018.01) |
| *H04N 13/327* | (2018.01) |
| *H04N 13/344* | (2018.01) |
| *H04N 13/383* | (2018.01) |
| *H04N 13/398* | (2018.01) |
| *G09G 3/20* | (2006.01) |
| *G09G 3/34* | (2006.01) |
| *H04N 13/395* | (2018.01) |
| *G06T 3/20* | (2006.01) |
| *G06T 3/40* | (2006.01) |
| *G06T 3/60* | (2006.01) |

(52) U.S. Cl.
CPC .............. *G06F 3/013* (2013.01); *G06T 15/20* (2013.01); *G06T 19/006* (2013.01); *G09G 3/003* (2013.01); *G09G 3/006* (2013.01); *G09G 5/02* (2013.01); *H04N 13/144* (2018.05); *H04N 13/327* (2018.05); *H04N 13/344* (2018.05); *H04N 13/383* (2018.05); *H04N 13/398* (2018.05); *G02B 2027/011* (2013.01); *G02B 2027/0178* (2013.01); *G06F 2203/011* (2013.01); *G06T 3/20* (2013.01); *G06T 3/40* (2013.01); *G06T 3/60* (2013.01); *G06T 2207/10012* (2013.01); *G06T 2207/10052* (2013.01); *G09G 3/2092* (2013.01); *G09G 3/3406* (2013.01); *G09G 2320/028* (2013.01); *G09G 2320/029* (2013.01); *G09G 2320/0233* (2013.01); *G09G 2320/0242* (2013.01); *G09G 2320/0276* (2013.01); *G09G 2320/0626* (2013.01); *G09G 2320/0666* (2013.01); *G09G 2320/0673* (2013.01); *G09G 2320/0693* (2013.01); *G09G 2340/0464* (2013.01); *G09G 2360/16* (2013.01); *H04N 13/395* (2018.05)

(58) Field of Classification Search
CPC ......... G06T 19/006; G06T 2207/10012; G06T 2207/10052; G01B 11/14; G01B 11/22; G01B 27/01; G01B 27/017; G01B 2027/011; G01B 2027/0178; G01B 2203/011; H04N 13/327; H04N 13/383; H04N 13/244; H04N 13/144; H04N 13/398; H04N 13/395; G09G 3/003; G09G 3/006; G09G 3/2092; G09G 3/3406; G09G 5/02; G09G 2320/0233; G09G 2320/0242; G09G 2320/0276; G09G 2320/028; G09G 2320/029; G09G 2320/0626; G09G 2320/0666; G09G 2320/0673; G09G 2320/0693; G09G 2320/0464; G09G 2360/16
USPC ........................................ 345/7, 8, 419, 589
See application file for complete search history.

(56) References Cited

U.S. PATENT DOCUMENTS

| | | |
|---|---|---|
| 6,816,625 B2 | 11/2004 | Lewis, Jr. et al. |
| 6,850,221 B1 | 2/2005 | Tickle |
| D514,570 S | 2/2006 | Ohta |
| 8,922,636 B1 | 12/2014 | Belden et al. |
| 8,950,867 B2 | 2/2015 | Macnamara |
| 9,081,426 B2 | 7/2015 | Armstrong |
| 9,215,293 B2 | 12/2015 | Miller |
| D752,529 S | 3/2016 | Loretan et al. |
| 9,310,559 B2 | 4/2016 | Macnamara |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski |
| 10,260,864 B2 | 4/2019 | Edwin et al. |
| 10,378,882 B2 | 8/2019 | Yeoh et al. |
| 10,571,251 B2 | 2/2020 | Edwin et al. |
| 11,226,193 B2 | 1/2022 | Yeoh et al. |
| 2002/0063807 A1 | 5/2002 | Margulis |
| 2006/0028436 A1 | 2/2006 | Armstrong |
| 2006/0072206 A1 | 4/2006 | Tsuyuki et al. |
| 2006/0077558 A1 | 4/2006 | Urakawa et al. |
| 2007/0081123 A1 | 4/2007 | Lewis |
| 2008/0144174 A1 | 6/2008 | Lucente et al. |
| 2008/0198240 A1 | 8/2008 | Duncan et al. |
| 2009/0028423 A1 | 1/2009 | Sandstrom et al. |
| 2010/0214310 A1 | 8/2010 | Kuwahara et al. |
| 2011/0261169 A1* | 10/2011 | Tin ....................... H04N 13/133 348/51 |
| 2012/0113223 A1 | 5/2012 | Hilliges et al. |
| 2012/0127062 A1 | 5/2012 | Bar-Zeev et al. |
| 2012/0127320 A1 | 5/2012 | Balogh |
| 2012/0162549 A1 | 6/2012 | Gao et al. |
| 2012/0182334 A1 | 7/2012 | Ranieri et al. |
| 2012/0212499 A1* | 8/2012 | Haddick ................. G06F 3/017 345/589 |
| 2013/0082922 A1 | 4/2013 | Miller |
| 2013/0083404 A1* | 4/2013 | Takagi ............... G02B 27/0172 359/633 |
| 2013/0117377 A1 | 5/2013 | Miller |
| 2013/0125027 A1 | 5/2013 | Abovitz |
| 2013/0169683 A1 | 7/2013 | Perez et al. |
| 2013/0208234 A1 | 8/2013 | Lewis |
| 2013/0242262 A1 | 9/2013 | Lewis |
| 2013/0300635 A1 | 11/2013 | White et al. |
| 2014/0002587 A1 | 1/2014 | Aguren |
| 2014/0003762 A1 | 1/2014 | Macnamara |
| 2014/0035959 A1 | 2/2014 | Lapstun |
| 2014/0071539 A1 | 3/2014 | Gao |
| 2014/0177023 A1 | 6/2014 | Gao et al. |
| 2014/0205329 A1 | 7/2014 | Inoue |
| 2014/0218468 A1 | 8/2014 | Gao et al. |
| 2014/0240842 A1* | 8/2014 | Nguyen ............... G02B 6/0076 359/630 |
| 2014/0267420 A1 | 9/2014 | Schowengerdt |
| 2014/0267771 A1 | 9/2014 | Lawler |
| 2014/0306866 A1 | 10/2014 | Miller et al. |
| 2014/0313423 A1 | 10/2014 | Johnson et al. |
| 2014/0347548 A1 | 11/2014 | Wu et al. |

(56) References Cited

U.S. PATENT DOCUMENTS

| | | |
|---|---|---|
| 2015/0016777 A1 | 1/2015 | Abovitz et al. |
| 2015/0098620 A1 | 4/2015 | Wu et al. |
| 2015/0103306 A1 | 4/2015 | Kaji et al. |
| 2015/0104101 A1 | 4/2015 | Bryant et al. |
| 2015/0168731 A1 | 6/2015 | Robbins |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0241959 A1 | 8/2015 | Abovitz et al. |
| 2015/0264299 A1 | 9/2015 | Leech et al. |
| 2015/0268415 A1 | 9/2015 | Schowengerdt et al. |
| 2015/0296203 A1 | 10/2015 | Lucente et al. |
| 2015/0302652 A1 | 10/2015 | Miller et al. |
| 2015/0309263 A2 | 10/2015 | Abovitz et al. |
| 2015/0309316 A1 | 10/2015 | Osterhout et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0029883 A1 | 2/2016 | Cox |
| 2016/0035305 A1 | 2/2016 | Jin et al. |
| 2016/0085301 A1 | 3/2016 | Lopez |
| 2016/0131902 A1 | 5/2016 | Ambrus et al. |
| 2016/0370605 A1 | 12/2016 | Ain-Kedem |
| 2017/0122725 A1 | 5/2017 | Yeoh et al. |
| 2017/0124928 A1 | 5/2017 | Edwin et al. |
| 2019/0323825 A1 | 10/2019 | Yeoh |
| 2021/0148697 A1 | 5/2021 | Yeoh |

FOREIGN PATENT DOCUMENTS

| | | |
|---|---|---|
| CN | 104641635 A | 5/2015 |
| EP | 0 579 224 | 11/1998 |
| EP | 3 026 484 | 6/2016 |
| JP | 05-161166 A | 6/1993 |
| JP | 06-038032 | 2/1994 |
| JP | 06-38032 A | 2/1994 |
| JP | H10-501388 A | 2/1998 |
| JP | H10-501388 A | 2/1998 |
| JP | 11-203986 A | 7/1999 |
| JP | 2005-101828 | 4/2005 |
| JP | 2005-101828 A | 4/2005 |
| JP | 2006-105889 A | 4/2006 |
| JP | 2006-108868 A | 4/2006 |
| JP | 2006-153914 A | 6/2006 |
| JP | 2010-199659 | 9/2010 |
| JP | 2010-199659 A | 9/2010 |
| JP | 2010-271565 | 12/2010 |
| JP | 3180075 U | 11/2012 |
| JP | 2013-240057 | 11/2013 |
| JP | 2013-240057 A | 11/2013 |
| JP | 2014-142383 A | 8/2014 |
| JP | 2015-099238 A | 5/2015 |
| TW | 201445997 | 12/2014 |
| WO | WO 1995/33343 | 12/1995 |
| WO | WO 2011/012913 | 2/2011 |
| WO | WO 2014/155133 | 10/2014 |
| WO | WO 2015/012024 | 1/2015 |
| WO | WO 2017/079329 | 5/2017 |
| WO | WO 2017/079333 | 5/2017 |

OTHER PUBLICATIONS

International Preliminary Report on Patentability for PCT Application No. PCT/US16/60158, dated May 8, 2018.
Wikipedia: "Light-field camera," Wikipedia, printed Sep. 17, 2015, in 5 pages. URL: https://en.wikipedia.org/wiki/Light-field_camera.
European Extended Search Report, re EP Application No. 16862899.8, dated Apr. 3, 2019.
Pogalin, et al., "Gaze Tracking by Using Factorized Likelihoods Particle Filtering and Stereo Vision," 3D Data Processing, Visualiztion, and Transmission, Third International AL Symposium ON, IEEE, PI, pp. 57-64, Jun. 1, 2006.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC—Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

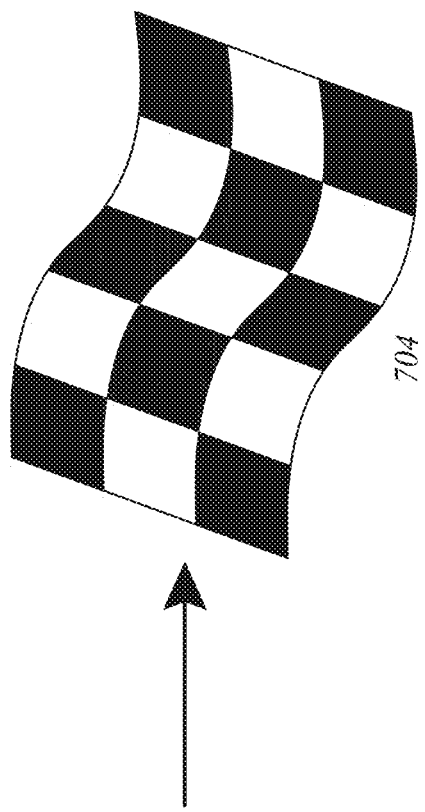
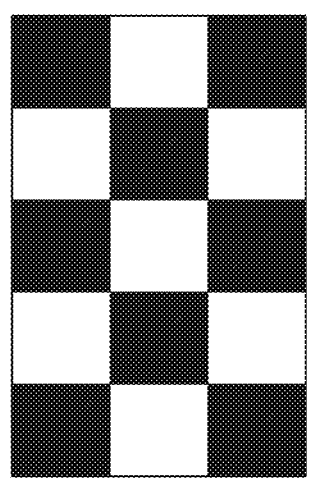
FIG. 7

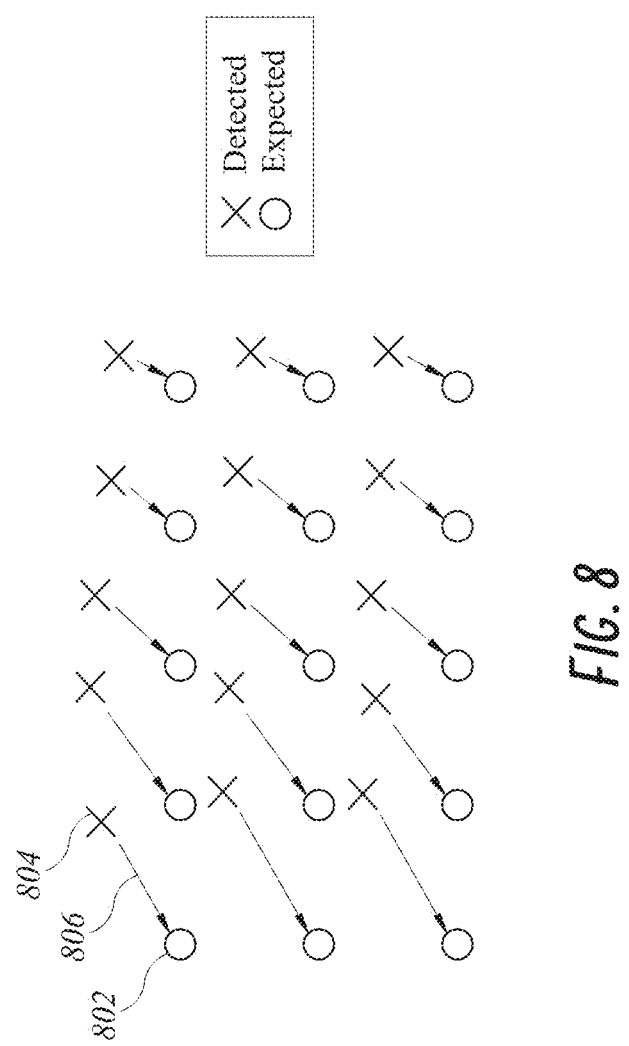

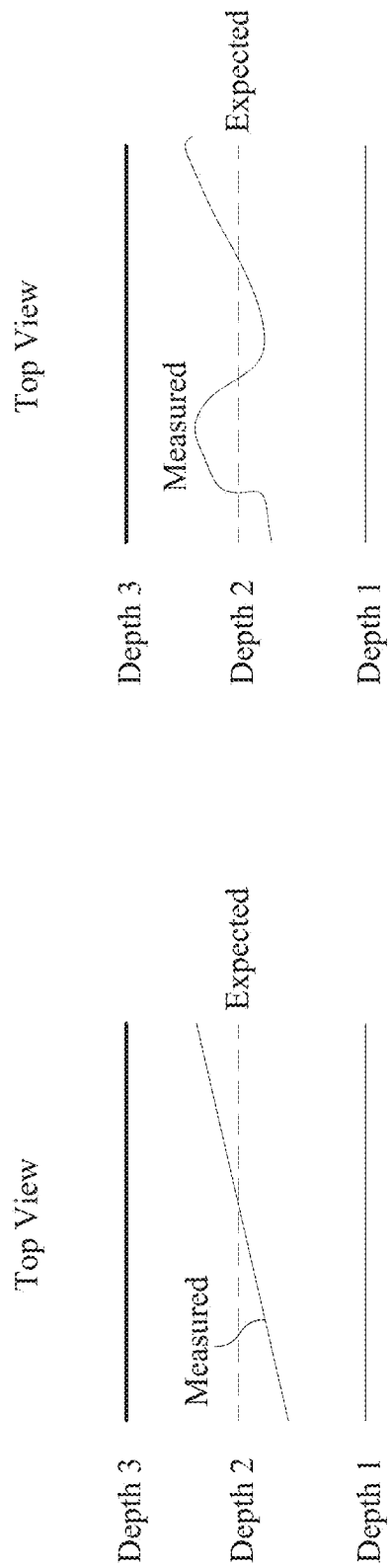

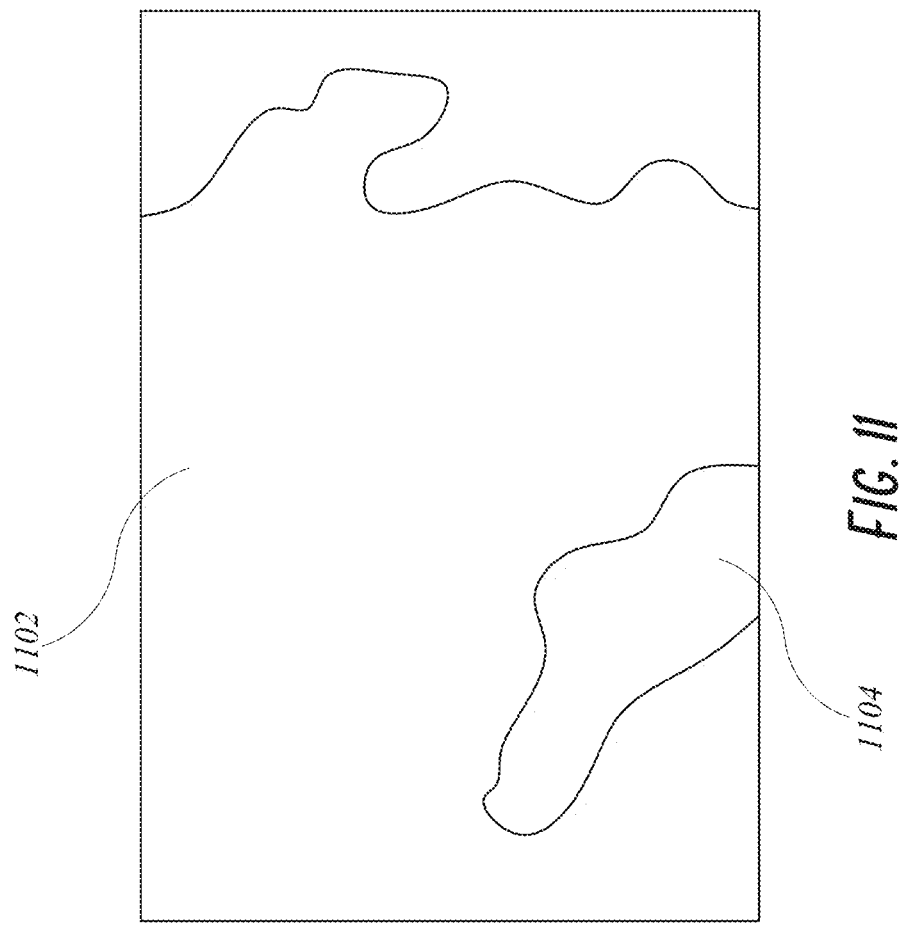

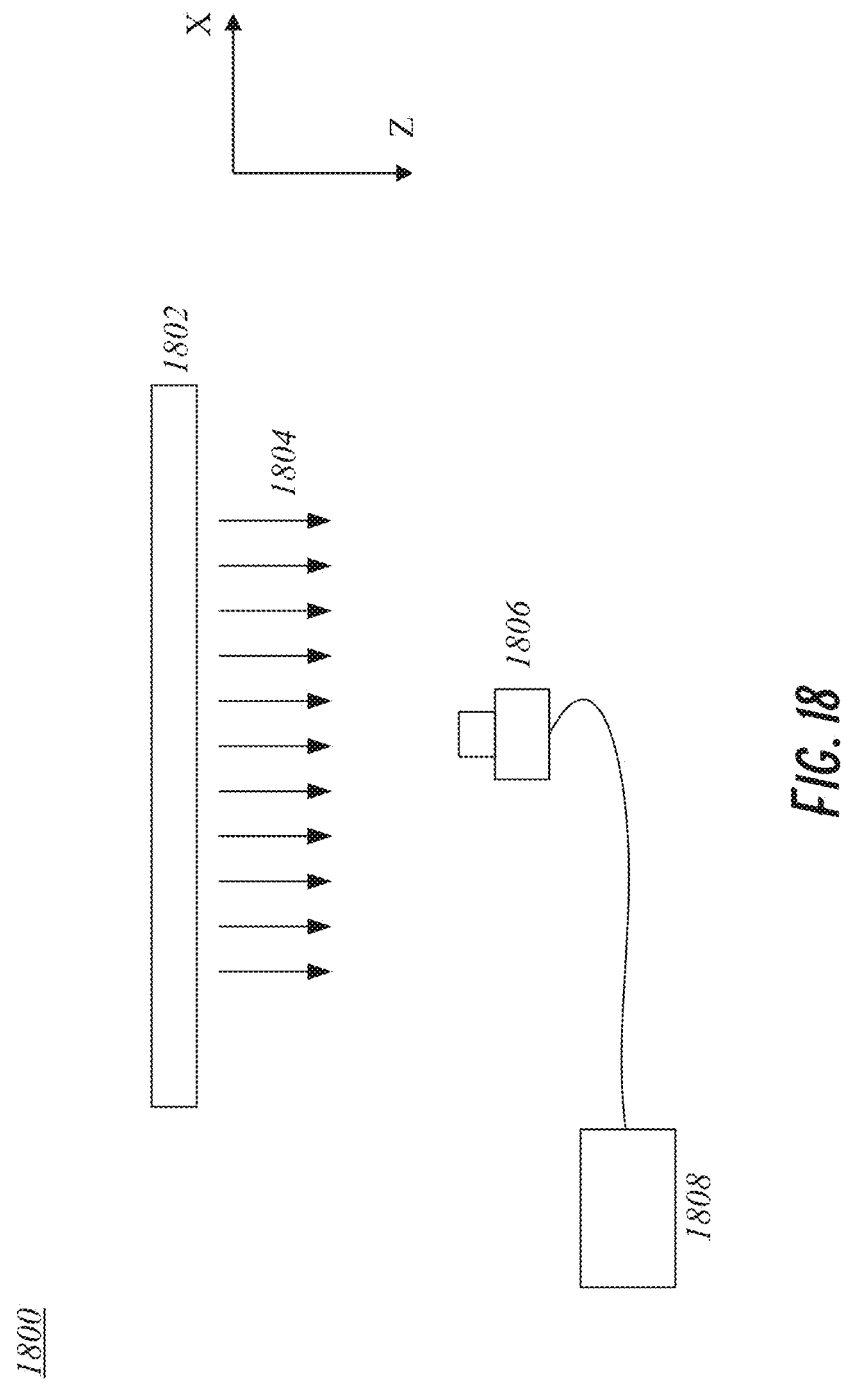

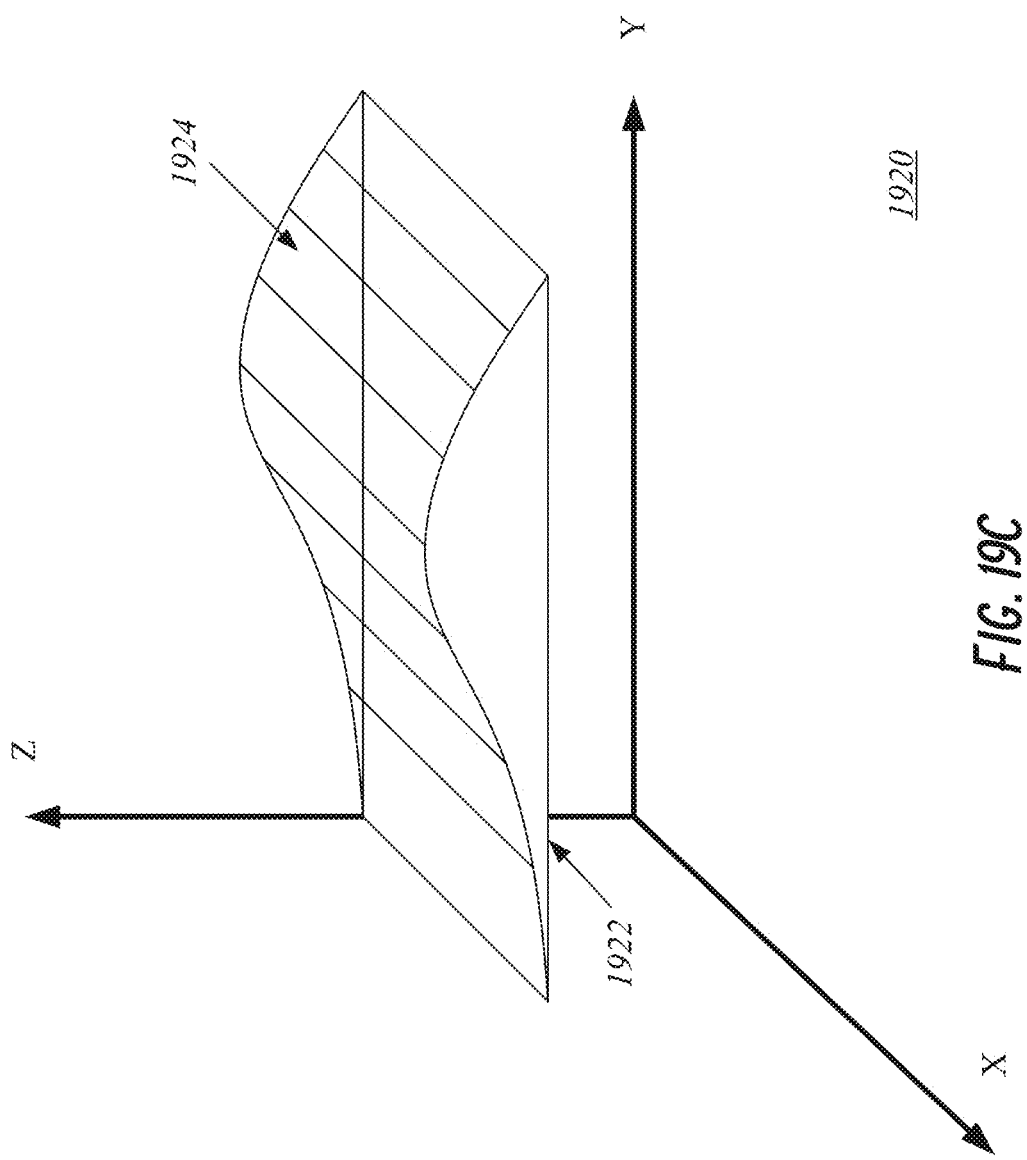

DYNAMIC DISPLAY CALIBRATION BASED ON EYE-TRACKING

CROSS-REFERENCE TO RELATED APPLICATIONS

This application is a continuation of U.S. patent application Ser. No. 16/286,049, filed Feb. 26, 2019, titled DYNAMIC DISPLAY CALIBRATION BASED ON EYE-TRACKING, which is a continuation of U.S. patent application Ser. No. 15/341,822, filed Nov. 2, 2016, titled DYNAMIC DISPLAY CALIBRATION BASED ON EYE-TRACKING, which claims the benefit of priority to U.S. Application No. 62/250,925, filed Nov. 4, 2015, titled LIGHT FIELD DISPLAY METROLOGY, U.S. Application No. 62/278,779, filed Jan. 14, 2016, titled LIGHT FIELD ERROR CORRECTION, U.S. Application No. 62/250,934, filed Nov. 4, 2015, titled AUTOMATED CALIBRATION IMAGE PROJECTION AND CAPTURE FOR DISPLAY CALIBRATION, U.S. Application No. 62/278,824, filed Jan. 14, 2016, titled DYNAMIC CALIBRATION OF A DISPLAY BASED ON EYE-TRACKING, and U.S. Application No. 62/278,794, filed Jan. 14, 2016, titled CHROMATIC BALANCING A DISPLAY HAVING VARYING CHROMATICITY ACROSS A FIELD OF VIEW; all of which are hereby incorporated by reference herein in their entireties.

FIELD

The present disclosure relates to virtual reality and augmented reality imaging and visualization systems and more particularly to metrology systems for measuring and calibrating optical properties of imaging and visualization systems. The present disclosure also relates to dynamic calibration of virtual reality and augmented reality imaging and visualization systems based on eye-tracking.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; or a mixed reality "MR," relating to merging real and virtual worlds to produce new environment where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

SUMMARY

An embodiment of an imaging system comprises a projection device for projecting an image toward an eye of a viewer, the image comprising a light field representing light from a virtual objects, wherein the virtual object is configured to be projected as if located at one or more intended focus depths, and a light field metrology device for measuring imperfections in the light field. The light field metrology device may be configured to capture one or more images corresponding to a portion of the light field, analyze the one or more captured images to identify one or more perceived focuses depths corresponding to depths at which the portion of the light field is in focus, create a depth map based at least in part upon the identified focus depths, and compare the created depth map with the one or more intended focus depths. The system can generate a calibration for spatial and/or chromatic imperfections that can be used to dynamically calibrate a wearable display system.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 7 illustrates example distortions that can occur when projecting a calibration pattern.

FIG. 8 illustrates another example vector field that may be generated to visualize distortion between displayed imaged locations and expected image locations.

FIG. 10A illustrates an example of a plurality of depth planes, intended to be viewed at different depths.

FIGS. 10B-10E illustrate example out-of-plane spatial errors that may occur when viewing the projected depth planes.

FIG. 11 illustrates a captured image of a projected test image.

FIG. 18 schematically illustrates an example of a light field metrology system for measuring focus depths of a projected light field, in accordance with some embodiments.

FIGS. 19B and 19C illustrate examples of a depth graph and a depth map.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

In order for a three-dimensional (3D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR and AR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

3D Display

Figure 1:
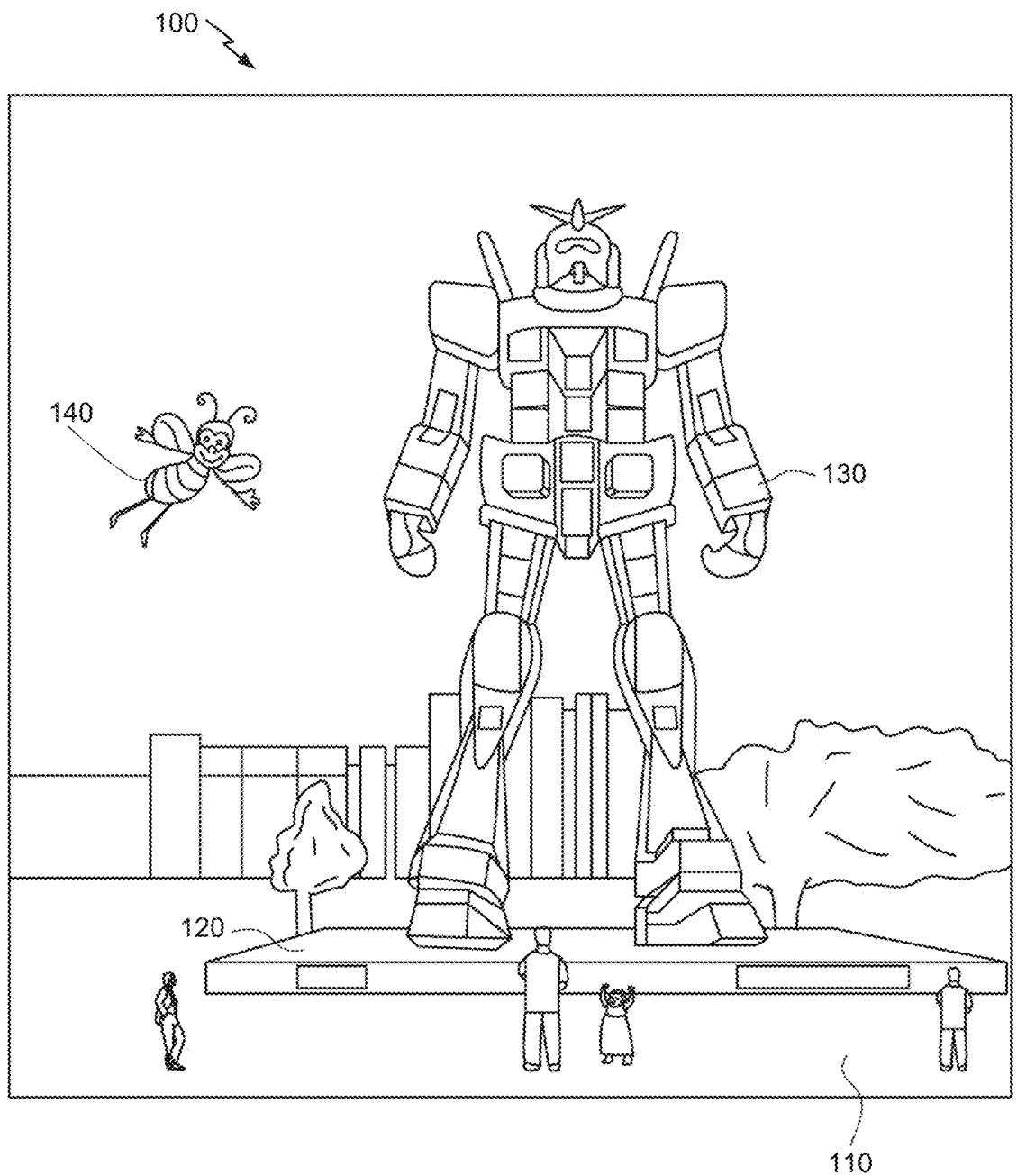
FIG. 1 depicts an illustration of an augmented reality scenario with certain virtual reality objects, and certain actual reality objects viewed by a person.

FIG. 1 depicts an illustration of an augmented reality scenario with certain virtual reality objects, and certain actual reality objects viewed by a person. FIG. 1 depicts an augmented reality scene 100, wherein a user of an AR technology sees a real-world park-like setting 110 featuring people, trees, buildings in the background, and a concrete platform 120. In addition to these items, the user of the AR technology also perceives that he "sees" a robot statue 130 standing upon the real-world platform 120, and a cartoon-like avatar character 140 flying by which seems to be a personification of a bumble bee, even though these elements do not exist in the real world.

In order for a three-dimensional (3-D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Figure 2:
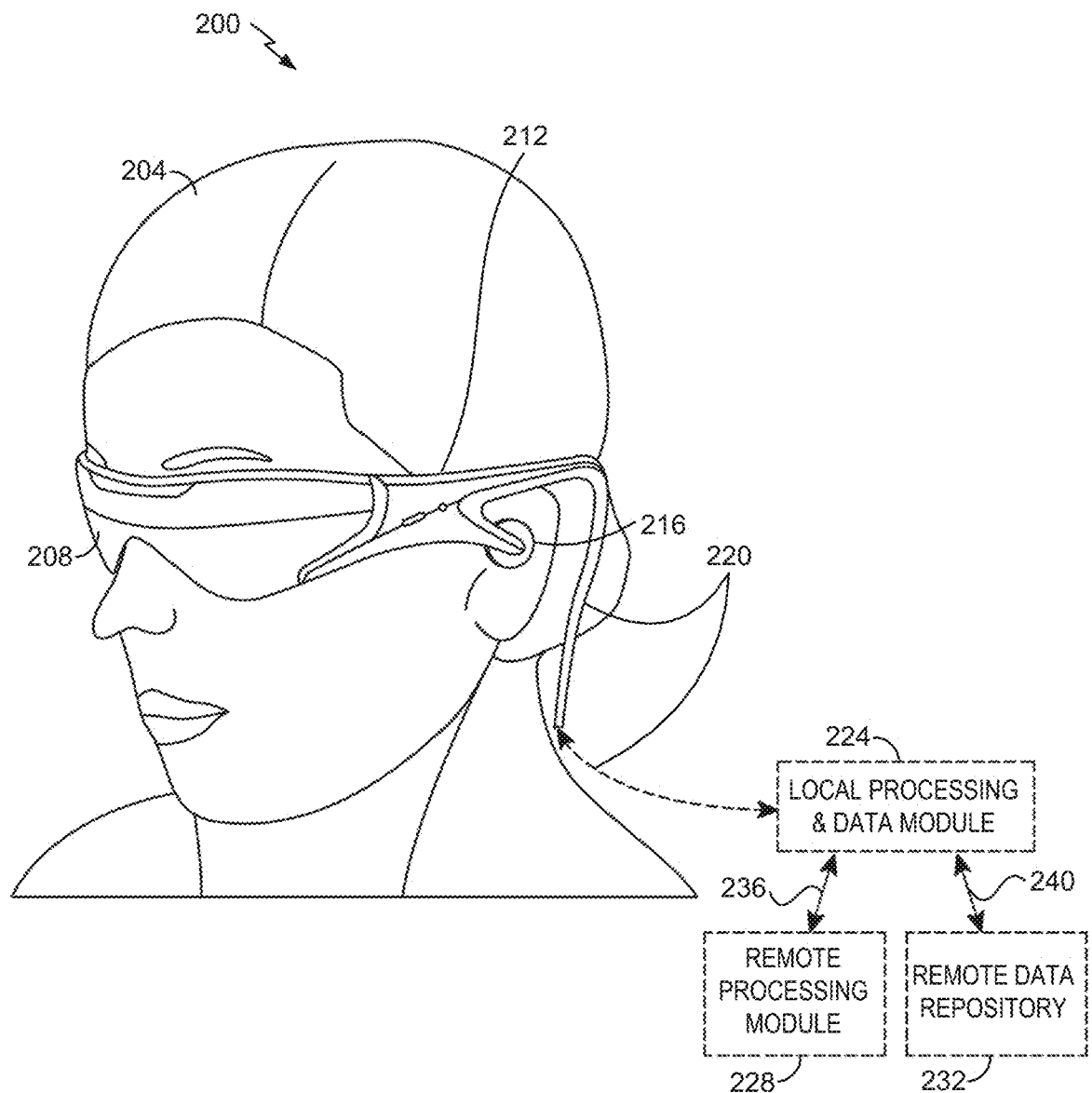
FIG. 2 schematically illustrates an example of a wearable display system.

FIG. 2 illustrates an example of wearable display system 200 that can be used to present a VR, AR, or MR experience to a display system wearer or viewer 204. The display system 200 includes a display 208, and various mechanical and electronic modules and systems to support the functioning of display 208. The display 208 may be coupled to a frame 212, which is wearable by a display system user, wearer, or viewer 204 and which is configured to position the display 208 in front of the eyes of the wearer 204. The display 208 may be a light field display. In some embodiments, a speaker 216 is coupled to the frame 212 and positioned adjacent the ear canal of the user (in some embodiments, another speaker, not shown, is positioned adjacent the other ear canal of the user to provide for stereo/shapeable sound control). The display 208 is operatively coupled 220, such as by a wired lead or wireless connectivity, to a local data processing module 224 which may be mounted in a variety of configurations, such as fixedly attached to the frame 212, fixedly attached to a helmet or hat worn by the user, embedded in headphones, or otherwise removably attached to the user 204 (e.g., in a backpack-style configuration, in a belt-coupling style configuration).

The local processing and data module 224 may comprise a hardware processor, as well as non-transitory digital memory, such as non-volatile memory (e.g., flash memory), both of which may be utilized to assist in the processing, caching, and storage of data. The data may include data (a) captured from sensors (which may be, e.g., operatively coupled to the frame 212 or otherwise attached to the user 204), such as image capture devices (such as cameras), microphones, inertial measurement units, accelerometers, compasses, GPS units, radio devices, and/or gyros; and/or (b) acquired and/or processed using remote processing module 228 and/or remote data repository 232, possibly for passage to the display 208 after such processing or retrieval. The local processing and data module 224 may be operatively coupled to the remote processing module 228 and remote data repository 232 by communication links 236 and/or 240, such as via wired or wireless communication links, such that these remote modules 228, 232 are available as resources to the local processing and data module 224. In addition, remote processing module 228 and remote data repository 232 may be operatively coupled to each other.

In some embodiments, the remote processing module 228 may comprise one or more processors configured to analyze and process data and/or image information such as video information captured by an image capture device. The video data may be stored locally in the local processing and data module 224 and/or in the remote data repository 232. In some embodiments, the remote data repository 232 may comprise a digital data storage facility, which may be available through the internet or other networking configuration in a "cloud" resource configuration. In some embodiments, all data is stored and all computations are performed in the local processing and data module 224, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 3:
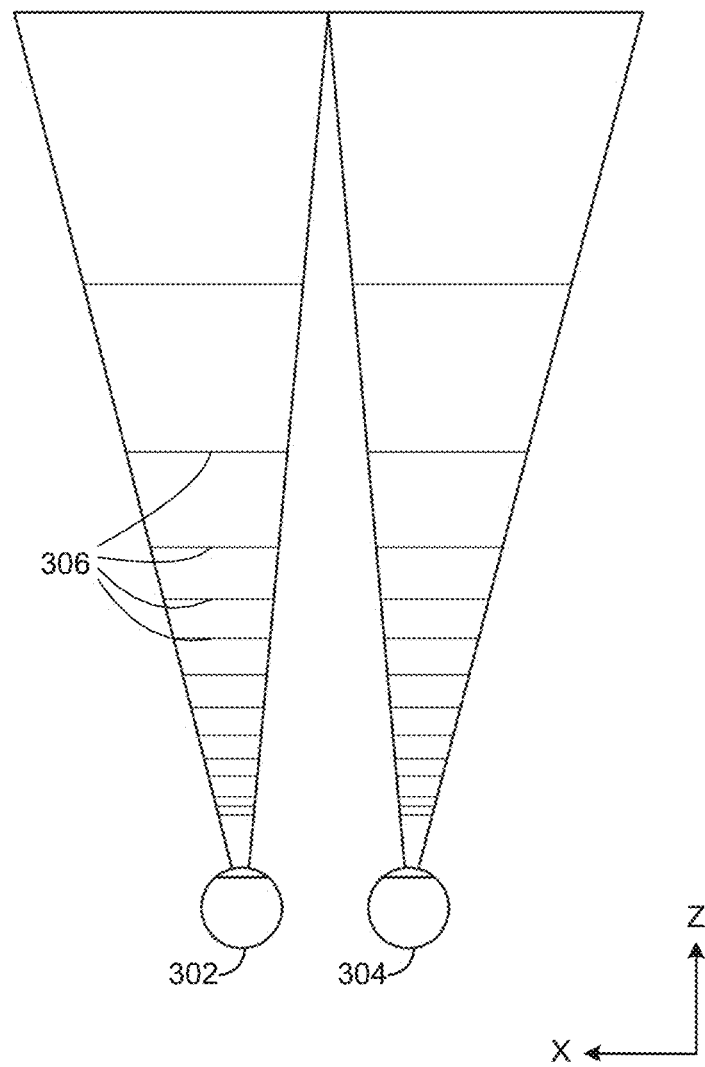
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
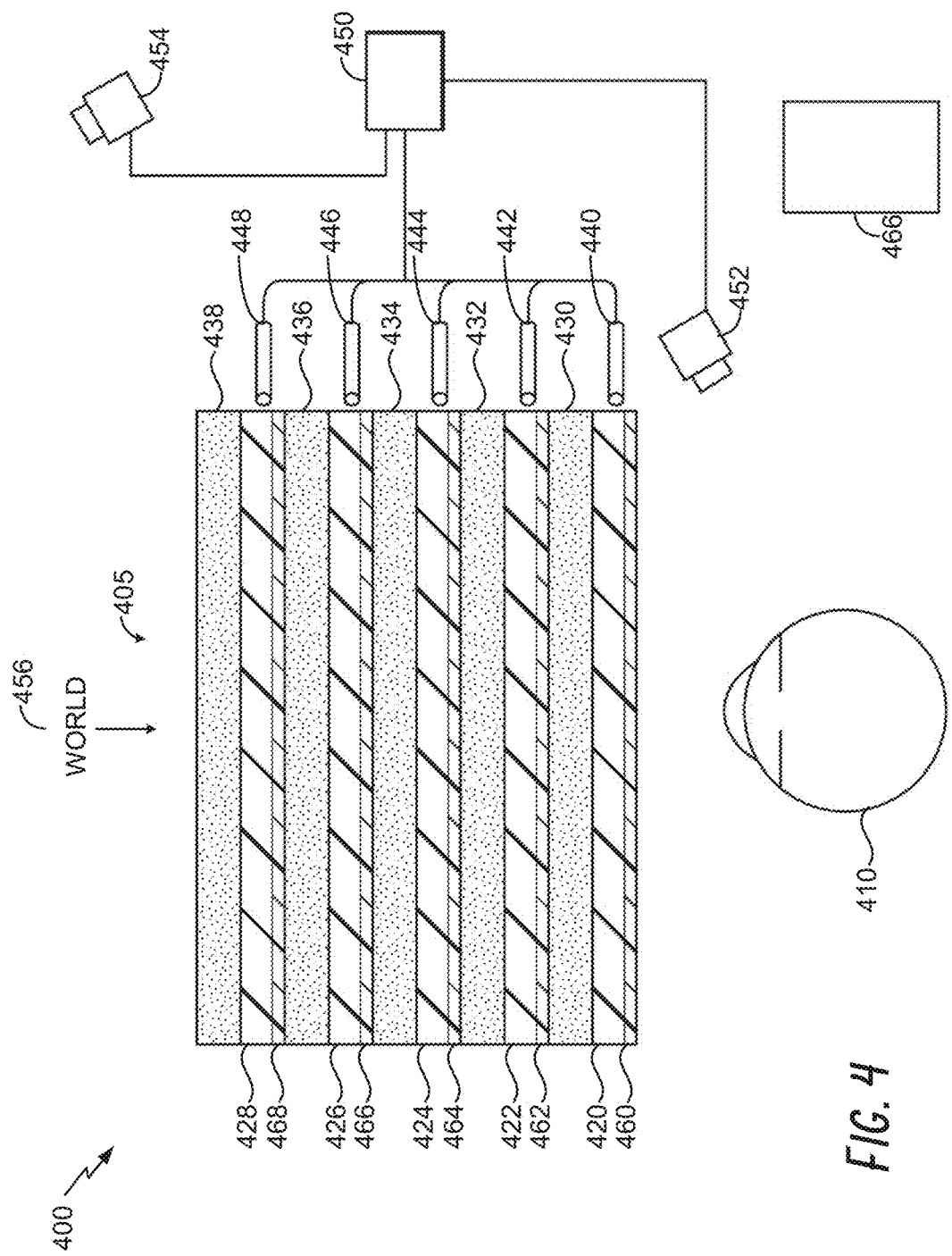
FIG. 4 schematically illustrates an example of a waveguide stack for outputting image information to a user.

FIG. 4 illustrates an example of a waveguide stack for outputting image information to a user. A display system 400 includes a stack of waveguides, or stacked waveguide assembly 405 that may be utilized to provide three-dimensional perception to the eye 410 or brain using a plurality of waveguides 420, 422, 424, 426, 428. In some embodiments, the display system 400 may correspond to system 200 of FIG. 2, with FIG. 4 schematically showing some parts of that system 200 in greater detail. For example, in some embodiments, the waveguide assembly 405 may be integrated into the display 208 of FIG. 2.

With continued reference to FIG. 4, the waveguide assembly 405 may also include a plurality of features 430, 432, 434, 436 between the waveguides. In some embodiments, the features 430, 432, 434, 436 may be lenses. In some embodiments, the features 430, 432, 434, 436 may not be lenses. Rather, they may be spacers (e.g., cladding layers and/or structures for forming air gaps).

The waveguides 420, 422, 424, 426, 428 and/or the plurality of lenses 430, 432, 434, 436 may be configured to send image information to the eye with various levels of wavefront curvature or light ray divergence. Each waveguide level may be associated with a particular depth plane and may be configured to output image information corresponding to that depth plane. Image injection devices 440, 442, 444, 446, 448 may be utilized to inject image information into the waveguides 420, 422, 424, 426, 428, each of which may be configured to distribute incoming light across each respective waveguide, for output toward the eye 410. Light exits an output surface of the image injection devices 440, 442, 444, 446, 448 and is injected into a corresponding input edge of the waveguides 420, 422, 424, 426, 428. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 440, 442, 444, 446, 442 are discrete displays that each produce image information for injection into a corresponding waveguide 420, 422, 424, 426, 428, respectively. In some other embodiments, the image injection devices 440, 442, 446, 446, 448 are the output ends of a single multiplexed display which may, for example, pipe image information via one or more optical conduits (such as fiber optic cables) to each of the image injection devices 440, 442, 444, 446, 448.

A controller 450 controls the operation of the stacked waveguide assembly 405 and the image injection devices 440, 442, 444, 446, 448. In some embodiments, the controller 450 includes programming (e.g., instructions in a non-transitory computer-readable medium) that regulates the timing and provision of image information to the waveguides 420, 422, 424, 426, 428. In some embodiments, the controller 450 may be a single integral device, or a distributed system connected by wired or wireless communication channels. The controller 450 may be part of the processing modules 224 or 228 (illustrated in FIG. 2) in some embodiments. In some embodiments, the controller may be in communication with an inward-facing imaging system 452 (e.g., a digital camera), an outward-facing imaging system 454 (e.g., a digital camera), and/or a user input device 466. The inward-facing imaging system 452 (e.g., a digital camera) can be used to capture images of the eye 410 to, for example, determine the size and/or orientation of the pupil of the eye 410. The outward-facing imaging system 454 can be used to image a portion of the world 456. The user can input commands to the controller 450 via the user input device 466 to interact with the display system 400.

The waveguides 420, 422, 424, 426, 428 may be configured to propagate light within each respective waveguide by total internal reflection (TIR). The waveguides 420, 422, 424, 426, 428 may each be planar or have another shape (e.g., curved), with major top and bottom surfaces and edges extending between those major top and bottom surfaces. In the illustrated configuration, the waveguides 420, 422, 424, 426, 428 may each include light extracting optical elements 460, 462, 464, 466, 468 that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (460, 462, 464, 466, 468 may, for example, be reflective and/or diffractive optical features. While illustrated disposed at the bottom major surfaces of the waveguides 420, 422, 424, 426, 428 for ease of description and drawing clarity, in some embodiments, the light extracting optical elements 460, 462, 464, 466, 468 may be disposed at the top and/or bottom major surfaces, and/or may be disposed directly in the volume of the waveguides 420, 422, 424, 426, 428. In some embodiments, the light extracting optical elements 460, 462, 464, 466, 468 may be formed in a layer of material that is attached to a transparent substrate to form the waveguides 420, 422, 424, 426, 428. In some other embodiments, the waveguides 420, 422, 424, 426, 428 may be a monolithic piece of material and the light extracting optical elements 460, 462, 464, 466, 468 may be formed on a surface and/or in the interior of that piece of material.

With continued reference to FIG. 4, as discussed herein, each waveguide 420, 422, 424, 426, 428 is configured to output light to form an image corresponding to a particular depth plane. For example, the waveguide 420 nearest the eye may be configured to deliver collimated light, as injected into such waveguide 420, to the eye 410. The collimated light may be representative of the optical infinity focal plane. The next waveguide up 422 may be configured to send out collimated light which passes through the first lens 430 (e.g., a negative lens) before it can reach the eye 410. First lens 430 may be configured to create a slight convex wavefront curvature so that the eye/brain interprets light coming from that next waveguide up 422 as coming from a first focal plane closer inward toward the eye 410 from optical infinity. Similarly, the third up waveguide 424 passes its output light through both the first lens 430 and second lens 432 before reaching the eye 410. The combined optical power of the first and second lenses 430 and 432 may be configured to create another incremental amount of wavefront curvature so that the eye/brain interprets light coming from the third waveguide 424 as coming from a second focal plane that is even closer inward toward the person from optical infinity than was light from the next waveguide up 422.

The other waveguide layers (e.g., waveguides 426, 428) and lenses (e.g., lenses 434, 436) are similarly configured, with the highest waveguide 428 in the stack sending its output through all of the lenses between it and the eye for an aggregate focal power representative of the closest focal plane to the person. To compensate for the stack of lenses 430, 432, 434, 436 when viewing/interpreting light coming from the world 456 on the other side of the stacked waveguide assembly 405, a compensating lens layer 438 may be disposed at the top of the stack to compensate for the aggregate power of the lens stack 430, 432, 434, 436 below. Such a configuration provides as many perceived focal planes as there are available waveguide/lens pairings. Both the light extracting optical elements 460, 462, 464, 466, 468 of the waveguides 420, 422, 424, 426, 428 and the focusing aspects of the lenses 430, 432, 434, 436 may be static (e.g., not dynamic or electro-active). In some alternative embodiments, either or both may be dynamic using electro-active features.

With continued reference to FIG. 4, the light extracting optical elements 460, 462, 464, 466, 468 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 460, 462, 464, 466, 468 may be volumetric or surface features, which may be configured to output light at specific angles. For example, the light extracting optical elements 460, 462, 464, 466, 468 may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 430, 432, 434, 436 may not be lenses. Rather, they may simply be spacers (e.g., cladding layers and/or structures for forming air gaps).

In some embodiments, the light extracting optical elements 460, 462, 464, 466, 468 are diffractive features that form a diffraction pattern, or "diffractive optical element" (also referred to herein as a "DOE"). Preferably, the DOE's have a relatively low diffraction efficiency so that only a portion of the light of the beam is deflected away toward the eye 410 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 410 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, an inward-facing imaging system 452 (e.g., a digital camera) may be used to capture images of the eye 410 to determine the size and/or orientation of the pupil of the eye 410. In some embodiments, the inward-facing imaging system 452 may be attached to the frame 212 (as illustrated in FIG. 2) and may be in electrical communication with the processing modules 224 and/or 228, which may process image information from the inward-facing imaging system 452) to determine, e.g., the pupil diameters and/or orientations of the eyes of the user 204.

In some embodiments, the inward-facing imaging system 452 (e.g., a digital camera) can observe the movements of the user, such as the eye movements and the facial movements. The inward-facing imaging system 452 may be used to capture images of the eye 410 to determine the size and/or orientation of the pupil of the eye 410. The inward-facing imaging system 452 can be used to obtain images for use in determining the direction the user is looking (e.g., eye pose) or for biometric identification of the user (e.g., via iris identification). The images obtained by the inward-facing imaging system 452 may be analyzed to determine the user's eye pose and/or mood, which can be used by the display system 400 to decide which audio or visual content should be presented to the user. The display system 400 may also determine head pose (e.g., head position or head orientation) using sensors such as inertial measurement units (IMUs), accelerometers, gyroscopes, etc. The head's pose may be used alone or in combination with eye pose to interact with stem tracks and/or present audio content.

In some embodiments, one camera may be utilized for each eye, to separately determine the pupil size and/or orientation of each eye, thereby allowing the presentation of image information to each eye to be dynamically tailored to that eye. In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 410 (e.g., using only a single camera per pair of eyes) is determined and assumed to be similar for both eyes of the viewer 204.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 450 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The display system 400 can include an outward-facing imaging system 454 (e.g., a digital camera) that images a portion of the world 456. This portion of the world 456 may be referred to as the field of view (FOV) and the imaging system 454 is sometimes referred to as an FOV camera. The entire region available for viewing or imaging by a viewer 204 may be referred to as the field of regard (FOR). The FOR may include 4π steradians of solid angle surrounding the display system 400. In some implementations of the display system 400, the FOR may include substantially all of the solid angle around a user 204 of the display system 400, because the user 204 can move their head and eyes to look at objects surrounding the user (in front, in back, above, below, or on the sides of the user). Images obtained from the outward-facing imaging system 454 can be used to track gestures made by the user (e.g., hand or finger gestures), detect objects in the world 456 in front of the user, and so forth.

The display system 400 can include a user input device 466 by which the user can input commands to the controller 450 to interact with the display system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the display system 400 (e.g., to provide user input to a user interface provided by the display system 400). The user input device 466 may be held by the user's hand during the use of the display system 400. The user input device 466 can be in wired or wireless communication with the display system 400.

Figure 5:
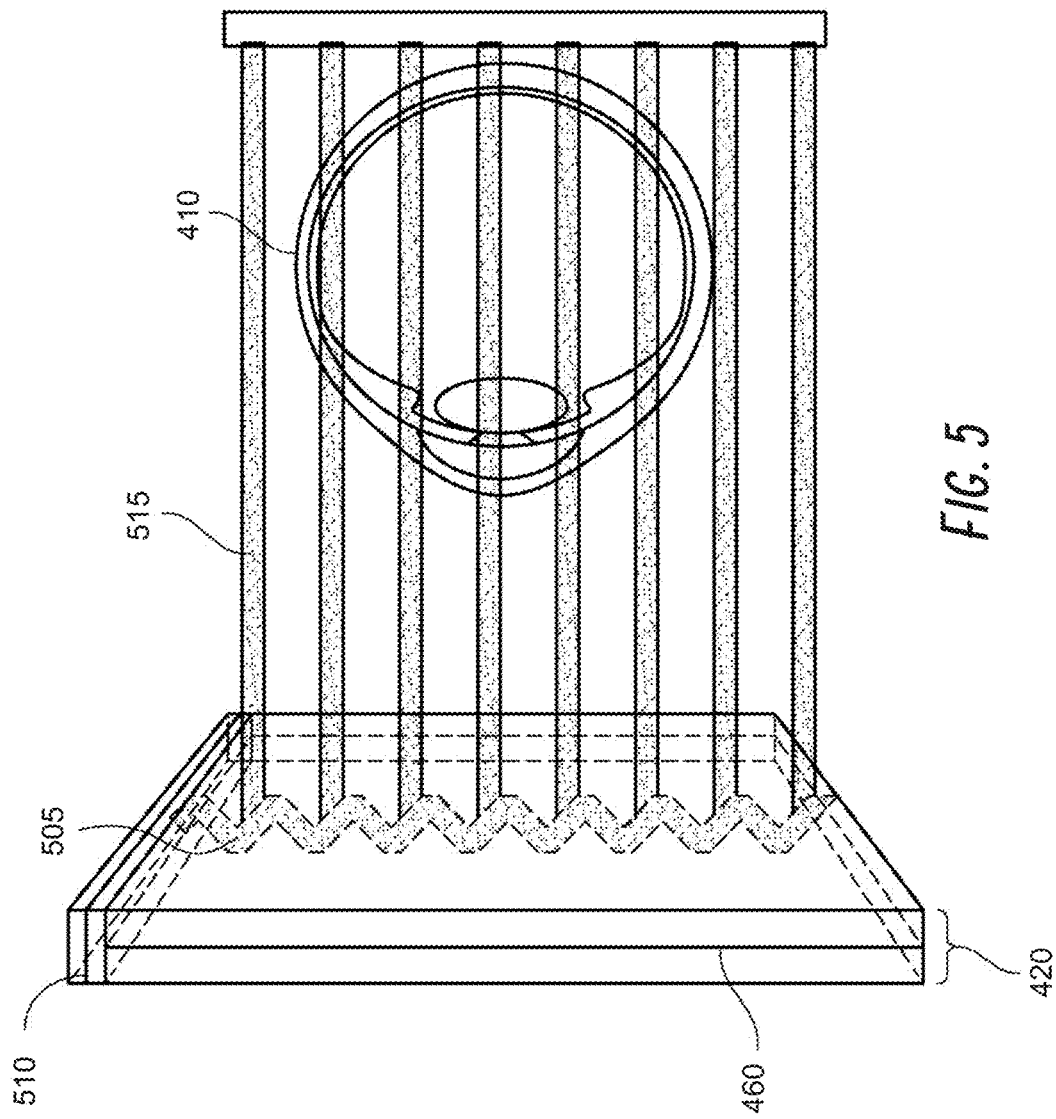
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 405 may function similarly, where the waveguide assembly 405 includes multiple waveguides. Light 505 is injected into the waveguide 420 at the input edge 510 of the waveguide 420 and propagates within the waveguide 420 by TIR. At points where the light 505 impinges on the DOE 460, a portion of the light exits the waveguide as exit beams 515. The exit beams 515 are illustrated as substantially parallel but they may also be redirected to propagate to the eye 410 at an angle (e.g., forming divergent exit beams), depending on the depth plane associated with the waveguide 420. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
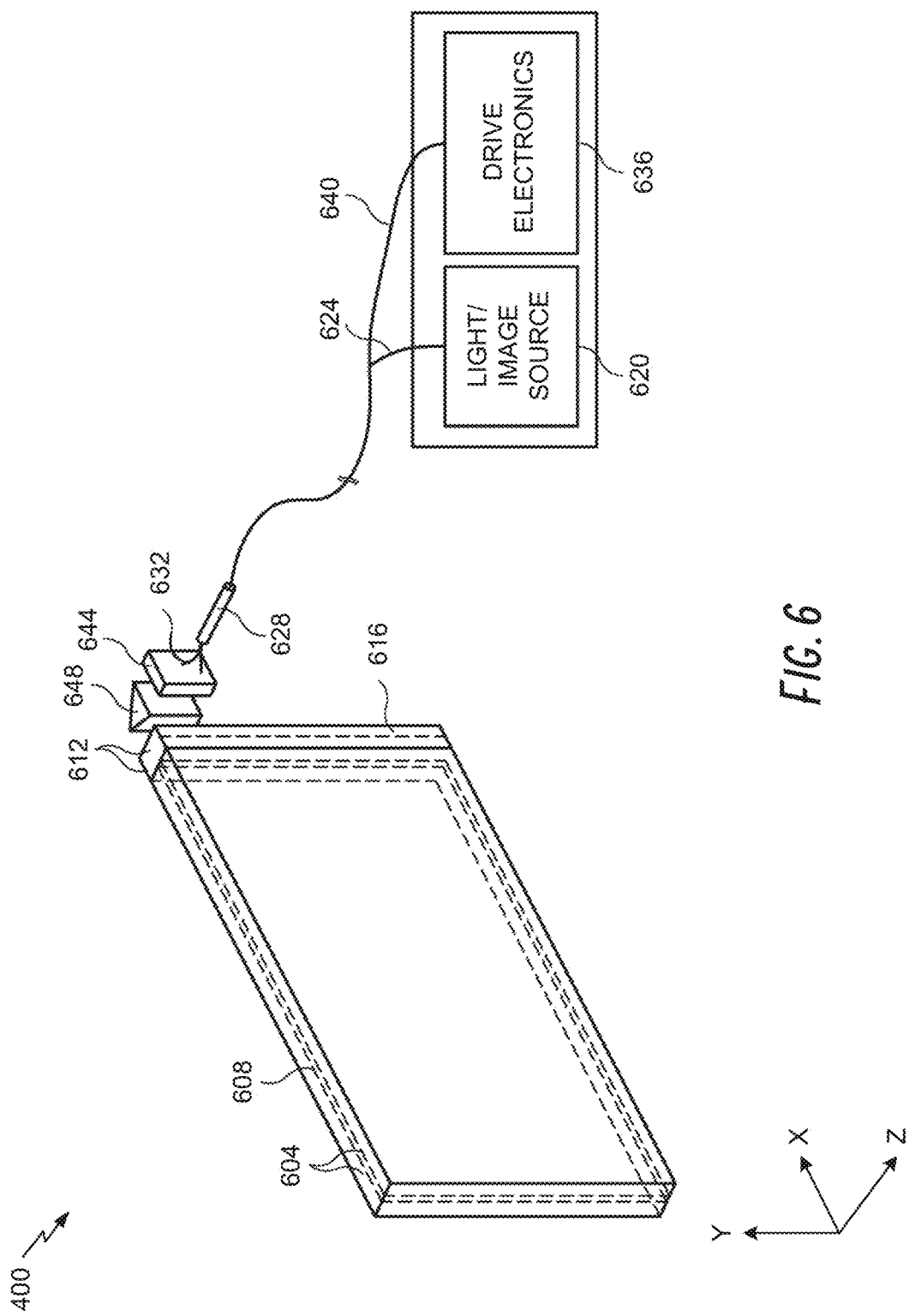
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 shows another example of the display system 400 including a waveguide apparatus, an optical coupler subsystem to optically couple light to or from the waveguide apparatus, and a control subsystem. The display system 400 can be used to generate a multi-focal volumetric, image, or light field. The display system 400 can include one or more primary planar waveguides 604 (only one is shown in FIG. 6) and one or more DOEs 608 associated with each of at least some of the primary waveguides 604. The planar waveguides 604 can be similar to the waveguides 420, 422, 424, 426, 428 discussed with reference to FIG. 4. The optical system may employ a distribution waveguide apparatus, to relay light along a first axis (vertical or Y-axis in view of FIG. 6), and expand the light's effective exit pupil along the first axis (e.g., Y-axis). The distribution waveguide apparatus, may, for example include a distribution planar waveguide 612 and at least one DOE 616 (illustrated by double dash-dot line) associated with the distribution planar waveguide 612. The distribution planar waveguide 612 may be similar or identical in at least some respects to the primary planar waveguide 604, having a different orientation therefrom. Likewise, the at least one DOE 616 may be similar or identical in at least some respects to the DOE 608. For example, the distribution planar waveguide 612 and/or DOE 616 may be comprised of the same materials as the primary planar waveguide 604 and/or DOE 608, respectively. The optical system shown in FIG. 6 can be integrated into the wearable display system 200 shown in FIG. 2.

The relayed and exit-pupil expanded light is optically coupled from the distribution waveguide apparatus into the one or more primary planar waveguides 604. The primary planar waveguide 662 relays light along a second axis, preferably orthogonal to first axis, (e.g., horizontal or X-axis in view of FIG. 6). Notably, the second axis can be a non-orthogonal axis to the first axis. The primary planar waveguide 604 expands the light's effective exit path along that second axis (e.g., X-axis). For example, the distribution planar waveguide 612 can relay and expand light along the vertical or Y-axis, and pass that light to the primary planar waveguide 604 which relays and expands light along the horizontal or X-axis.

The display system 400 may include one or more sources of colored light (e.g., red, green, and blue laser light) 620 which may be optically coupled into a proximal end of a single mode optical fiber 624. A distal end of the optical fiber 624 may be threaded or received through a hollow tube 628 of piezoelectric material. The distal end protrudes from the tube 628 as fixed-free flexible cantilever 632. The piezoelectric tube 628 can be associated with four quadrant electrodes (not illustrated). The electrodes may, for example, be plated on the outside, outer surface or outer periphery or diameter of the tube 628. A core electrode (not illustrated) is also located in a core, center, inner periphery or inner diameter of the tube 628.

Drive electronics 636, for example electrically coupled via wires 640, drive opposing pairs of electrodes to bend the piezoelectric tube 628 in two axes independently. The protruding distal tip of the optical fiber 624 has mechanical modes of resonance. The frequencies of resonance can depend upon a diameter, length, and material properties of the optical fiber 624. By vibrating the piezoelectric tube 628 near a first mode of mechanical resonance of the fiber cantilever 632, the fiber cantilever 632 is caused to vibrate, and can sweep through large deflections.

By stimulating resonant vibration in two axes, the tip of the fiber cantilever 632 is scanned biaxially in an area filling two dimensional (2-D) scan. By modulating an intensity of light source(s) 620 in synchrony with the scan of the fiber cantilever 632, light emerging from the fiber cantilever 632 forms an image. Descriptions of such a set up are provided in U.S. Patent Publication No. 2014/0003762, which is incorporated by reference herein in its entirety.

A component 644 of an optical coupler subsystem collimates the light emerging from the scanning fiber cantilever 632. The collimated light is reflected by mirrored surface 648 into the narrow distribution planar waveguide 612 which contains the at least one diffractive optical element (DOE) 616. The collimated light propagates vertically (relative to the view of FIG. 6) along the distribution planar waveguide 612 by total internal reflection, and in doing so repeatedly intersects with the DOE 616. The DOE 616 preferably has a low diffraction efficiency. This causes a fraction (e.g., 10%) of the light to be diffracted toward an edge of the larger primary planar waveguide 604 at each point of intersection with the DOE 616, and a fraction of the light to continue on its original trajectory down the length of the distribution planar waveguide 612 via TIR.

At each point of intersection with the DOE 616, additional light is diffracted toward the entrance of the primary waveguide 612. By dividing the incoming light into multiple outcoupled sets, the exit pupil of the light is expanded vertically by the DOE 616 in the distribution planar waveguide 612. This vertically expanded light coupled out of distribution planar waveguide 612 enters the edge of the primary planar waveguide 604.

Light entering primary waveguide 604 propagates horizontally (relative to the view of FIG. 6) along the primary waveguide 604 via TIR. As the light intersects with DOE 608 at multiple points as it propagates horizontally along at least a portion of the length of the primary waveguide 604 via TIR. The DOE 608 may advantageously be designed or configured to have a phase profile that is a summation of a linear diffraction pattern and a radially symmetric diffractive pattern, to produce both deflection and focusing of the light. The DOE 608 may advantageously have a low diffraction efficiency (e.g., 10%), so that only a portion of the light of the beam is deflected toward the eye of the view with each intersection of the DOE 608 while the rest of the light continues to propagate through the waveguide 604 via TIR.

At each point of intersection between the propagating light and the DOE 608, a fraction of the light is diffracted toward the adjacent face of the primary waveguide 604 allowing the light to escape the TIR, and emerge from the face of the primary waveguide 604. In some embodiments, the radially symmetric diffraction pattern of the DOE 608 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 604 by a multiplicity of DOEs 608 at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of AR Systems

In many implementations, the AR system may include other components in addition to the wearable display system 80 (or optical systems 100). The AR devices may, for example, include one or more haptic devices or components. The haptic device(s) or component(s) may be operable to provide a tactile sensation to a user. For example, the haptic device(s) or component(s) may provide a tactile sensation of pressure and/or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The AR system may, for example, include one or more physical objects which are manipulable by the user to allow input or interaction with the AR system. These physical objects are referred to herein as totems. Some totems may take the form of inanimate objects, for example a piece of metal or plastic, a wall, a surface of table. Alternatively, some totems may take the form of animate objects, for example a hand of the user. As described herein, the totems may not actually have any physical input structures (e.g., keys, triggers, joystick, trackball, rocker switch). Instead, the totem may simply provide a physical surface, and the AR system may render a user interface so as to appear to a user to be on one or more surfaces of the totem. For example, the AR system may render an image of a computer keyboard and trackpad to appear to reside on one or more surfaces of a totem. For instance, the AR system may render a virtual computer keyboard and virtual trackpad to appear on a surface of a thin rectangular plate of aluminum which serves as a totem. The rectangular plate does not itself have any physical keys or trackpad or sensors. However, the AR system may detect user manipulation or interaction or touches with the rectangular plate as selections or inputs made via the virtual keyboard and/or virtual trackpad.

Examples of haptic devices and totems usable with the AR devices, HMD, and display systems of the present disclosure are described in U.S. Patent Publication No. 2015/0016777, which is incorporated by reference herein in its entirety.

Examples of Performing Error Correction on Display Systems

As described above, a display system may comprise a stacked waveguide assembly, such as that illustrated in FIGS. 4-6, having multiple display layers of a substrate material with diffractive gratings to redirect light generating a digitized light field that impinges on the eye. In some embodiments, the waveguide assembly comprises one substrate layer per color per depth. For example, a two-depth plane RGB display can have a total of 6 waveguide layers. The display system can be an embodiment of the wearable display system 80.

In a stacked waveguide assembly, there are a range of potential phenomena that may introduce artifacts causing deteriorated image quality. These may include ghosting (multiple images), distortion, misalignment (between colors or depths), and color intensity variation across the field of view. In addition, certain types of artifacts that may occur in other types of conditions, e.g., when illuminating with a laser as opposed to an LED (e.g., speckle, banding, Newton fringes), or when the density of out-coupled beams is less than a certain amount (e.g., wavefront sparsity, which may be perceived as if looking through a screen-door or a picket fence).

Due to imperfections in the optics of a light field display, a perfect three-dimensional grid in a render engine can become distorted when displayed through the optics. In order to identify and correct distortions between expected images and actual displayed images, a calibration pattern, such as a checkerboard pattern, can be projected using the display system.

FIG. 7 illustrates example distortions that can occur when projecting a calibration pattern 702 by a display system. The calibration pattern 702 can be any type of pattern suitable for performing spatial or chromatic calibration (e.g., a checkerboard pattern comprising a plurality of checkerboard squares). The calibration pattern 702 can include any type of test or calibration pattern such as a geometric pattern or a random stochastic pattern. The projected calibration pattern 702 results in a generated light field image 704. The distortions present in the image 704 can include spatial distortions (e.g., when a visible pixel is not where it is expected to be within the field of view) as well as chromatic distortions (e.g., when a color value of a visible pixel is different from what is expected). For example, the checkerboard squares of the pattern 702 may be shifted from their expected positions in the image 704 (e.g., spatial errors). In addition, instead of the checkerboard squares appearing in black and white, some checkerboard squares in the image 704 may appear in other colors, such as purple (e.g., chromatic errors). Display errors can be measured using a light field metrology system, which can include a digital camera positioned to acquire image(s) of a calibration pattern projected by the display. In some embodiments, multiple images may be captured corresponding to a calibration image shifted to different locations, in order to acquire finer grained information on expected positions versus actual positions. The digital camera can be configured to focus at different focus depths, in order to determine at what depths different regions of a displayed image (e.g., features on a displayed calibration pattern) are in focus.

Capturing multiple images at different focus depths to determine depths of different regions of a displayed image in accordance with some embodiments is described in greater detail below in association with FIGS. 17-20. Different types of calibration patterns that may be used in various embodiments are described in greater detail below in association with FIGS. 22-24.

Spatial Errors

Spatial errors may include several different manifestations. For example, spatial misalignment includes translations or rotations of a display layer. Spatial errors may also involve non-linear spatial distortions varying over the field of view (FOV) of a depth plane of the display.

Spatial error can be a symptom of mechanical or optical defects within the display system. By interpreting the measured spatial errors, metrics that quantify the optomechanical quality of a system and that are suggestive of methods for improvement can be derived. For example, a spatial error representing depth plane rotation can suggest that the display is mechanically rotated with respect to a desired position. Per-color plane scaling may suggest that the lens system is not sufficiently achromatic.

To identify spatial errors, a light field metrology system comprising an image capture apparatus such as a digital camera can be used to capture one or more images projected by the display system (e.g., projections of a calibration pattern) and produce a vector field that represents deviations of the actual displayed image from the expected image. The vector field may be a three-dimensional vector field including in-plane deviations in the x-y plane of the display and out-of-plane deviations in the z-direction (depth), or a two-dimensional vector field including deviations in just the x-y plane. In some embodiments, a vector field may be generated for each depth plane or each color plane of the display system. In some embodiments, depth may be measured in diopters, representing the inverse of the focal length of the layer in meters)

FIG. 8 illustrates an example of a vector field that can be generated from one or more captured images that maps deviations between expected positions of points in a projected light field and their actual displayed positions. The points in the projected light field may correspond to features in a calibration image (e.g., centers and corners of calibration checkerboard squares). Each vector in the vector field represents a distortion between an expected position in the light field and its corresponding actual position. In this example, the distortion vector field is 2D. In the illustrated vector field, expected positions of a feature are marked using a first color and marker type (e.g., an "O" 802 for expected positions), while actual displayed positions of the feature are marked using a second color (e.g., an "X" 804 for detected positions). Each pair of corresponding expected positions and displayed positions is connected by a line 806, which may include an arrow indicating the direction of the correction needed to correct the detected displayed position to be the expected position.

Using the vector field, local or global distortion information (e.g., in-plane translation, aggregate scaling, aggregate rotation, mean pixel warp, or diopter error, described below) can be extracted. For example, a distortion graph may be generated from a determined vector field. The distortion graph can be used to analyze a distribution of pixel position error values (e.g., vector magnitude) over a generated vector field. The distortion graph may be a histogram showing the frequency of pixel position errors (e.g., plotting a pixel position error magnitude against frequency at which the error magnitude appears in the vector field). Other types of graphs may be used to analyze other attributes of a vector field (e.g., distortion direction).

Spatial errors can be broadly split up into in-plane and out-of-plane spatial errors. In-plane spatial errors refer to spatial errors along a particular depth plane (e.g., an xy-plane, in accordance with the coordinate system illustrated in FIG. 6) at a particular depth (measured on the z-axis). A vector field (e.g., as illustrated in FIG. 8) can be used to derive one or more metrics for different categories of spatial errors. Each of these metrics may be defined on a per-layer basis (e.g., for each individual display layer corresponding to a particular combination of color and depth (e.g., Red-3 Diopter display layer, Green-1 Diopter display layer, etc.)) or a per-display basis (e.g., to quantify the overall fidelity of the display in a concise parameter).

In-Plane Spatial Errors

In some embodiments, in-plane spatial errors can be divided into a plurality of different components, each corresponding to a different type of error. These components can include translation error, rotational error, scaling error, or non-linear spatial error. Each of these error components can be corrected for individually or sequentially.

In-Plane Translation Error

Figure 9A:
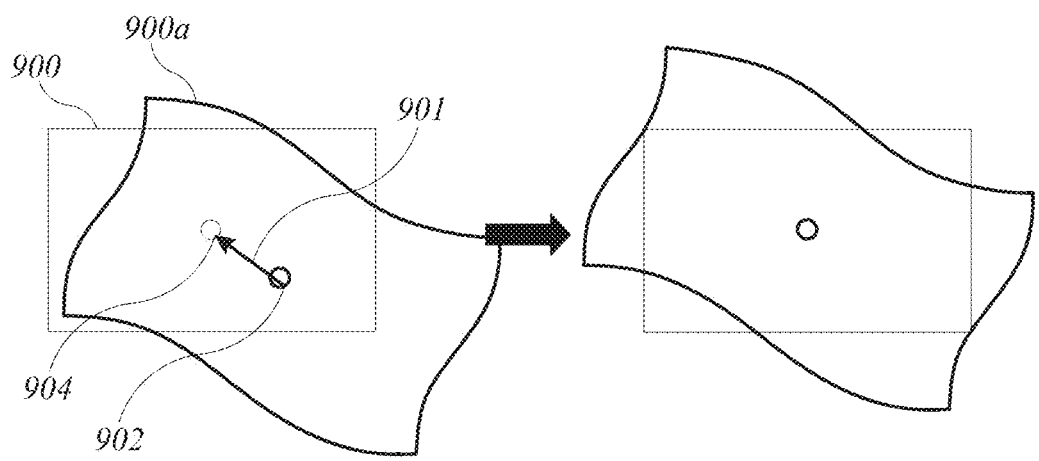
FIG. 9A illustrates an example XY Translation spatial error.

FIG. 9A illustrates an example in-plane (xy) translation spatial error (also referred to as xy centration). An xy translation error refers to the x- and/or y-pixel shift of the center of a displayed image of a display layer from its expected position, and is intended to inform mechanical or display alignment. In FIG. 9A, an expected image position 900 (shown as a red rectangle in this example) is translated to a displayed image position 900a (shown as a green shape having non-straight edges). An xy translation error may be corrected by identifying a center position 902 of the displayed image 900a and a center position 904 of the expected image 900, and performing one or more shifts (along a determined translation vector 901) such that the displayed center position 902 is aligned with the expected center position 904 (through mechanical alignment of the display, software correction of the display images, or a combination of both). One or more metrics for the measured xy translation spatial error can include translation error, measured on a per layer basis, which measures a layer center versus an expected or reference position (e.g., an optical axis of the display) or maximum translation offset, measured per display, which indicates a maximum translation between any two display layers to quantify overall translation registration.

Aggregate Rotation Error

Figure 9B:
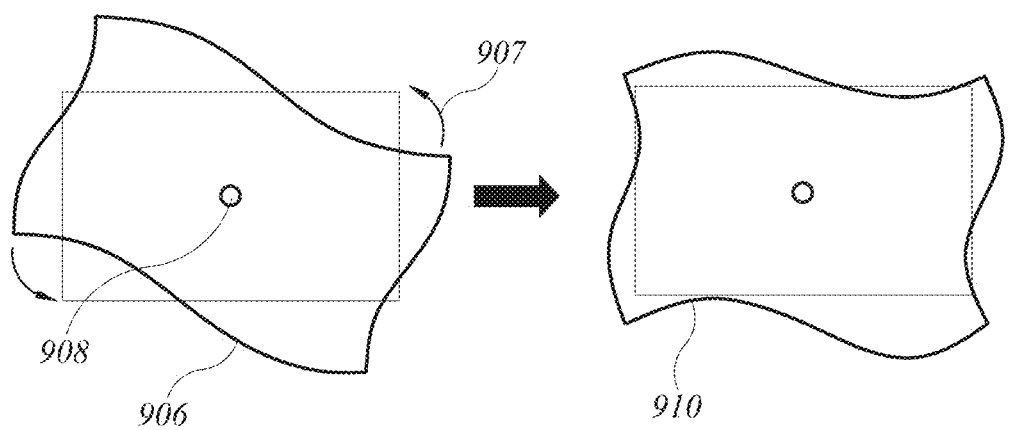
FIG. 9B illustrates an example aggregate rotation spatial error.

FIG. 9B illustrates an example aggregate rotation spatial error. Aggregate rotation refers to the overall rotation angle of the displayed image about its center relative to the expected position of the image. While spatial distortion may not always be fully describable by a simple affine rotation, an aggregate rotation measure can be used to provide the rotation angle by which the pixel position error (between displayed versus expected image positions) is minimized. Aggregate rotation metrics are intended to inform mechanical or display alignment. As illustrated in FIG. 9B, aggregate rotation may be corrected by rotating a displayed image 906 around a center point 908 by a designated rotational amount 907 to a position 910 corresponding to an expected position (through mechanical alignment of the display, through software correction of the displayed image, or both). Reported metrics can include rotation error, measured per layer, indicating a measured orientation versus the expected or reference orientation (e.g., relative to a horizontal axis of the display) and maximum rotation offset, measured per display, indicating a maximum rotation error between any two display layers to quantify overall rotational registration.

Aggregate Scaling Error

Figure 9C:
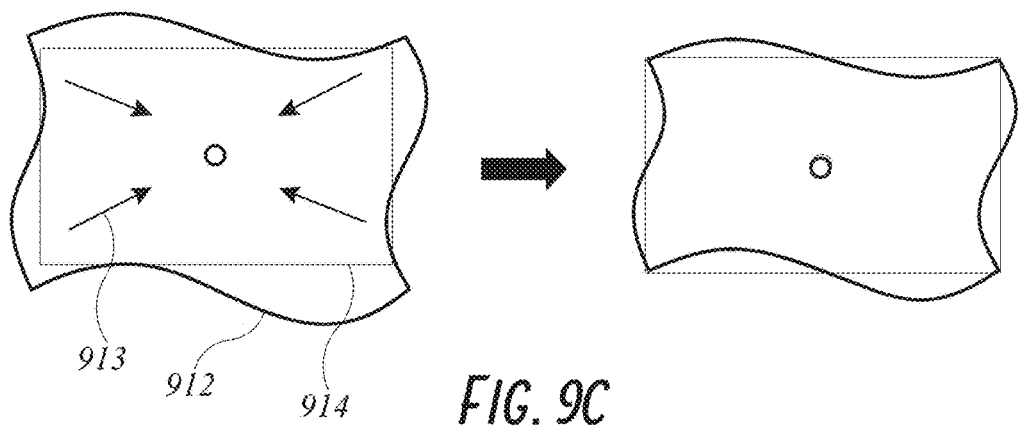
FIGS. 9C and 9D illustrate examples of aggregate scaling spatial error.

FIG. 9C illustrates an example of an aggregate scaling spatial error. Aggregate scaling indicates an overall scaling factor of a displayed image about its center relative to an expected image. While the spatial distortion may not be fully described by a simple affine scaling, an aggregate scaling measure may indicate a scaling factor by which the pixel position error is minimized. Aggregate scaling metrics are intended to inform optical design or display alignment. As illustrated in FIG. 9C, aggregate scaling spatial errors may be corrected by scaling a size of a displayed image 912 by a designated scaling amount 913 to match that of an expected image 914. Reported metrics for aggregate scaling can include scaling error, measured per layer, which measures image scaling versus an expected or reference scaling (e.g. with reference to physical target in a calibrated setup) and maximum scaling offset, measured per display, indicating a maximum scaling between any two display layers to quantify overall scale registration.

Figure 9D:
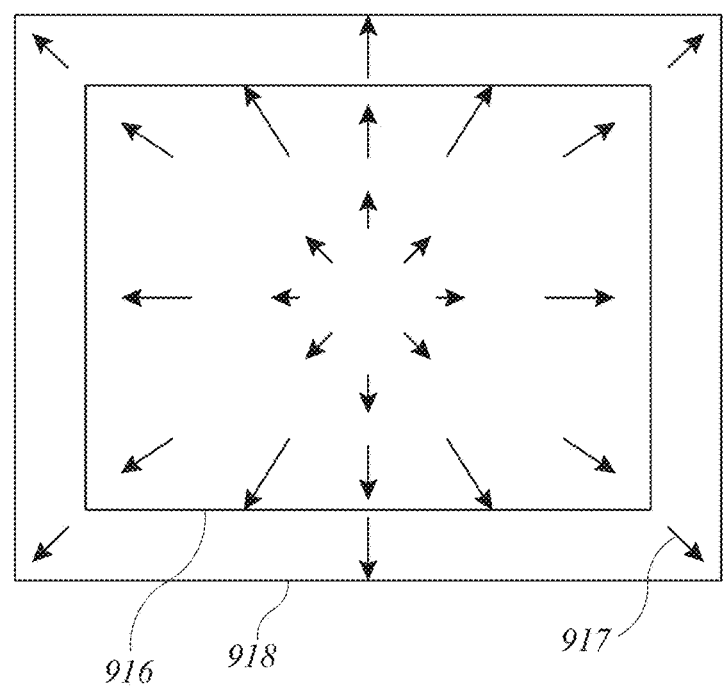

FIG. 9D illustrates another example of an aggregate scaling spatial error. The displayed image 916 appears smaller in comparison to an expected image 918. In order to correct the scaling error, the displayed image 916 is scaled up by a scaling amount 917 to match the size of the expected image 918.

Pixel Warp Error

Figure 9E:
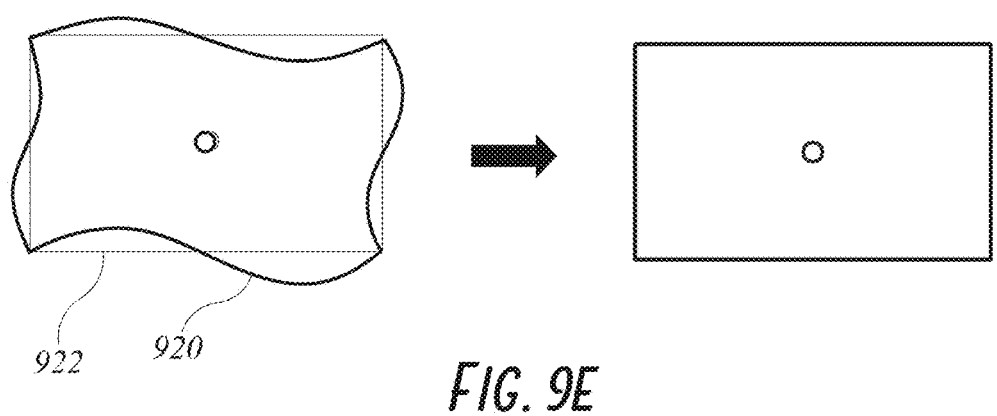
FIG. 9E illustrates an example of remaining spatial errors after corrections of XY translation, rotation, and scaling have been performed.

FIG. 9E illustrates an example of remaining spatial errors after corrections of xy translation, rotation, and scaling have been performed. The remaining error (also referred to as pixel warp or spatial mapping) indicates an average residual Euclidean pixel position error, after xy translation, rotation, and scaling have been factored out of the overall spatial distortion profile (e.g., as illustrated in FIGS. 9A-9D), gives a measure of the non-linear or non-affine warping characteristic of the display system, and may be used to inform display design and quality control. Reported metrics for pixel warp may include mean pixel warp (MPW), measured per layer, indicating an average residual Euclidean pixel position error after xy translation, rotation and scaling have been factored out, with reference to a perfect grid, and maximum mean pixel warp (Max. MPW), measured per display, indicating a maximum of the MPWs among the layers of the display to quantify overall warping. In some embodiments, the remaining pixel warp can be corrected through spatial mapping performed using a processing module (e.g., module 224 or 228) to align the displayed image 920 with the expected image 922.

Out-of-Plane Spatial Errors

A digital light-field display system, such as those illustrated in FIGS. 4-6, is able to produce depth planes that appear to be at different depths (in the z-direction) from the viewer (see, e.g., FIG. 3). In some embodiments, the depth planes correspond to flat planes that appear to be placed at different distances from the viewer. As is common in optics, rather than referring to the distance of the depth plane from the display, an inverse distance measured in diopters ($m^{-1}$) can be used to reference the different depth planes. For example, a display may have two depth planes positioned at depths of 3 diopters (⅓ m) and 1 diopter (1 m). Due to imperfections in the display system, the diopter profile across a depth plane may not be as expected. For example, the displayed image on a depth layer may have a diopter profile with an incorrect distance, or varying focus across the FOV of the display.

Out-of-plane spatial errors (also referred to as diopter errors) are a measure of diopter (depth) error of a depth plane, and are intended to inform errors in optical, mechanical and waveguide alignment or design. The reported metrics for diopter error may include diopter error, measured per layer, indicating an error amount between expected and measured depth of depth planes, and maximum diopter error, indicating a maximum depth error among the depth planes.

Figures 10A, 10B:
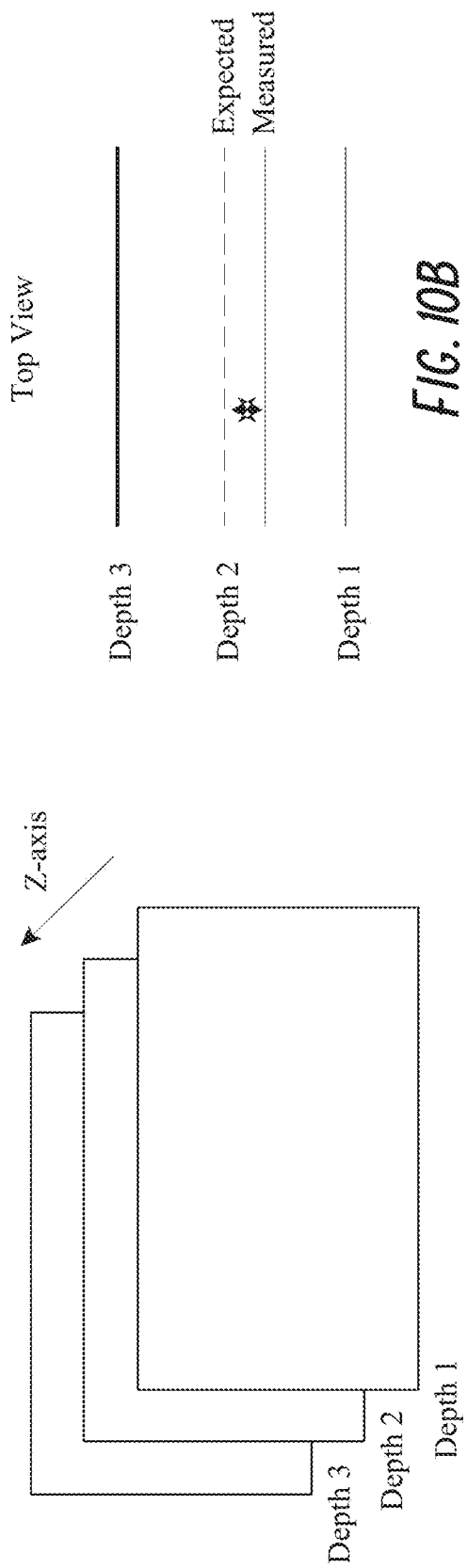

FIG. 10A illustrates an example of a plurality of depth planes, intended to be viewed at different depths. In the illustrated example, three different depth planes are shown, although the display system may contain more or fewer depth planes. In addition, each depth plane may correspond to multiple waveguide layers (e.g., RGB color layers).

FIGS. 10B-10D illustrate examples of types of out-of-plane spatial errors that may occur when viewing the projected depth planes shown in FIG. 10A. For example, a projected depth plane may be shifted to a different depth, such that it appears at a depth that is greater than or smaller than expected (FIG. 10B). A depth plane may be misaligned such it exhibits a bulk rotation from the expected depth (FIG. 10C). A depth plane may exhibit a non-uniform profile characteristic of grating imperfections (FIG. 10D). A depth plane may exhibit a combination of the errors illustrated in FIGS. 10B-10D.

Figure 10E:
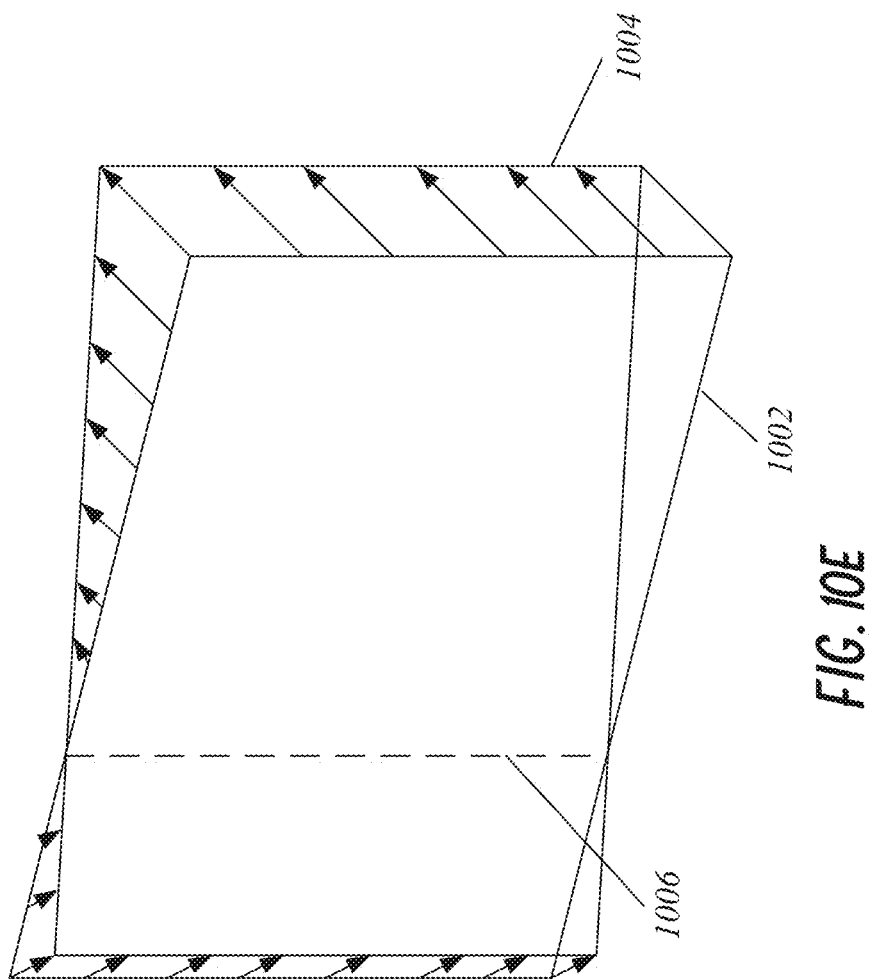

FIG. 10E illustrates another example of an out-of-plane spatial error. The projected depth plane 1002 is misaligned relative to the expected depth plane 1004. In the illustrated example, the misalignment comprises a depth plane rotation. In order to correct the out-of-plane spatial error, an axis of rotation 1006 can be identified, and the rotation performed on the projected depth plane 1002 about the identified axis of rotation 1006, such that the projected depth plane 1002 substantially aligns with the expected depth plane 1004. While the axis of rotation 1006 is illustrated as being parallel to an axis of the expected depth plane 1004 (e.g., a vertical axis), it is understood that the axis of rotation may be in any direction.

While diopter errors are distinct from in-plane spatial errors, which are related to in-plane distortions, diopter errors can potentially affect in-plane spatial errors, e.g., by introducing viewpoint-dependent spatial distortion due to incorrect assumptions of pixel depth. For example, for a defective depth plane with regions at different depths from what is expected, the pixels may non-uniformly shift with respect to viewer position, introducing varying image warping.

In some embodiments, the error correction techniques described herein for in-plane spatial errors (e.g., xy centration, aggregate scaling, aggregate rotation, and spatial mapping) can be extended to three-dimensions. For example, centration may be performed in three dimensions by identifying a location of a center point of a displayed plane on an xyz coordinate system and shifting the plane (e.g., along the x, y, and z axes) such that the center point aligns with an expected location.

Quantification of Spatial Errors Based on Distortion Vector Field

As described herein with reference to FIG. 8, a multidimensional (e.g., 2D or 3D) distortion vector field can be generated by measuring the displacement of an image feature from an expected position to a displayed position. The distortion vector field can be calculated for each layer of a multi-layer display (e.g., a display comprising a stacked waveguide assembly 405). The distortion vector fields can be used to capture and characterize distortion of the light field projected by the display. For example, vector analysis operations can be performed on the distortion vector field to determine certain spatial errors. The light field metrology system can calculate such vector operations as part of the analysis of images obtained by a metrology camera (e.g., a digital camera or light field camera) for a calibration pattern (e.g., checkerboard) projected by the display. Such vector analysis techniques are not limited to light field displays and can be applied to any multidimensional metrology or calibration of any type of display.

Given a multidimensional distortion vector field, the curl of the vector field can be computed to determine a local rotation. The average of the curl over a region in the FOV of the display provides a measure of aggregate rotational error in the region. In a discrete depth plane implementation of a light field display, calculation of the curl of the distortion vector field can provide information regarding in-plane rotation or out-of-plane rotation of the layer.

The divergence of the distortion vector field can be computed to determine scaling error. In implementations having multiple layers (e.g., RGB color layers) to produce a full color image at each depth, this scaling error can be used to provide information regarding the scaling calibration.

Vector integral theorems (e.g., Stoke's theorem or the divergence theorem (Gauss's theorem)) can be applied to the distortion vector field to compute the curl and divergence of the vector field over a region in the FOV of the display (e.g., to find aggregate rotation or aggregate scaling of the region). The Euclidean mean of the vectors in the distortion vector field can be computed to obtain information about the non-affineness of the spatial transformation introduced by the distortion.

Quantification of Chromatic Errors

Chromatic errors occur when a color value of a visible pixel is different from the color value that is expected. To evaluate chromatic errors, a calibration image may be projected using a display system. The calibration image may be the same calibration image used to perform spatial error correction, or may be a different calibration image. For example, the calibration image can comprise a solid image of a particular color, such as red, at a particular luminance level (e.g., maximum brightness). The output from projecting the calibration image can be captured using an image capturing device (e.g., one or more cameras). FIG. 11 illustrates an example of a captured image of a projected calibration image. Although the calibration image may have a luminance level that is constant throughout the image, the luminance of the displayed calibration image varies across the field of view of the display due to the presence of chromatic errors. For example, certain regions 1102 of the captured image may high luminance levels while other regions 1104 may exhibit lower luminance levels, causing dark regions or bands to appear across the display. In some embodiments, the calibration image can comprise a colored calibration pattern rather than being a solid color.

In some embodiments of the display, the observed luminance topology may be dependent on wavelength. For example, the luminance variation can be different for red, green and blue, causing the projected image of to appear in a color other than what is expected (indicating imbalance between the red, green, blue components). For example, a projected white calibration image may appear to be purple of luminance level of green is lower than that of red and blue.

In addition, luminance variations may also be based upon observer location (e.g., if the camera were moved, the dark band at 1102 may appear to move to a different location in the FOV). This phenomenon can lead to challenges in maintaining color uniformity and white balance across the FOV (especially as luminance or chromatic balance can depend on observer location) and ultimately affects color accuracy of the content being displayed.

Each display layer in the display system is associated with chromaticity characteristics, measuring color, and luminance characteristics, measuring brightness or intensity. As such, chromatic errors may be broadly divided into luminance flatness errors and chromatic uniformity errors.

Luminance Flatness

A luminance flatness metric can be used to quantify how much variation in luminance is manifested by a single display layer. In general, in stacked waveguide assemblies, different display layers can potentially have different luminance variations across the field of view, due to each display layer being generated by different waveguides in the stack (see, e.g., the waveguide assembly 405 in FIG. 4).

To measure luminance flatness for a display layer, a luminance value (also referred to as an intensity value) can be determined for some or all pixels of the captured image (s). Although the present disclosure refers primarily to luminance values of pixels, in other implementations, luminance values can be determined for regions comprising multiple pixels (e.g., an N×M grid of pixels) instead of for individual pixels. In some embodiments, each determined luminance value can be assigned to a luminance bin comprising a range of one or more luminance values. For example, for an 8-bit color display system, 256 bins corresponding to 8-bit color can be used.

From the determined luminance values, a number of luminance flatness metrics can be calculated by the metrology system. For example, a mode indicating a most common pixel luminance value across the displayed field can be calculated. From the mode, a half pixel population range (HPPR), which indicates a luminance range or a number of luminance bins adjacent to the mode that cover 50% of the pixel population, can be determined. A small HPPR indicates that the luminance for the display layer is substantially uniform across the display. Luminance values may also be referred to as intensity values. For the purposes of the present application, the terms luminance and intensity may be used interchangeably.

Figure 12A:
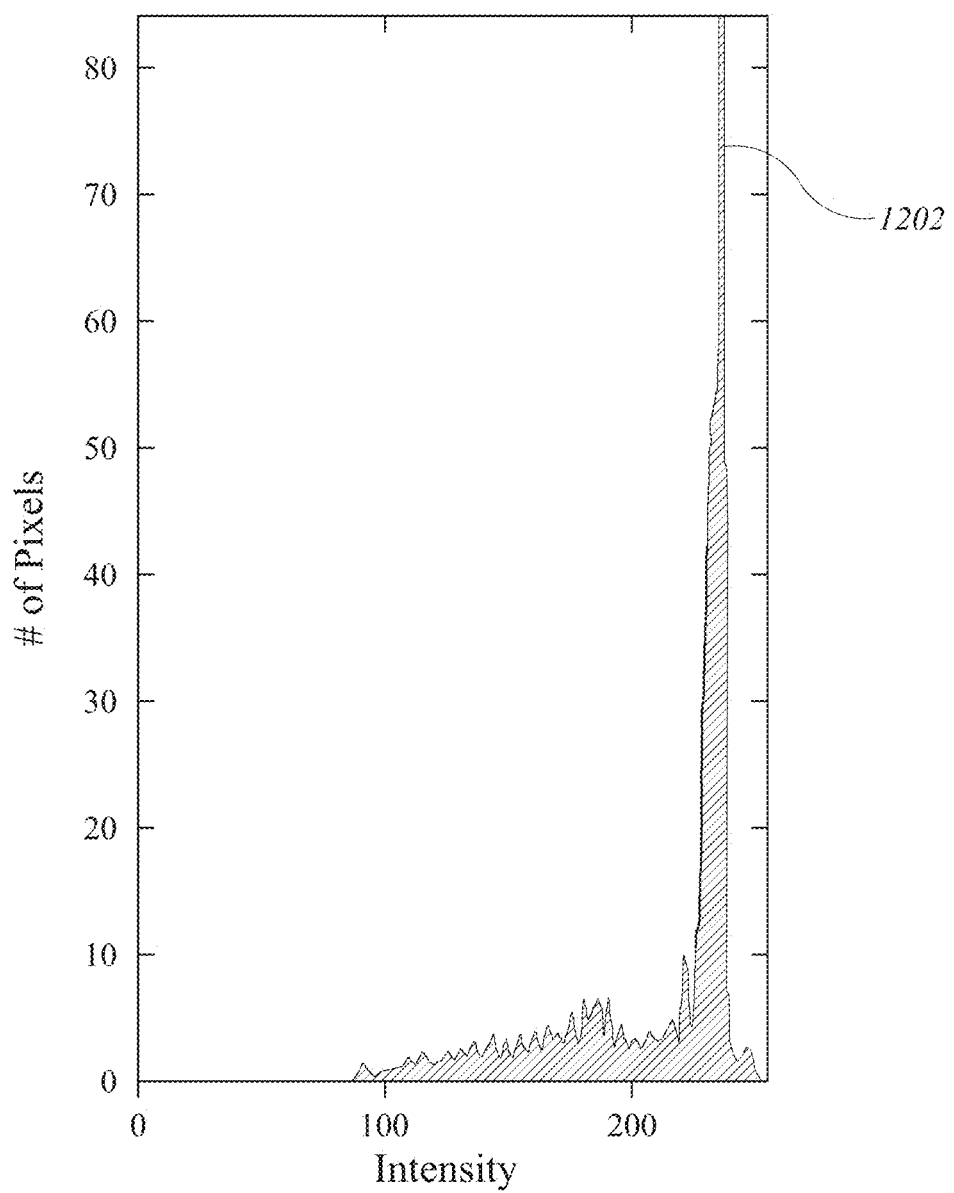
FIG. 12A illustrates an intensity histogram that may be generated from a captured image of a projected test image.

FIG. 12A illustrates an intensity histogram that may be generated from a captured image of a projected calibration image (e.g., as illustrated in FIG. 11). The intensity histogram plots luminance values against how often they appear in the captured image (e.g., number of pixels having the luminance value). The mode is indicated by the luminance value having the highest number of occurrences in the image (e.g., at location 1202).

Figure 12B:
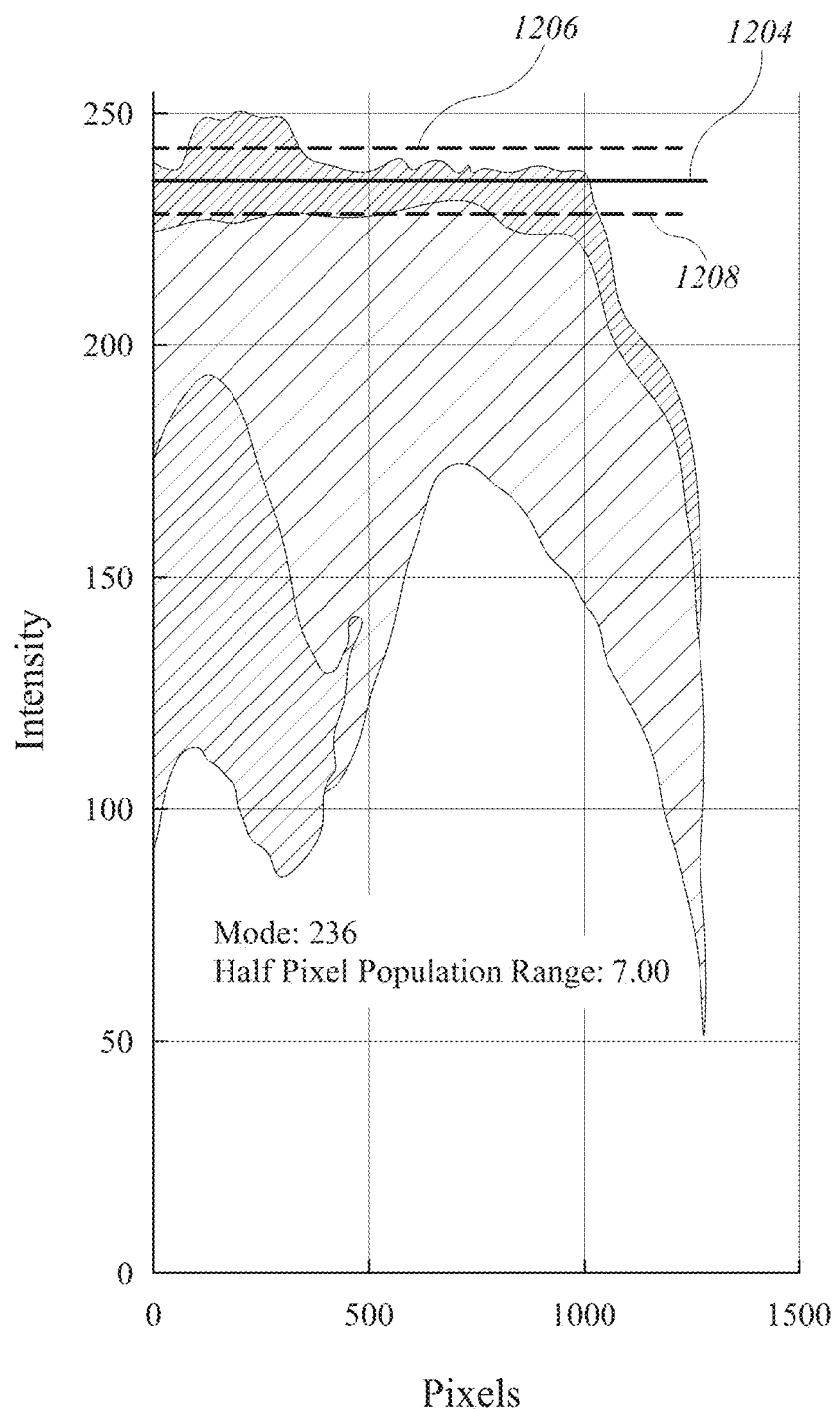
FIG. 12B illustrates an intensity profile generated from a captured image of a projected test image.

FIG. 12B illustrates an intensity profile generated from a captured image of a projected calibration image. In the illustrated intensity profile, the mode occurs at luminance value 1204 (and has a value of 236 in this example). From the mode, a deviation range centered on the mode 1204, indicated as the range between the luminance value 1206 and the luminance value 1208, is determined that covers 50% of the pixel population of the image. The HPPR is determined based upon the calculated deviation range (e.g., the difference between the luminance value 1206 and the luminance value 1208).

For an ideal display layer, the intensity value will be uniform across the field for a given input illumination (e.g., HPPR=0). Deviation from this ideal behavior will manifest as distribution of pixel intensity values away from the mode value. The HPPR measurement attempts to metrify the distribution away from the mode. A substantially uniform luminance can have a small HPPR, e.g., an HPPR that is small compared to the mode or to the range of possible luminance values (e.g., 255 for 8-bit color). For example, a substantially uniform (e.g., flat) luminance display may have a ratio of HPPR to total color range less than about 10%, less than about 5%, less than about 1%, or less than about 0.1%.

Figure 13:
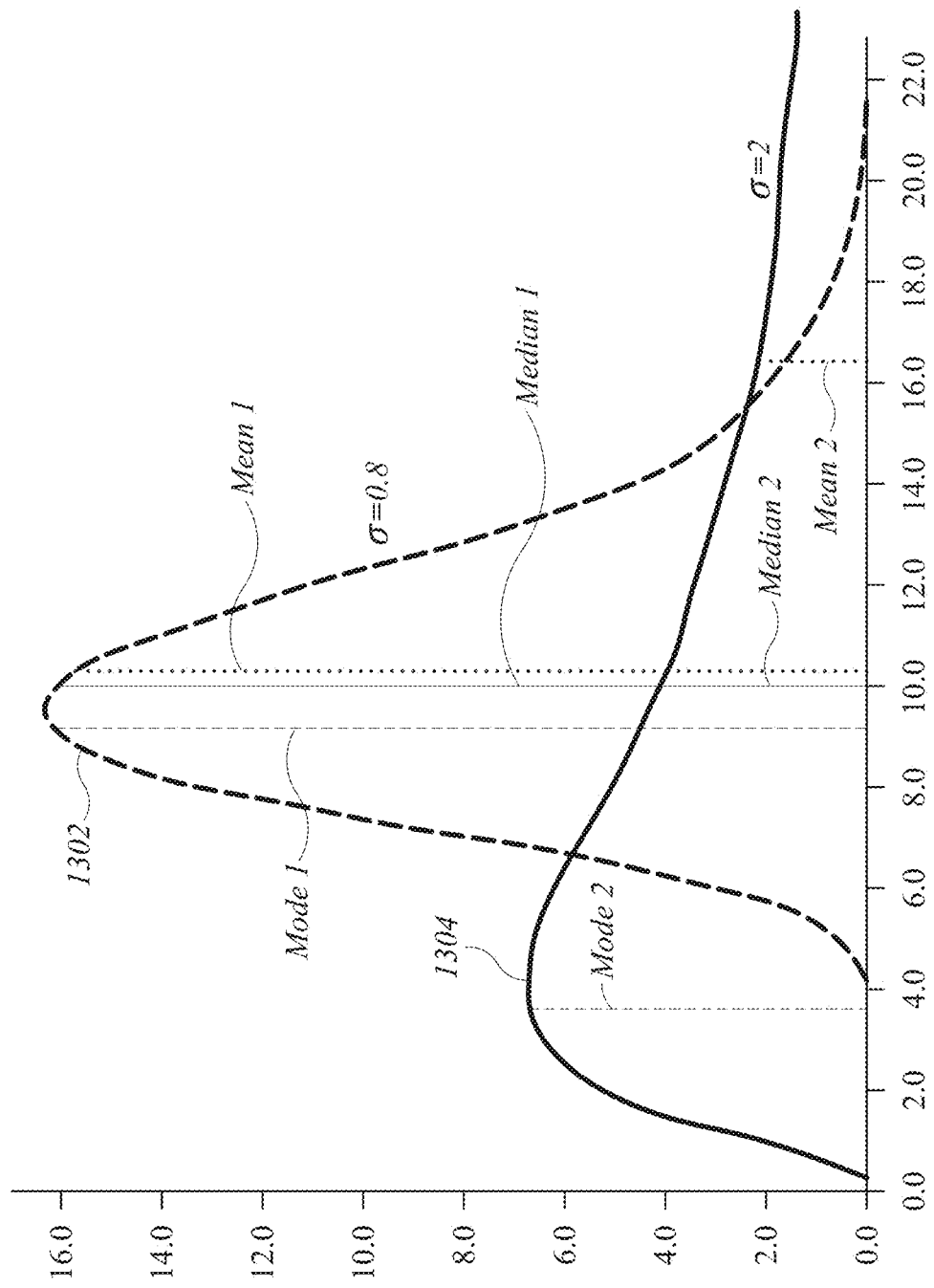
FIG. 13 illustrates example intensity histograms illustrating differences between mode, median, and mean.

The HPPR can be considered a variation of an interquartile range, which measures the distribution away from the median instead of the mode. The median of pixel intensity values may not have a direct relationship to the desired flat-intensity response of the display layer. FIG. 13 illustrates example intensity histograms 1302, 1304 illustrating differences between mode, median, and mean ($\mu$). The medians of the two distributions 1302, 1304 are the same in this example. The two distributions 1302, 1304 have standard deviations, $\sigma$, of 0.8 and 2, respectively. As schematically illustrated in FIG. 13, if the intensity distribution of the image is close to normal (e.g., the intensity distribution 1302), the mode, median, and mean may all be very similar. On the other hand, if the intensity distribution is not close to a normal distribution (e.g., the intensity distribution 1304), the mode, median, and mean of the intensity distribution may be substantially different from each other.

For each display layer of a display, luminance flattening attempts to reduce the luminance variation across the displayed field of view. Since typically the luminance intensity of a pixel cannot be increased beyond its maximum value, luminance flattening is generally an overall luminance reduction step, wherein pixel luminances are compressed in a layer-specific profile, such that the luminance of that layer is as flat as possible.

For example, the luminance flattening can be performed so that the pixel luminances have maximum values at the luminance value of the pixel with the lowest luminance value, reducing the luminance of the display layer to substantially the minimum luminance. Alternatively, pixel luminances can be configured to have maximum values at a selected luminance value that is greater than the luminance value of the pixel with the lowest luminance value. This may not reduce the overall luminance to the minimum, because there may still be pixels having luminance values below the selected value, and there may be remaining luminance non-uniformity. In some embodiments, lowering a luminance value for a pixel or group of pixels comprises identifying a value by which to reduce the luminance value of the pixel or group of pixels. In other embodiments, lowering the luminance value for the pixel or group of pixels comprises identifying a scaling factor by which to downscale the luminance value of the pixel or group of pixels to the minimum luminance value or threshold luminance value.

In some embodiments, if the initial luminance flatness of a display layer is good (e.g., the HPPR is below a threshold value), then the luminance values may be reduced to that of the minimum, in order to provide a flat luminance field. On the other hand, if the luminance flatness is poor (e.g., the HPPR exceeds the threshold value) or the minimum luminance value is low (e.g., does not reach a minimum threshold value), a selected maximum luminance value may be chosen. Luminance flattening can be performed in a software module (e.g., in the processing modules 224, 228).

The level to which luminance is reduced when performing luminance flattening may be different for each display layer. However, different luminance levels for different layers in the same color cluster (e.g., RGB layer cluster) may lead to a loss of white balance, which can be handled by correcting the chromatic uniformity of the display.

Chromatic Uniformity

Chromaticity generally refers to a color component of the display that is independent of luminance. As described above, a display layer in a display system may comprise a red display layer, a green display layer, and a blue display layer, although it is understood that in other implementations, other numbers, types, or colors of display layers or combinations of display layers may be used. In the following examples, RGB color layers will be described for illustrative purposes, but this is not a limitation on the methods for chromatic balancing (which can be applied to any sets of display colors).

If the luminance variations of corresponding red, green, and blue display layers are identical, chromaticity is maintained across the display. On the other hand, if luminance variations across corresponding red, green, and blue display layers are different, the chromaticity of the displayed image will be different from what is expected. For example, for a white calibration image, if the red and blue layers have higher luminance then the green layer, regions of the white calibration image may appear purple in color. These deviations from an intended white color may be referred to as off grayscale.

Chromatic uniformity metrics can be used to capture how off grayscale the image is. The metrics may include, average color error, indicating the average across the FOV of the deviations of red, green, and blue from the corresponding mean of red, green, and blue, respectively. The smaller the average color errors are, the closer to grayscale the image will appear. The average color error may be normalized to a dimensionless value by dividing by the mean color or by the range of possible colors (e.g., 255 for 8-bit color). In various implementations, a display can be considered to have achieved chromatic uniformity if the average color error is less than 10%, less than 5%, less than 1%, or some other threshold.

Figure 14A:
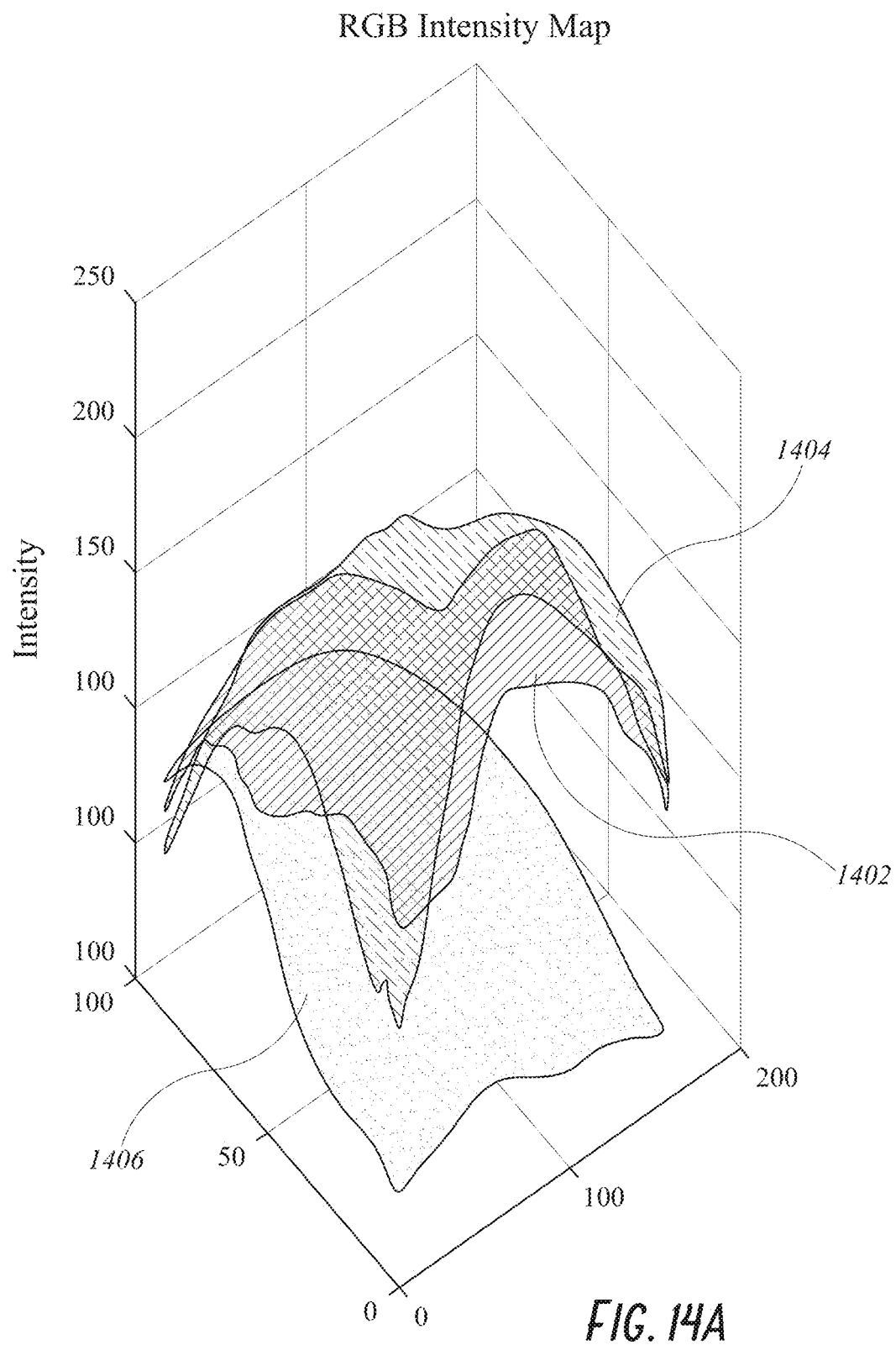
FIG. 14A illustrates a Red-Green-Blue (RGB) intensity map generated from a captured image of a projected test image.

FIG. 14A illustrates an example of a Red-Green-Blue (RGB) intensity map generated from a captured image of a projected test image. The red and blue layers 1402 and 1404 have luminances that are generally similar to each other, and both the red and blue layers 1402 and 1404 have a much higher luminance than the green layer 1406. As a result, a projection of a white test image will have regions that appear to be purple (red plus blue, see, e.g., FIG. 11B).

Figure 14B:
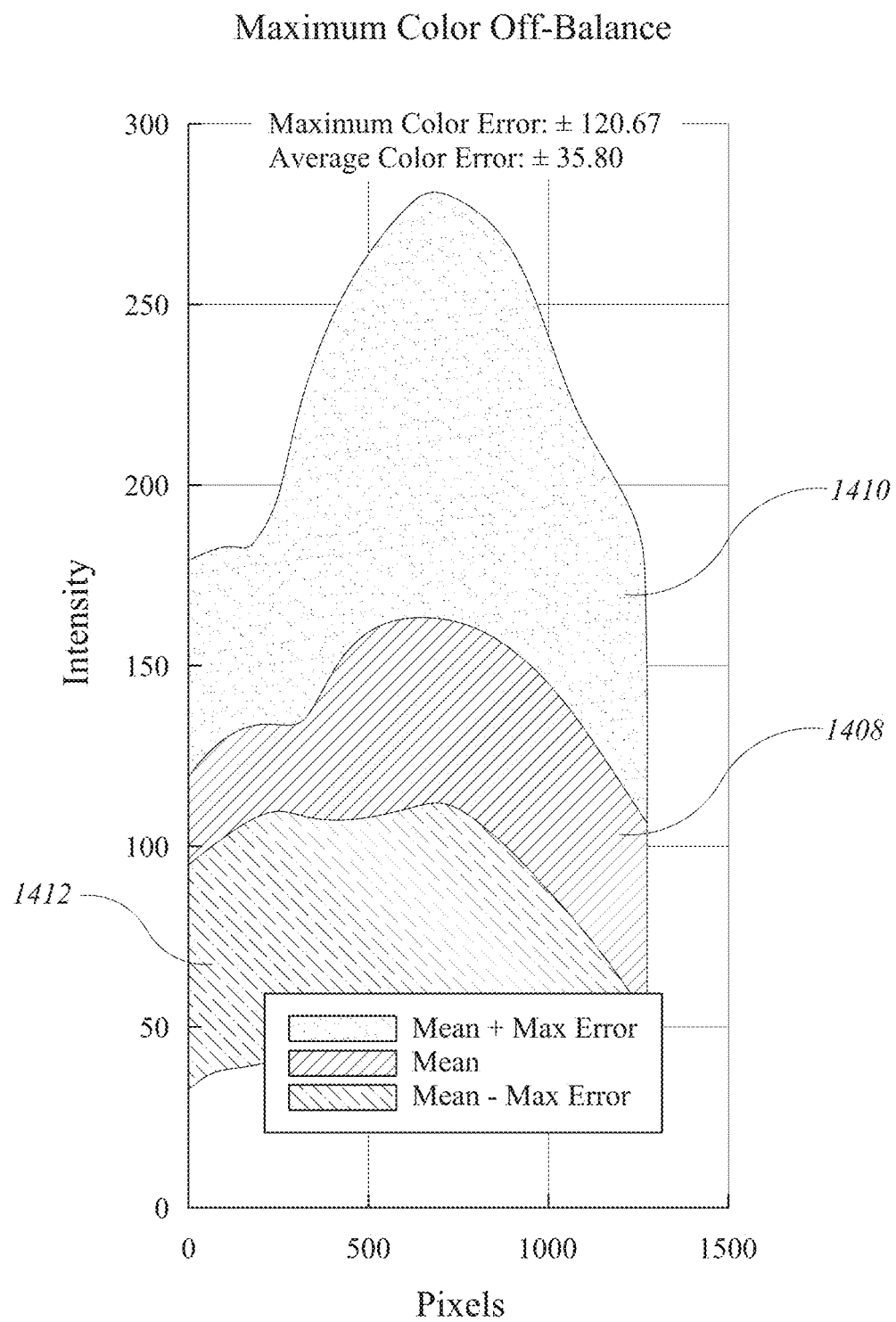
FIG. 14B illustrates a plot mapping an example of maximum color off-balance error.

FIG. 14B illustrates a plot 1408 mapping maximum color off-balance error. Mean luminance 1410 can be determined as the average luminance value of the red, green, and blue color layers. A "Mean+Max Error" surface 1412 indicates a maximum luminance value of the red, green, and blue layers, while "Mean−Max Error" surface 1414 indicates a minimum luminance value of red, green, and blue layers.

Figure 15:
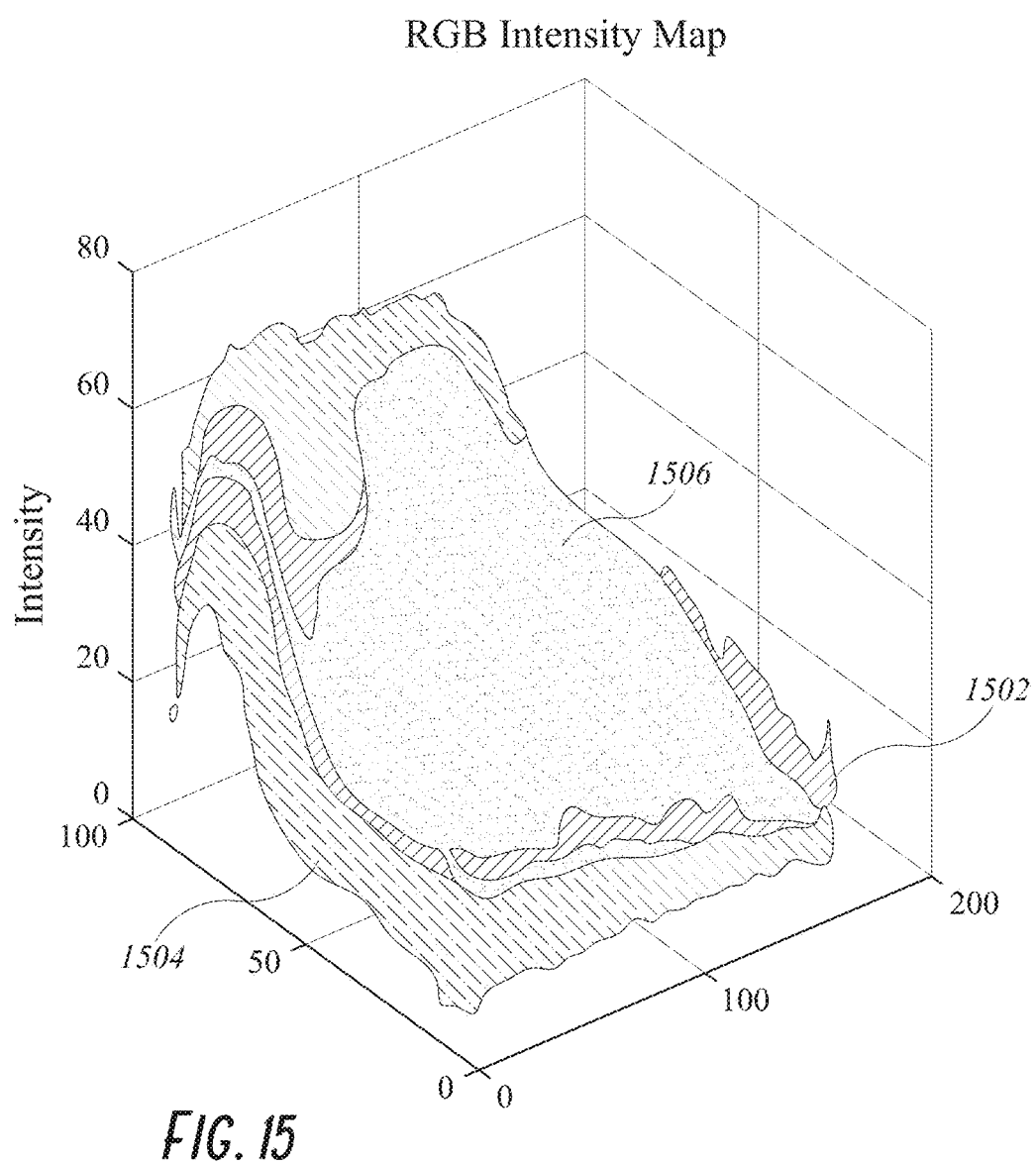
FIG. 15 illustrates an RGB intensity map for an example display with red, green, and blue layers after chromatic correction.

FIG. 15 illustrates RGB intensity maps for a display system with red, green, and blue layers having different intensities over the displayed field of view as illustrated in FIG. 14A after chromatic correction. As described below and illustrated in plot 1500, in this example the maximum R and B luminance values have been reduced to the level of the lower G luminance value in most portions of the display in order to provide chromatic uniformity.

As illustrated in FIG. 14A, prior to color correction, the luminances of the red and blue layers are much higher than that of the green layer over most of the FOV, which may result in large regions of the captured image of a white calibration image to appear purple. During color correction in this example, for each point of a depth plane, a lowest luminance value of the color layer associated with the depth plane (e.g., red, green, and blue) is identified, and luminance values for each color layer are set to the lowest luminance value for that point. For example, as illustrated in FIG. 15, color luminances of the red and blue layers 1502 and 1504 are lowered to match that of the green layer 1506 (e.g., compare RGB intensity map of FIG. 14A with RGB intensity map of FIG. 15). As a result, the luminances of the red and blue layers are corrected such that they match the intensity of the green layer, reducing the off grayscale amount of the projected image.

Image Correction Process

Image calibration refers to the characterization of a display device, relating to the image quality metrics previously defined (see, e.g., description with reference to FIGS. 7-15). Image correction refers to the corrective actions taken to improve the image quality. The image quality metrics inform the corrective actions taken which attempt to improve or optimize the display device image quality metrics. As such, image correction is tied closely to each of the image quality metrics.

Figure 16:
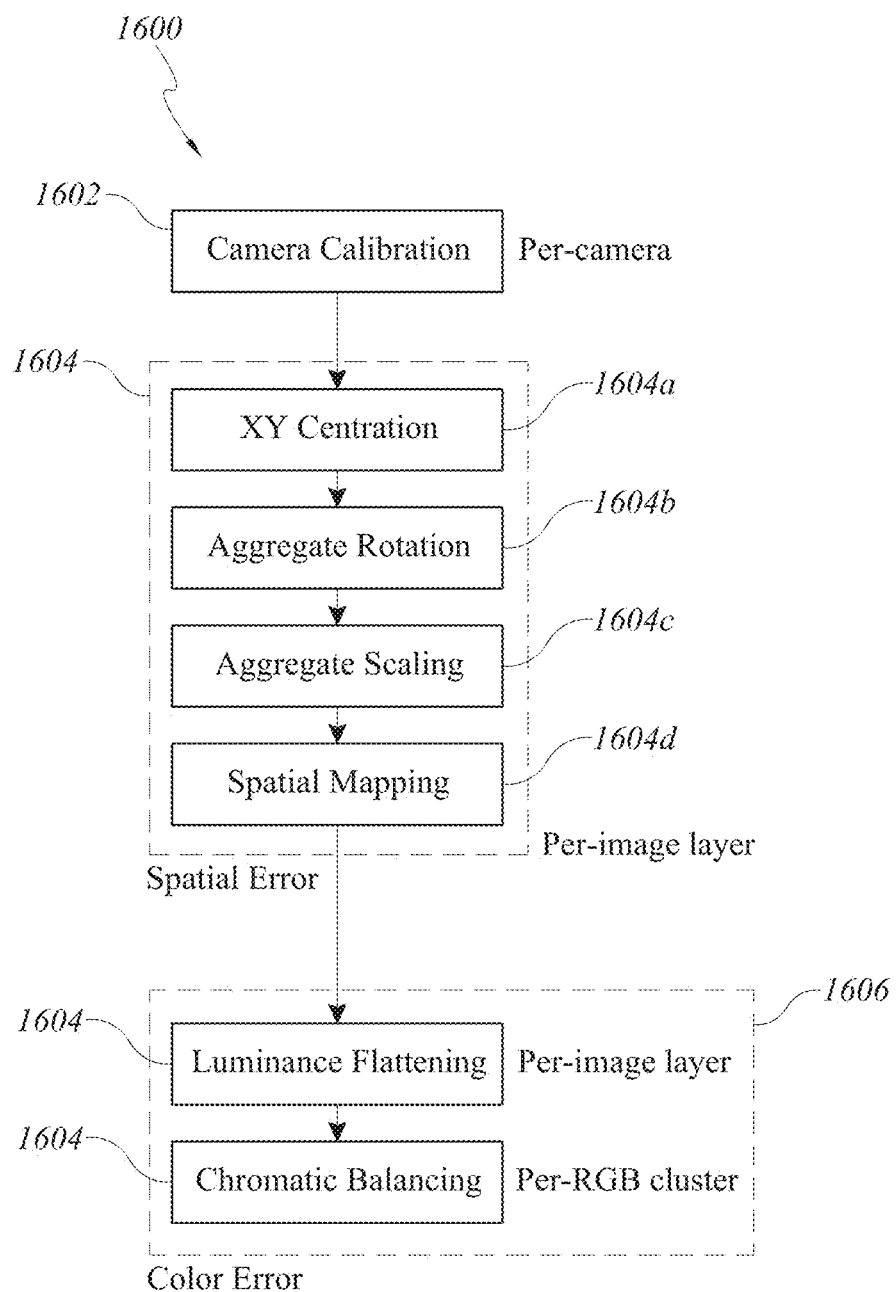
FIG. 16 is a flowchart of an example of a process for performing image correction on a display system.

FIG. 16 is a flowchart of an example of a process 1600 for performing image correction on a display system. At block 1602, a camera (e.g., camera 1806 of the metrology system 1800 described below) to be used to capture projected images is calibrated. Camera calibration includes the characterization of the accuracy of a camera in capturing and representing actual visual/display information. In order to ensure that any measured metrics from the captured images are due to the display system and not from errors associated with the camera, cameras used for image correction should be fully calibrated before image correction is attempted.

In some embodiments, camera calibration comprises performing at least one of flat field correction (e.g., making sure the intensity response of the camera is uniform across its FOV), lens distortion correction (e.g., identifying and compensating for lens distortion), or pixel scaling (e.g., identifying the relationship between the pixel size on the camera's image captures versus the pixel size of the display system). In some implementations, a display-to-camera pixel mapping can be applied to perform a transfer between display pixel values and camera pixel values. The display-to-camera pixel mapping can be based on a first global nonlinear gamma function that maps the display color pixel values to a first intermediate color space, a local, pixel-dependent coupling function that maps the first intermediate color space to a second intermediate color space, and a second global nonlinear gamma function that maps the second intermediate color space to pixel intensities in the camera color space. Details of an example display-to-camera pixel mapping are described below with reference to FIG. 21.

At block 1604, spatial error correction can be performed on the display system. Spatial error correction can comprise capturing one or more images of a projected light field using the calibrated camera, which may be used to generate a vector field showing distortion between displayed image locations and expected image locations. In some embodiments, individual vector fields are generated for each display layer. Using the generated vector field(s), one or more spatial corrections can be performed, which can include XY centration (block 1604a), aggregate rotation (block 1604b), aggregate scaling (1604c), or spatial mapping (block 1604d). In some embodiments, each of these corrections is performed on a per-layer basis.

XY centration may refer to a translational spatial error of the center of the displayed image of a display layer relative to an expected image position. Performing XY centration can comprise identifying a center point of a displayed image, and shifting the image along a determined translation vector so that the center point corresponds to an expected center position. Examples of XY centration correction are described with reference to FIG. 9A.

Aggregate rotation may refer to an overall rotational error between the displayed image and an expected position. Performing aggregate rotation can comprise identifying a center point of a displayed image, and rotating the image about the identified center point by a designated rotational amount (e.g., to a position where the pixel position error relative to the expected image position is minimized). Examples of aggregate rotation correction are described with reference to FIG. 9B.

Aggregate scaling may refer to an overall scaling error between the displayed image and an expected image. Performing aggregate scaling can comprise identifying a center point of a displayed image, and scaling the image about the identified center point by a designated factor (e.g., a factor where pixel position error relative to the expected image position is minimized). Examples of aggregate scaling are described with reference to FIGS. 9C and 9D.

While xy centration, aggregate rotation, and aggregate scaling can be used to correct linear or affine spatial errors, the displayed image of the display layer may also contain additional non-linear or non-affine spatial errors. Spatial mapping can be performed to correct to any remaining error (e.g., non-linear or non-affine error) that remains after XY centration, aggregate rotation, and aggregate scaling corrections have been performed. Spatial mapping may also be termed pixel warp and examples are described with reference to FIG. 9E.

In some embodiments, spatial errors may be separated into in-plane spatial errors and out-of-plane spatial errors (sometimes referred to as diopter errors). For example, a display layer may be first corrected for in-plane spatial errors before being corrected for out-of-plane spatial errors, or vice versa. Alternatively, in-plane spatial errors and out-of-plane spatial errors can be corrected together.

At block 1606, color error correction can be performed on the display system. Color error correction may comprise luminance flattening (block 1606a) or chromatic balancing (block 1606b). In some embodiments, luminance flattening is performed on a per-layer basis, while chromatic balancing is performed on a per color cluster basis (e.g., per RGB cluster).

Luminance flattening may refer to reducing the luminance variation across a display layer. In some embodiments, luminance flattening comprises reducing the luminances of all pixels in the displayed FOV to a minimum luminance value. Alternatively, all pixels in the displayed FOV having a luminance greater than a maximum value or a threshold value have their luminance reduced to the maximum/threshold value, while pixels with a luminance less than the maximum/threshold values may remain unchanged. In some embodiments, luminance values may be scaled, based upon a distance between the luminance and a threshold luminance value. Examples of luminance flattening are described with reference to FIGS. 12A and 12B.

Chromatic balancing may include reducing the off grayscale effect caused by mismatches in intensity between different color layers in a color cluster (e.g., an RGB cluster). Chromatic balancing can be performed by lowering the luminances of the color layers at each location in the depth plane to match that of the color layer in the color cluster having the lowest luminance at that location. For example, for each pixel in the FOV, the luminances for the red, green, and blue color layers at each location are all set to the lowest of the three color layers at that location. In some embodiments, luminances above a threshold luminance value are lowered to the threshold luminance value, or to the minimum luminance value in the color cluster at that location, whichever is greater. In some embodiments, luminances may be scaled, based upon a distance between the luminance and a threshold luminance value. Examples of chromatic balancing are described with reference to FIGS. 14A-15.

In some implementations, the image calibration (to quantify the image quality metrics) is performed for each display system during the manufacturing process. Information associated with the image quality metrics and the corrections that can be used to improve or optimize the display system can be stored in non-transitory memory associated with the display system (e.g., data module 224 or data repository 232). During use of the display system, the image correction information can be applied to the display to perform the appropriate corrections so that the user of the display system is provided an improved or optimized image that reduces or eliminates the image errors in the display. For example, the local or remote processing modules 224, 228 can use the image correction information to provide, on a real-time basis, improved images to the user. Details of example calibration processes are described below with reference to FIGS. 27 and 28.

Examples of Depth Plane Metrology

Embodiments of the display systems described herein are capable of generating a light field (see, e.g., description with reference to FIGS. 1-6). So just like a real (physical) object at a certain distance from the wearer of the display would generate a light field that impinges on the eye, a virtual object placed at a certain depth will create a (digitized) light field that would make it appear in focus at the intended depth. This allows for vergence-accomodation matching and a more convincing mixed reality display.

Even though a content creator may place a virtual object at a certain depth from the viewer in the render engine, due to imperfections of the generated light field (e.g., due to imperfections in the waveguides of the waveguide assembly 405), the virtual object may appear in focus at a different depth from what was intended. This may result in a vergence-accommodation mismatch. In some cases, different parts of the virtual object may appear to be in focus at different depths. These depth mismatches may correspond to a type of out-of-plane spatial error, such as those illustrated in FIGS. 10A-10E.

Accordingly, the present disclosure describes examples of metrology systems that can measure the quality of the light field generated by a display. Some such metrology systems can map the topology and quality of a light field generated by a display and can provide information that leads to an assessment of the quality of the light field generated by the display. Some such metrology systems can capture the vector light field (e.g., direction and magnitude) generated by a display and allow for analysis of focus and depth imperfections in the display. Spatial and chromatic calibration techniques for light field displays have been developed that utilize the information generated by the metrology systems described herein. Although embodiments of the metrology system described herein have particular application to light field displays (e.g., embodiments of the display systems 80, 100), this is not a limitation, and other embodiments of the metrology systems can be used to measure the light coming from any type of display. Embodiments of the metrology system can be used to determine a 3D distortion field, which can be used to derive useful spatial calibration information for the display. The metrology system also can be used for binocular calibration and monocular RGB and inter-depth-plane calibration.

Figure 17A:
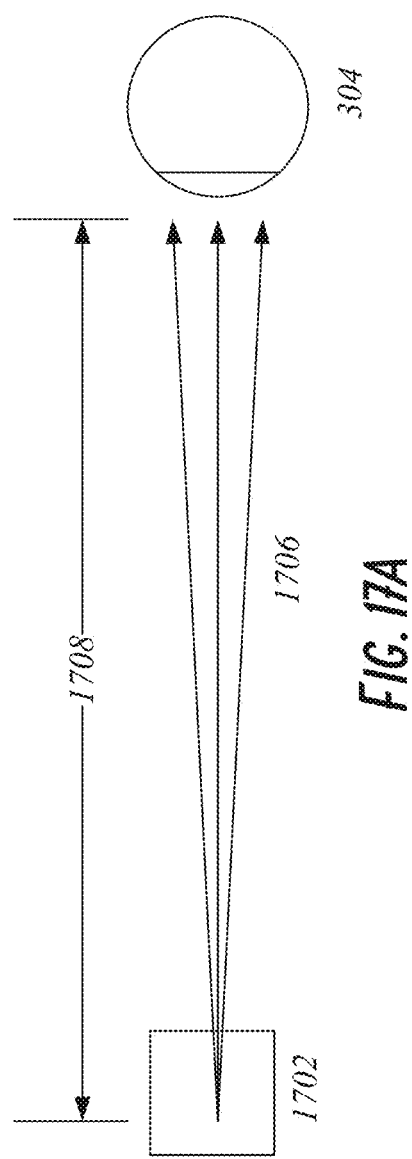
FIGS. 17A and 17B illustrate examples of objects viewed with a normal light field and an imperfect light field.

FIG. 17A illustrates an example of an object 1702 viewed by an eye 304 having a normal light field. The object 1702 may correspond to a real object or a virtual object generated with a light field that is substantially free of imperfections. Light rays 1706 associated with a point on the object 1702 appear to diverge from a single point, resulting in the point of the object 1702 appearing to be in focus at a distance 1708 from the eye 304.

Figure 17B:
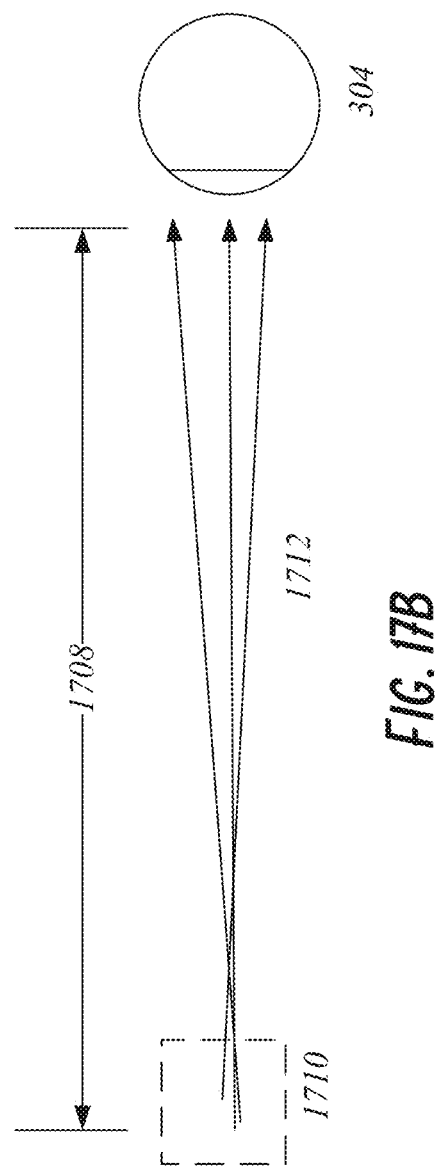

FIG. 17B illustrates an example of an object 1710 viewed with an imperfect light field. The object 1710 may correspond to a virtual object, such as a virtual object generated using a display system (e.g., the display system 400 as illustrated in FIGS. 4 and 6). Due to imperfections in the generated light field, for example due to imperfections in the waveguides 420, 422, 424, 426, 428, 604 light rays 1712, which are intended to correspond to a particular point on the object 1710, may appear to diverge from different points, or exhibit divergence that is otherwise different from what is intended. As a result, the object 1710 may appear to be out of focus at distance 1708. In addition, different parts of object 1710 may appear to be in focus at different depths or distances.

A metrology system can be used to measure the quality of a light field generated by a display. FIG. 18 illustrates an example of a metrology system 1800 for measuring light field quality of a display 1802. The display 1802 generates a light field having light rays 1804 directed towards a camera 1806. The display device 1802 may correspond to a stacked waveguide assembly (e.g., the stacked waveguide assembly 405, as illustrated in FIG. 4). Although the light rays 1804 are illustrated as being substantially parallel, this is for illustration, and the light rays 1804 may be projected in different directions (e.g., divergent), in order to convey different depths of the one or more virtual objects represented in the light field. Additionally, the light rays 1804 may be non-parallel due to imperfections in the display 1802 (see, e.g., FIG. 17B).

In some embodiments, the camera 1806 can be used to capture at least a portion of the generated light field, in order to measure, for example, perceived depths of a virtual object represented in the light field. The camera 1806 can be configured to focus on a particular depth or distance (hereinafter also referred to as "focus depth"). In some embodiments, this may be done using lens having a small depth of focus (DOF). For example, the DOF may be less than the Z-distance over which imperfections in the display typically cause the focus depth to depart from the intended focus depth (e.g., less than the distance between the peak of the depth map 1924 and the intended focus depth 1922 shown in FIG. 19C). In other examples, the DOF may be less than a factor times the distance between the camera and the display, where the factor may be less than about 0.1, less than about 0.01, less than about 0.001, etc. The camera 1806 may be configurable to capture specific portions of the light field or the entire light field. The camera 1806 may be configured to capture a portion of the light field associated with a particular virtual object to be displayed using the light field. The camera 1806 may be positioned such that it is able to capture images that are substantially similar to what would be perceived by eye 304. The camera 1806 and the display 1802 can be movable relative to each other to map out the light field. For example, the relative motion can be parallel to the display 1802 (e.g., in the X-direction shown in FIG. 18 or in the Y-direction (not shown), which is perpendicular to X and Z) or perpendicular to the display 1802 (e.g., in the Z-direction shown in FIG. 18). In other implementations, scanning optics (not shown) can be used to relatively scan the camera 1806 and the display 1802. In some embodiments, the camera 1806 may be used to capture portions of the generated light field in order to determine a distortion map (such as that illustrated in FIG. 8) that can be used to identify spatial errors in the projected image (e.g., in-plane spatial errors as illustrated in FIGS. 9A-9E or out-of-plane spatial errors as illustrated in FIGS. 10A-10E). In addition, the camera 1806 may be used to identify luminance or chromatic errors in the generated light field (e.g., as illustrated in FIGS. 11-15)

In some embodiments, the camera 1806 is movable to be oriented in different directions. For example, although the camera 1806 is illustrated as orthogonally facing the display 1802, the camera 1806 may also be rotated (e.g., along the Y-axis of rotation or the X-axis of rotation) such that it faces different angles relative to the display 1802, allowing the camera 1806 to measure the light field generated by the display 1802 in different directions or orientations.

In various embodiments, the camera 1806 can be a digital camera, for example, a short-focus digital camera. In other embodiments, the camera 1806 can be a light field camera.

The camera 1806 can be connected to a controller 1808, which may be used to control the focus depth of camera 1806, the field of view of camera 1806, exposure times, the relative movement of the cameral 806 and the display 1802, and the like. In some embodiments, the controller 1808 may correspond to controller 450 as illustrated in FIG. 4. The controller 1808 can comprise a hardware processor and non-transitory data storage.

Figure 19A:
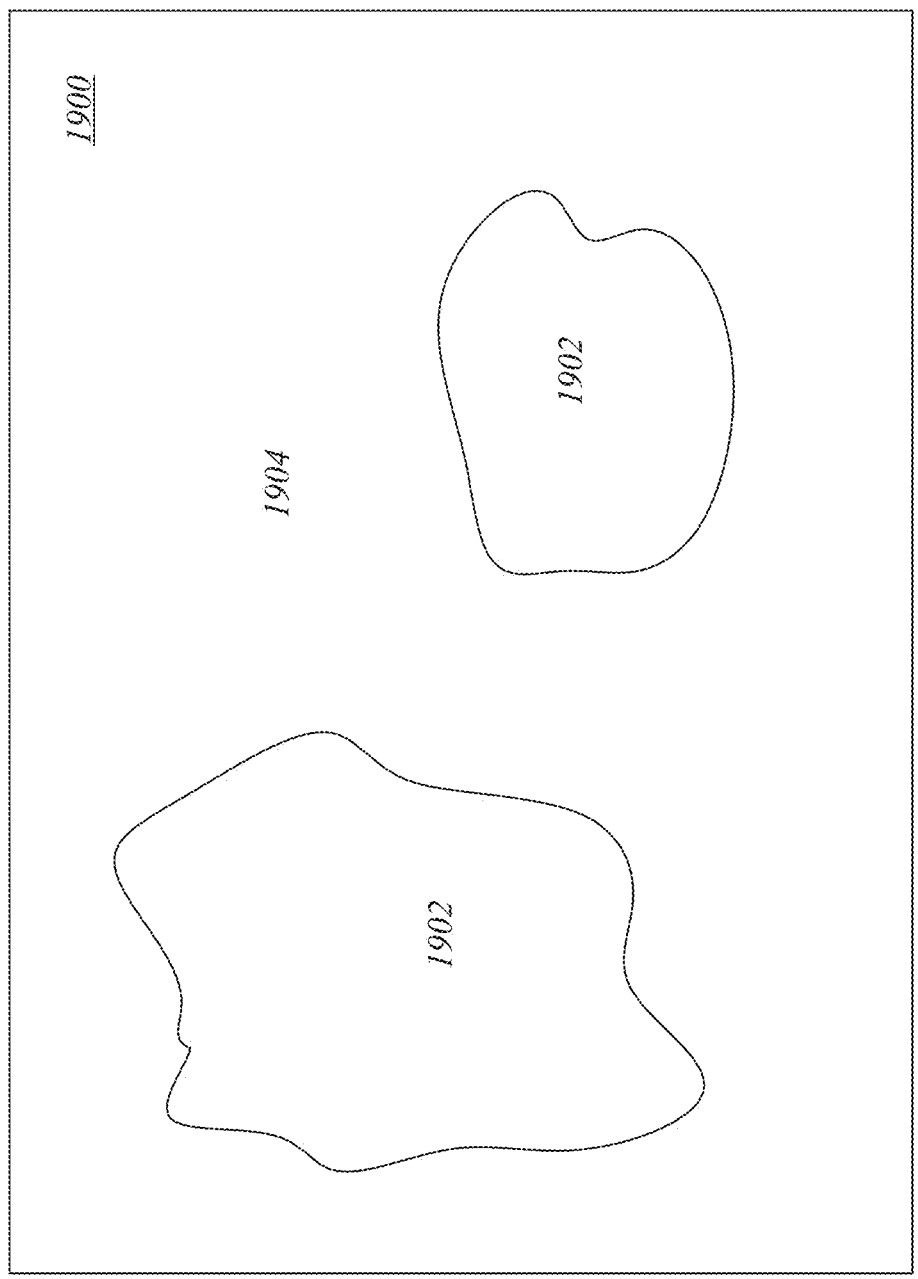
FIG. 19A is a diagram of an example of an image that may be captured by a camera focused on a particular focus depth.

FIG. 19A is a diagram of an example of an image 1900 that may be captured by a camera (e.g., the camera 1806) that is focused on a particular focus depth. The image 1900 may contain one or more regions 1902 that are in focus, as well as one or more regions 904 that are out of focus. As the camera 1806 can be configured to focus at different focus depths, the regions of the image that are in focus or out of focus may change. For example, if the camera is changed to focus on a different focus depth, the regions 1902 may appear out of focus, while portions of region 1904 may come into focus. By capturing multiple images of the light field over a plurality of different focus depths, perceived depths for various regions of the light field can be determined. For example, each pixel of the images captured by the camera may be associated with a particular focus depth corresponding to a focus depth where the portion of the light field corresponding to the pixel is in focus. A depth map or graph may be constructed that maps regions of the generated light field with their perceived depths. In addition, the depth map or graph may also specify the focus depths that were intended to be projected by the display, thereby allowing for comparison between the intended focal depths and the actual measure focal depths of virtual objects displayed in the light field.

Figure 19B:
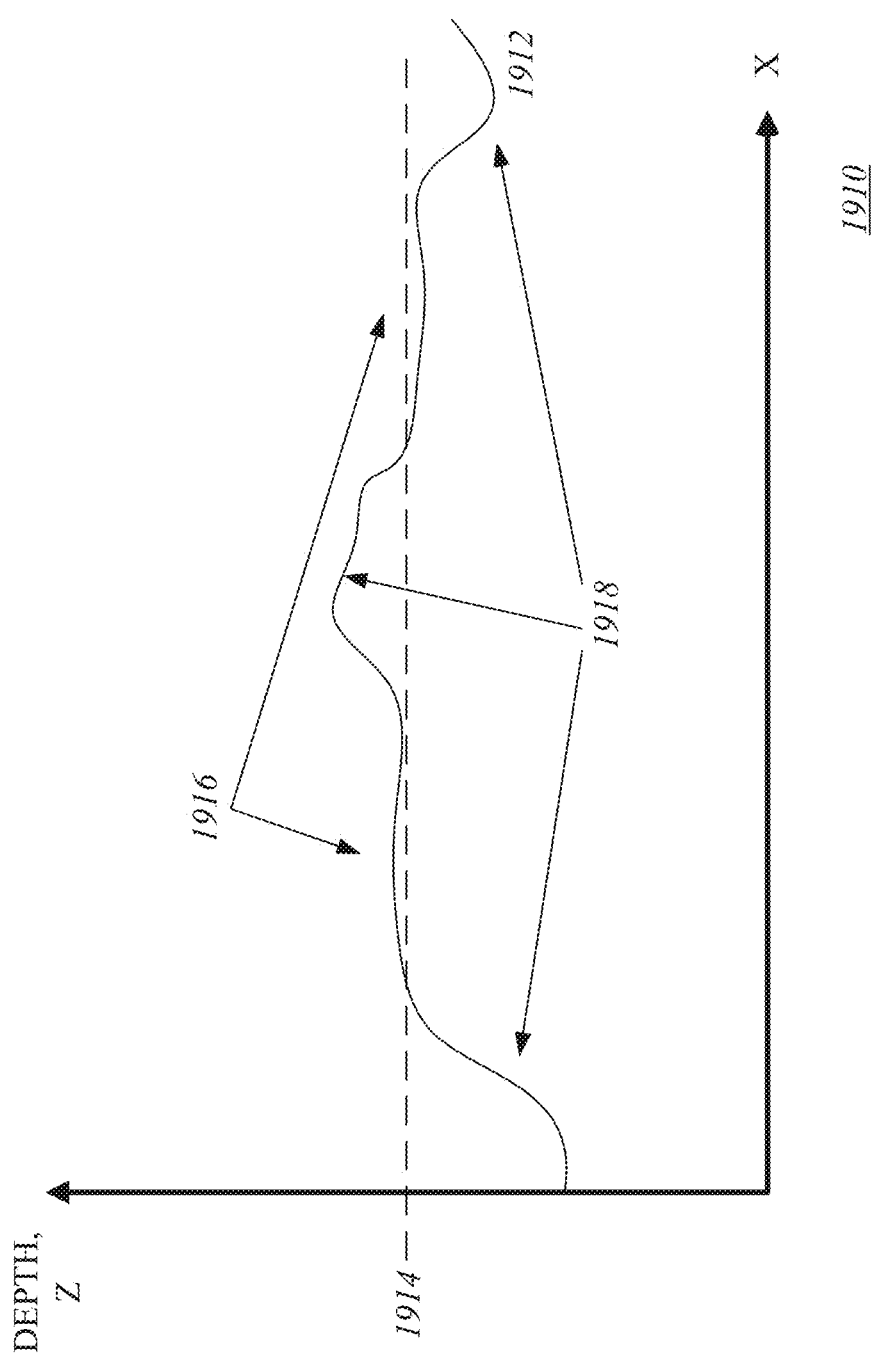

FIG. 19B is an example of a depth graph that schematically illustrates focal depth measurements that can be performed by an embodiment of the metrology system 1800. The graph 1910 plots the measured focal depth 1912 of a generated light field along a line across the light field emitted from the display 1802 (e.g., along a horizontal X-axis of the light field, as illustrated in FIG. 18). In some embodiments, the graph 1910 may be generated by sweeping a focus depth of the camera 1806 across a plurality of different focus depths. For example, the camera 1806 may be focused at a focus depth 1914 (illustrated by the horizontal dashed line). In a perfect display, the light field generated by the display will be such that the actual, measured depth of the virtual object is exactly the intended depth, but in a real display the two could be different because of imperfections in the display. As such, any regions of the light field (e.g., regions 1916) with a measured focus depth that are close to focus depth 1914 may be perceived as being substantially in focus, while regions of the light field (e.g., regions 1918) with a measured focus depth that is significantly different from focus depth 1914 may be perceived as out of focus.

FIG. 19C illustrates an example of a depth map that may be generated based upon one or more captured images. The depth map 1920 contains an intended depth position 1922 where images generated by the display 1802 should be in focus (illustrated as a horizontal plane in FIG. 19C) as well as a measured depth map 1924 showing the focus depth (Z) where the image is actually in focus. Comparison between the intended focus depth 1922 and the measured focus depth 1924 allows imperfections of the light field generated by the display 1802 to be identified and quantified across the field of view (FOV) of the display.

For example, if the intended focus depth is $Z_0$ for light that should be focused at horizontal position $(X_0, Y_0)$, and the measured focus depth at that position is Z, then $(Z-Z_0)$ is a measure of the focus imperfections of the display at the position $(X_0, Y_0)$. In some implementations, the actual horizontal position (X, Y) where the light ray is focused can be measured. In some such implementations, a vector measure of the actual focus position relative to the intended focus position, $(X, Y, Z)-(X_0, Y_0, Z_0)$, can be used to characterize the imperfections in the light field generated by the display. This vector measure of the display imperfections provides a 3D representation of both in-plane and out-of-plane (e.g., diopter) errors. In some embodiments, only in-plane errors are measured (and calibrated for) using a 2D vector error measure $(X, Y)-(X_0, Y_0)$. In some cases, the focus errors can be determined on a pixel-by-pixel basis for the display. However, due to the large number of pixels in many displays (e.g., many millions of pixels), the focus error data may be determined for only portions of the display or for groups of pixels that sample the display (e.g., a 10×10 or a 100×100 sample across the display). The checkerboard pattern need not be square, and can be designed to conform to the pixel structure of the display.

Figure 20:
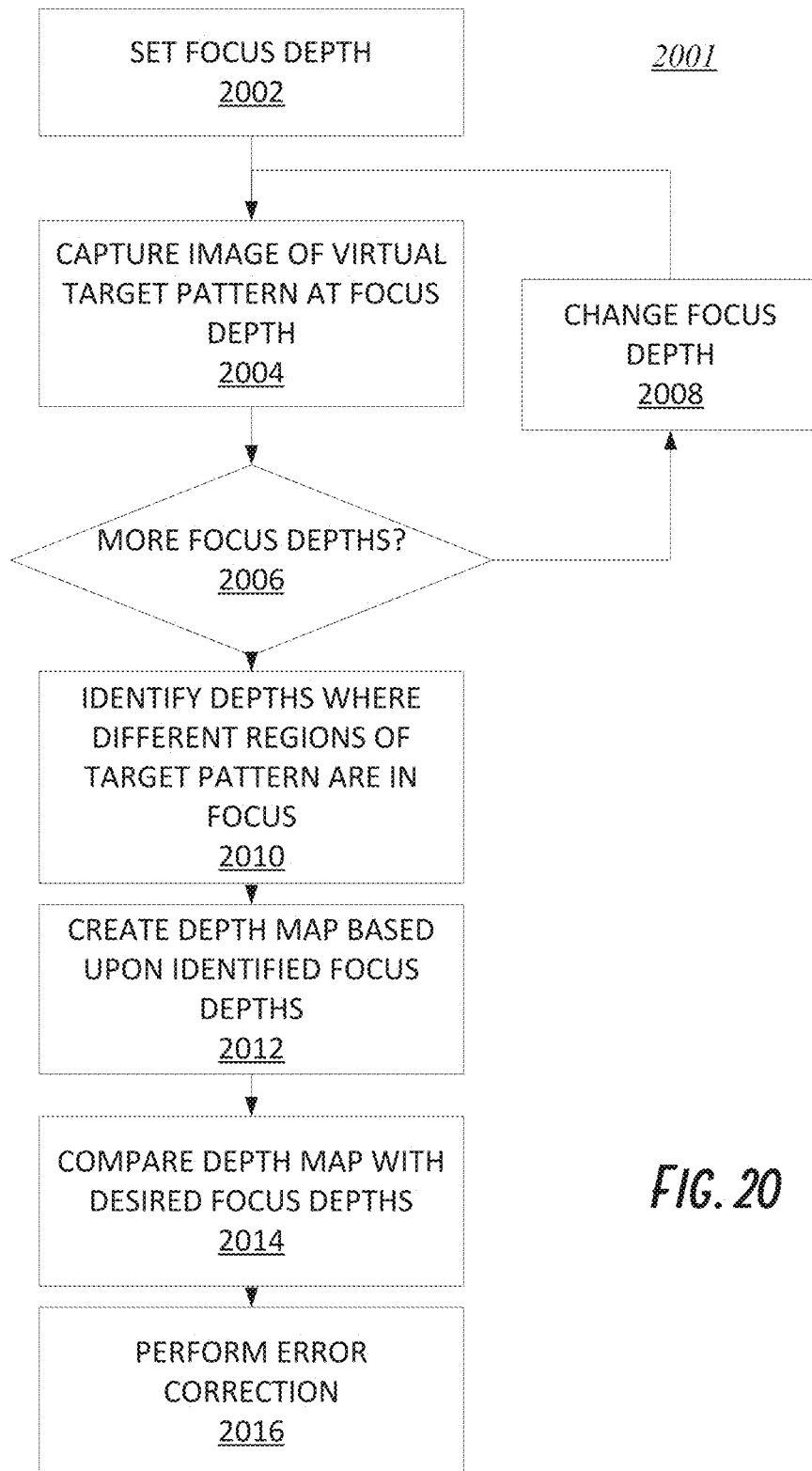
FIG. 20 is a flowchart of an example of a process for measuring a quality of a virtual target pattern generated by a light field display.

FIG. 20 is a flowchart of an example of a process 2001 for measuring a quality of a virtual target pattern generated using a light field display. The process 2001 can be performed by the metrology system 1800, for example, by the controller 1808. The virtual target pattern, in some implementations, is a checkerboard pattern with an array of alternating light and dark regions. The checkerboard pattern may be used to sample portions of the display (e.g., a 10×10 or 100×100, or other size checkerboard) or it may have a size corresponding to the number of pixels in each dimension of the display. In other cases, pixel-by-pixel data can be acquired by sequentially turning on and off groups of one (or more) pixels and acquiring images of the pixels that are turned on. The checkerboard pattern (or the sequence of turning pixels on/off) may include a random stochastic sequence of light and dark regions or a geometric pattern of light and dark regions or any other type of calibration pattern. Examples of checkerboard patterns and pixel on-off sequences are described below with reference to FIGS. 22-23B. At block 2002, an initial focus depth may be set. In some embodiments, this may comprise configuring a depth of focus lens on the camera. The initial depth of focus may correspond to any depth that may be represented in the virtual target pattern. For example, the initial depth may correspond to a minimum or maximum depth associated with the virtual target pattern.

At block 2004, an image of the virtual target pattern is captured at the selected focus depth. In some embodiments, the image may comprise a portion that is in focus and a portion that is out of focus. In some embodiments, the scope of the image may be focused on a particular virtual object associated with the virtual target pattern. In other embodiments, the image may correspond to the entire light field comprising multiple virtual objects. The image may comprise focus depth information on a pixel-by-pixel basis across the virtual target pattern.

At block 2006, a determination is made as to whether there are additional focus depths for which an image should be taken. If it is determined that there are additional focus depths, then at block 2008, a new focus depth may be selected. In some embodiments, the number focus depths may be based at least in part upon a number of different depths that may be displayed by the display system (e.g., a number of depth planes 306, as illustrated in FIG. 3 or a number of waveguides in the waveguide assembly illustrated in FIG. 4). In some embodiments, if the image is focused on a particular virtual object, the range of focus depths may be based upon one or more depths associated with the virtual object (e.g., a minimum depth and maximum depth associated with the virtual object).

If it is determined that there are no more focus depths for which an image should be taken, then at block 2010, the captured images of the virtual target pattern can be analyzed in order to identify depths, Z, or lateral positions, (X, Y), at which different regions of the target pattern are actually in focus. For example, each captured image of the virtual target pattern corresponding to a particular focus depth may contain a portion that is in focus and a portion that is out of focus. In some embodiments, each image may be divided into one or more regions corresponding to regions of the light field. Auto-focus techniques may be used to determine at which depths each region was in focus. In some embodiments, each region may correspond to a pixel.

At block 2012, a depth map may be created based at least in part upon the measured focus depths (or lateral positions). The depth map may comprise any type of data structure or visualization that maps light field locations with focus depths. For example, a depth map may comprise depth information (e.g., Z-axis focus depth or Z-axis focus depth in combination with a measurement of lateral focus position (X and/or Y position)) for one or more pixels of the captured images. In some embodiments, the pixels may correspond to a pixel cloud associated with a target virtual object. As such, the depth map may specify the actual perceived depth of the virtual object when seen through the display optics.

At block 2014, the depth map may be compared with one or more desired focus depths, wherein the desired focus depths correspond to depths at which one or more virtual objects are intended to be displayed. By examining the difference between the actual perceived depth of the virtual object against the focus depths at which the virtual object is intended to appear, imperfections and/or deviations in the light field may be identified.

At block 2006, error correction may be performed based at least in part upon the comparisons between the depth map and the desired focus depths. The error correction can compensate for imperfections in the light field display or content of images projected from the display.

The process 2001 can be repeated for each waveguide in the waveguide assembly 405 of a light field display to map the imperfections of each of the waveguides. In some cases, there can be multiple waveguides corresponding to multiple depth planes as well as multiple waveguides corresponding to multiple colors (e.g., red (R), green (G), and blue (B)). For example, for some displays there are three color planes for each depth plane, thus a waveguide assembly with two depth planes can have 2×3=6 waveguides. The camera 1806 can be a camera that is sensitive to the multiple colors or a combination of cameras, each sensitive to a subset of the colors. The focus depth information obtained by the metrology system 1800 can be used to determine the spatial distribution of focus errors as well as the distribution of chromatic (color) imperfections of the display.

In some embodiments, instead of capturing multiple images at multiple different focus depths (e.g., using a digital camera with a swept focus), a light field camera can be used to capture the light field generated by the display 1802. The captured light field can be analyzed for focus and/or depth imperfections. By analyzing the vectors of light rays in the captured light field, focus depths for various regions may be determined. The identified focus depths may then be compared to one or more intended focus depths, and appropriate error correction may be performed (as in block 2016) For example, a vector measure of the actual focus position (X, Y, Z) relative to the intended focus position ($X_0$, $Y_0$, $Z_0$), can be determined as: vector error=(X, Y, Z)–($X_0$, $Y_0$, $Z_0$), and can be used to characterize the imperfections in the light field generated by the display.

Example Methods for Chromatically Balancing a Display

As discussed above, some implementations of a full color display produce a tri-stimulus response on the viewer's retina by combining red (R), green (G), and blue (B) wavelengths of light projected from the display. An ideal display has spatially uniform luminance for these three color layers; however, a real display may have some amount of variation in the luminance across the field of view because of hardware imperfections. If this variation is different for the different color layers, it creates non-uniformity in chromaticity across the field of view (FOV) of the display (e.g., as illustrated in FIG. 11). This disclosure describes examples of a method to correct for chromatic variations and which attempts to make the chromaticity across the FOV uniform. For example, the intensities of the respective color layers (e.g., R, G, and B) of the display can be tuned such that the white point of the display is substantially uniform across the FOV.

In some implementations, the light field metrology system described herein can be used to characterize the color balance of a display. For example, a digital color camera can take images of the display (e.g., using metrology system 1800 as illustrated in FIG. 18) from which the chromatic response of the display can be determined, for some or all of the pixels of the display. In many displays, there are three color layers (e.g., R, G, and B), however, the present methods are not limited to RGB or 3-color displays. The present method can be applied to any number of color layers (e.g., 2, 3, 4, 5, 6, or more) and to any choice of colors (e.g., cyan, magenta, yellow, black).

Examples of the measured color balance for a particular implementation of an RGB display are shown in FIG. 14A (before chromatic calibration) and FIG. 15 (after chromatic calibration). FIGS. 14A and 15 include plots (1400, 1500, respectively) of the distribution of R, G, and B intensities (vertical axis) across the pixels of the display (horizontal axes). FIG. 14B include a plot 1408 of the maximum color off-balance (vertical axis) for the pixels of the display (horizontal axis), showing the mean and the mean plus or minus the maximum error, prior to color correction.

As discussed above, FIG. 14A shows that the uncalibrated display has substantial chromatic non-uniformity across the pixels of the display. The red and blue color responses are approximately the same, with the R and B intensities peaking toward the right of the plot 1400. The green color response is generally smaller than the R or B responses and decreases toward the right of the plot 1400. FIG. 15 shows that—after application of the chromatic calibration to be described below—the calibrated display has a more uniform chromatic response across the pixels of the display.

Figure 25A:
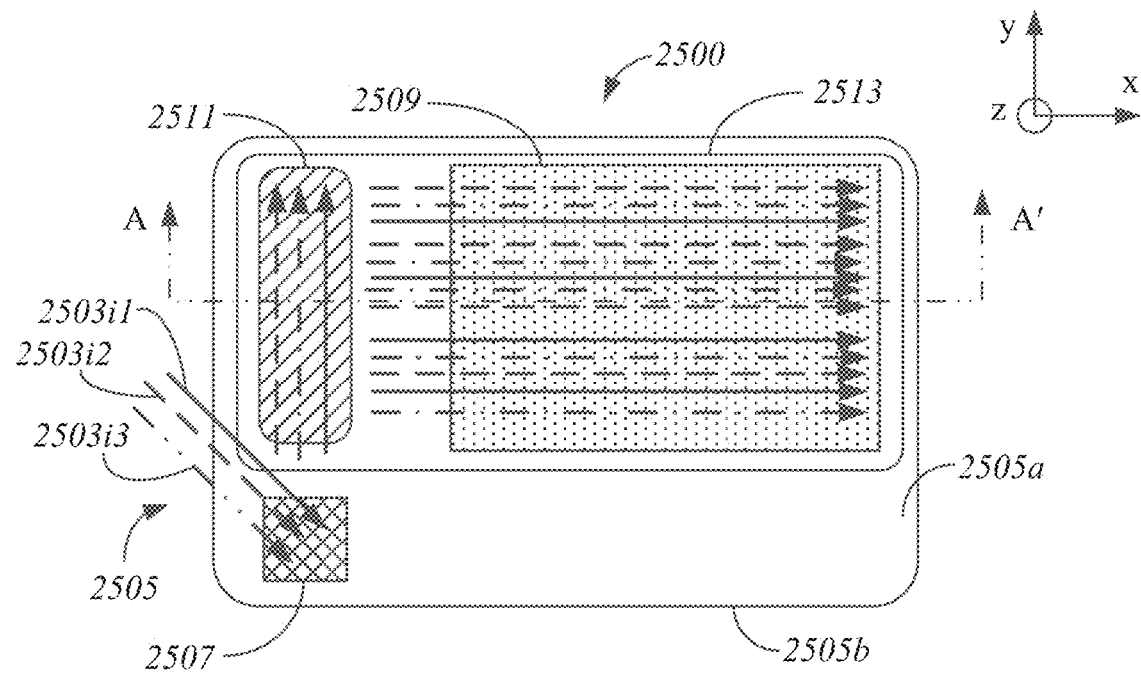
FIG. 25A is a top view that schematically illustrates an example of a display including a waveguide, an incoupling optical element, a light redistributing element, and an outcoupling optical element.
Figure 25B:
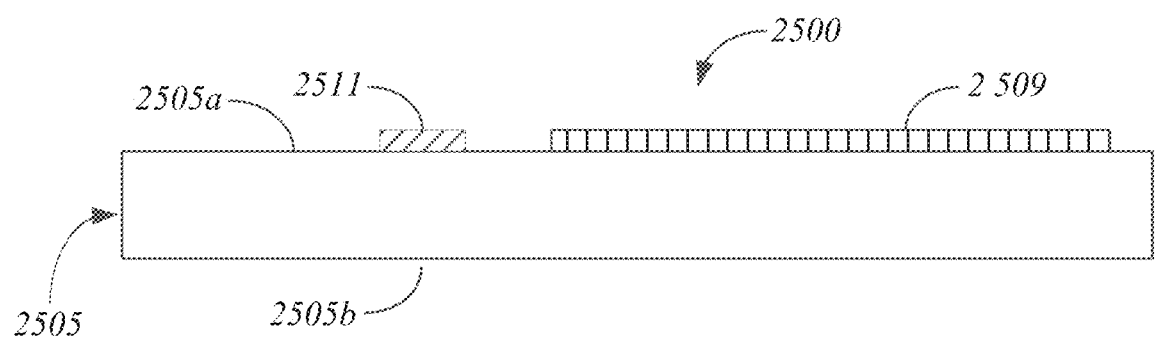
FIG. 25B is a cross-sectional view of the display depicted in FIG. 7A along the axis A-A'.
Figure 26:
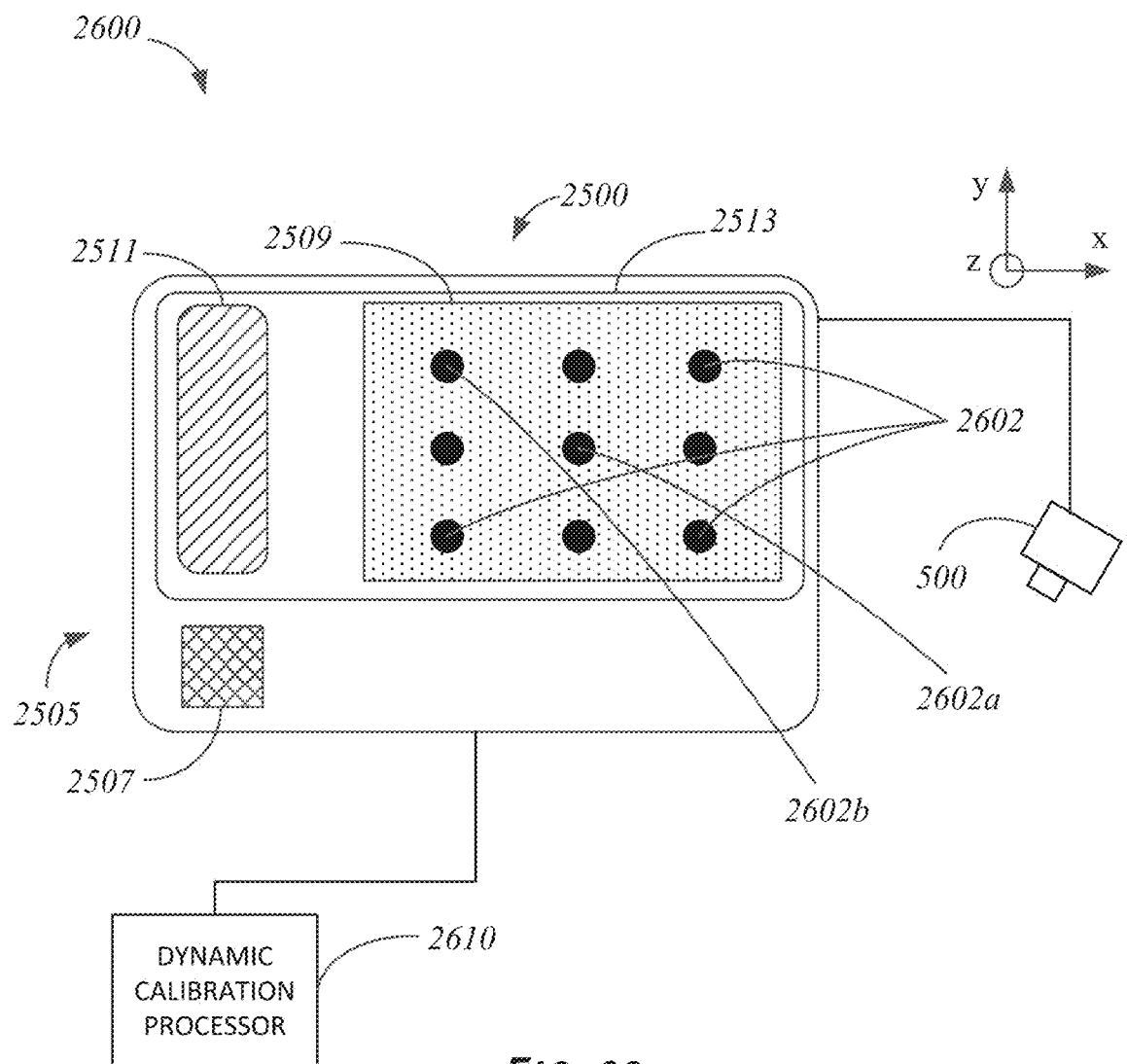
FIG. 26 schematically illustrates an example of a dynamic calibration system for a display for which a calibration can be applied to correct for spatial and/or chromatic errors at a grid of reference positions (indicated by dots).

Embodiments of the chromatic balancing systems and methods described herein provide techniques for tuning intensities of at least some of the color layers in a multi-color display such that a white point of the display is substantially uniform across the FOV of the display. In various implementations, the display can be a light field display. For example, the display can have the capability to present color images at multiple depth planes to a viewer. Embodiments of the chromatic balancing systems and methods can be applied to chromatically balance the display 208 (FIG. 2), the display system 400 (FIGS. 4-6), and the display 2500 (FIGS. 25A, 25B, 26).

The human eye does not perceive light levels in a linear fashion. For example, as compared to an ideal, linear display, the human eye is more sensitive to changes in dark tones that to similar changes in light tones, which permits the human visual system to operate over a wide range of brightness levels. Real world displays also may not provide a precisely linear brightness response. Further, digital images are often encoded to represent tonal levels that are more perceptually uniform. Human visual perception, display output, and image encodings are commonly modeled as following an approximately power law relationship with respect to brightness or color levels. For example, an output level is proportional to an input level raised to the power gamma: $V_{out} \propto V_{in}^{\gamma}$. This nonlinear, power-law, behavior is commonly referred to as gamma correction, gamma encoding, or simply gamma.

In certain embodiments, if the luminance flatness of the respective color layers in the display is almost uniform across the FOV of the display, chromatic balancing can include scaling the intensities of the respective color layers to achieve a uniform chromatic balance across the display. A display may have suitable luminance flatness if variations in the luminance across the FOV of the display are less than 1%, less than 5%, less than 10%, in various embodiments. Due to the gamma response of the display and human visual perception, this straightforward scaling may have certain disadvantages in some cases.

If the color layers of the display do not have substantial luminance flatness, chromatic balancing may include more than merely scaling the intensities of the respective color layers. For example, chromatic balancing may attempt to balance the white point independently at each pixel (or over a group of pixels) of the display. In some such implementations, chromatic balance across the FOV of the display can be achieved without also flattening the luminance across the FOV. Luminance flattening can be performed additionally or alternatively to chromatic balancing.

A goal of chromatically balancing the display is for a human viewer of the display to perceive a uniform color balance across the FOV of the display. To measure and tune the color balance of the display, a calibration camera (rather than a human eye) is used to record images of the display output. It may be assumed that the camera is representative of the human perception of the display output and that if the camera images of the display are chromatically balanced, then the human viewer's perception of the display will also be chromatically balanced.

In some implementations, the following model is used for the transfer between pixel values for the color layers of the display and the pixel values for the colors measured by the calibration camera. In the following example, there are three color layers, which are assumed to be R, G, and B; however, this is for illustrative purposes and is not a limitation. In other cases, any number and hues of the color layers are usable with embodiments of the chromatic balancing technique. Further, prior to applying the model, an appropriate scaling between pixel sizes of the display and the camera can be accounted for.

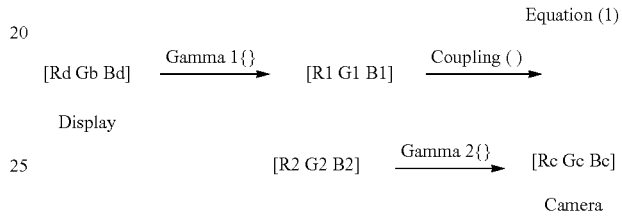

Equation (1)

In Equation (1), [Rd, Gd, Bd] represent the intensity values for an RGB image sent to the display. In many cases (e.g., standard RGB or sRGB), the intensity values are between 0 and 255. Gamma1 { } represents a first nonlinear gamma function (with exponent $\gamma_1$) that maps the display color levels to an intermediate color representation [R1 G1 B1]. Coupling( ) represents a function that maps the color values [R1 G1 B1] to a second intermediate color representation [R2 G2 B2]. The Coupling( ) function can be a linear function, for example, a 3×3 matrix (in the case of 3 color layers). In other implementations, the Coupling( ) function can be nonlinear. Gamma2{ } represents a second nonlinear gamma function (with exponent $\gamma_2$) that maps the second intermediate color representation [R2 G2 B2] to pixel intensities [Rc Gc Bc] registered by the calibration camera.

In some implementations, the first and second gamma functions are global functions over the FOV of the display (e.g., the exponents $\gamma_1$ and $\gamma_2$ are constant across the FOV). The Coupling( ) can be a local (pixel-dependent) function that varies from pixel to pixel across the FOV. The per-pixel color mapping provided by the Coupling( ) function allows per-pixel chromatic balancing.

To determine the functions Gamma1 { }, Gamma2{ }, and Coupling( ), a series of one or more images of the display can be captured by the camera and may be analyzed by an analysis system programmed to perform iterative optimization algorithms (e.g., hill climbing, local search, simplex methods, genetic algorithms, etc.) to find a suitable fit for the gamma and coupling functions that provide a reasonable chromatic balance for the display. The analysis system may use feedback during the iterative process by capturing additional image(s) of the display as the analysis system searches for a suitable fit for the gamma and coupling functions. For example, the functions Gamma1{ }, Gamma2{ }, and Coupling( ) can be determined by iteratively adjusting these functions to improve or optimize the chromatic balance of the camera image across the FOV of the display. The functions can be iteratively adjusted until the white point of the camera images acquired during the iterative process is substantially uniform across the FOV of the display. In various implementations, a substantially uniform white point distribution is associated with a variation in white point across the FOV of less than 10%, less than 5%, or less than 1% of the white point value in the color system in which it is measured. For example, a color space provided by the International Commission on Illumination (CIE) may be used. In some implementations, a substantially uniform white point distribution may be associated with a variation in white point that is smaller than a threshold amount based on the just noticeable difference (JND) of the color space. In some implementations, the gamma transfer functions Gamma1{ } and Gamma2{ } are iteratively computed first and then the Coupling( ) function is computed once the gamma functions (e.g., the exponents $\gamma_1$ and $\equiv_2$) have been computed.

A production process for calibrating displays in a manufacturing environment can automatically characterize displays as they are transported along a production line. For example, at a suitable point in the production process, the calibration camera and the analysis system described herein can perform the iterative analysis to obtain the gamma transfer functions and the coupling function for a particular display and store the resulting gamma and coupling functions in a memory associated with the display. The display then has the capability of automatically performing chromatic balancing.

During use of a particular display, once the gamma transfer functions, Gamma1{ } and Gamma2{ }, and the Coupling( ) function are known for the particular display, then the appropriate display pixel value [Rd Gd Bd] can be input to Equation (1) to achieve a chromatically balanced output. For example, the gamma exponents and the Coupling( ) function determined for a particular display can be stored in a memory accessible to the display and accessed to transform input image pixel color values to provide a chromatically balanced output from the display. In some implementations, the local processing and data module 224 of the wearable display system 200 can store the gamma transfer and coupling functions and the processing module can utilize Equation (1) to output real-time chromatically balanced images (FIG. 2). In other implementations, the controller 450 of the display system 400 can perform the chromatic balancing based on Equation (1) and stored gamma and coupling functions (FIG. 4). In yet other implementations, the dynamic calibration processor 2610 of the dynamic calibration system 2600, as will be described below, can perform the chromatic balancing for the display 2500 (FIG. 26) using Equation (1) and the stored gamma and coupling functions.

Embodiments of the method 2700 or process flow 2805 for dynamically calibrating a display based on eye-tracking described with reference to FIGS. 27, 28, respectively, described in greater detail below, can perform the chromatic balancing and other error correction/calibration functions. For example, the calibration accessed at block 2720 of the method 2700 can include the gamma and coupling functions, and at block 2730 chromatic imperfections of the display can be corrected for by use of Equation (1) and the accessed gamma and coupling functions. As another example, block 2880 of the process flow 2805 can access the gamma and coupling functions and apply them during the calibration.

Figure 21:
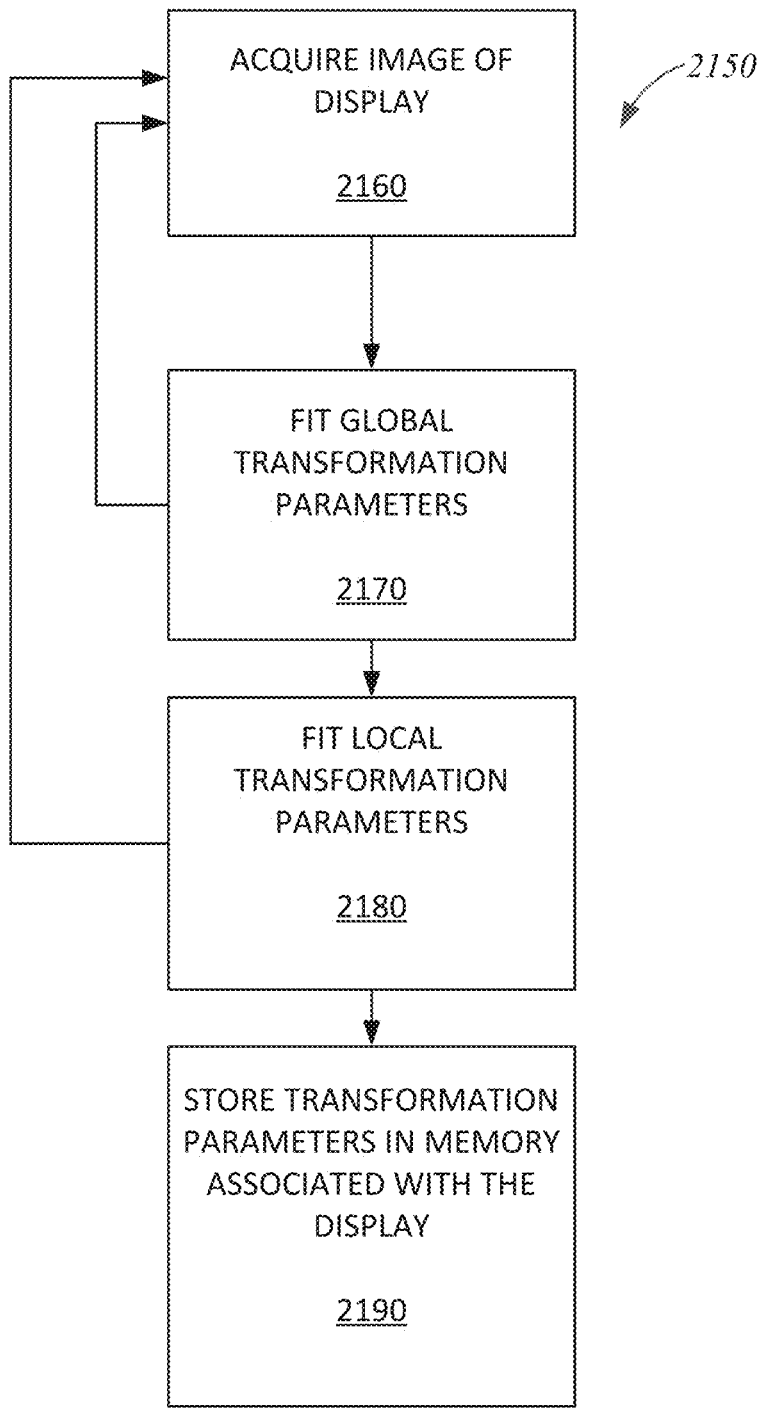
FIG. 21 is a flowchart that illustrates an example of a method for calibrating a display.

FIG. 21 is a flowchart that illustrates an example of a method 2150 for calibrating a display. The display can be a light field display. The display can be the display 208 (FIG. 2), the display system 400 (FIGS. 4-6), and the display 2500 (FIGS. 25A, 25B, 26). The method 2150 can be performed by an analysis system (including a camera and an analysis program executed by computer hardware, such as the metrology system 1800 shown in FIG. 18) as part of a production line of a manufacturing process for displays (e.g., as part of the process 2805 described with reference to FIG. 28). The method 2150 can be performed as part of the camera calibration described with reference to block 1602 of the process 1600 described with reference to FIG. 16. In some implementations, the method 2700 applies Equation (1) to determine an appropriate transformation between the display and the camera (assumed to represent the visual perception of a human viewer of the display). At block 2160, an image of the display is acquired by the camera. At block 2170, global transformation parameters of the transform between display and camera are determined. Global transformation parameters can include parameters that do not vary across the FOV of the display (e.g., parameters that are not pixel dependent). For example, the global transformation parameters can include the Gamma1{ } and Gamma2{ } functions. In some cases, the method 2150 may return to block 2160 to acquire one or more additional images as part of an iterative, feedback process for determining the global transformation parameters. After a suitable fit to the global transformation parameters is obtained, the method 2150 moves to block 2180 where local (e.g., pixel dependent) transformation parameters are fit to the camera images. For example, the local transformation parameters can include the Coupling( ) function (e.g., values of this function at pixel locations across the FOV of the display). In some cases, the method 2150 may return to block 2160 to acquire one or more additional images as part of an iterative, feedback process for determining the local transformation parameters. In some implementations, after acquiring the additional image(s) at block 2160, the method 2150 may jump back to block 2180 to continue fitting the local transformation parameters, rather than passing the block 2170, because the global transformation parameters were previously determined. After a suitable fit to the local transformation parameters are fit to the camera images, the method 2150 moves to block 2190 where the local and global transformation parameters are stored in a memory associated with the display (e.g., the local data module 71). As discussed above, at block 2720 of the method 2700 for dynamically calibrating a display the local and global transformation parameters can be accessed as part of the calibration for the display, and at block 2730 the local and global transformation parameters and Equation (1) can be applied to produce a chromatically balanced image from the display.

Although described for the case of chromatic balance for a display, the present systems and methods are not so limited and can be applied to correct for other chromatic (or spatial) imperfections of a display (e.g., any of the chromatic or spatial imperfections described above). For example, as described above, a display may exhibit luminance flatness variations, and embodiments of the disclosed analysis techniques can determine a luminance flatness calibration that correct for luminance flatness imperfections. Additionally or alternatively, a display may exhibit spatial imperfections including in-plane translation, rotation, scaling, or warping errors as well as out-of-plane (e.g., focal depth) errors. Embodiments of the disclosed analysis techniques can determine calibration(s) for some or all of such spatial errors.

Examples of Display Calibration Using Calibration Patterns

Imperfections in a display may cause virtual objects projected by the display to appear distorted, spatially or chromatically. In order to correct these distortions, the display may first be calibrated by measuring the distortions and then performing any necessary error corrections (e.g., using the metrology system 1800 illustrated in FIG. 18). Display calibration can involve projecting a calibration pattern using the display, e.g., a checkerboard pattern (e.g., as illustrated in FIG. 7), and capturing the resulting image with a camera. The captured image can then be processed to determine the distortion at feature point locations of the calibration pattern by quantifying an error between expected positions of pattern feature points versus their measured positions. For displays with separate color layers (e.g., red (R), green (G), and blue (B) layers), this calibration can also correct for color registration and image quality.

Figure 22:
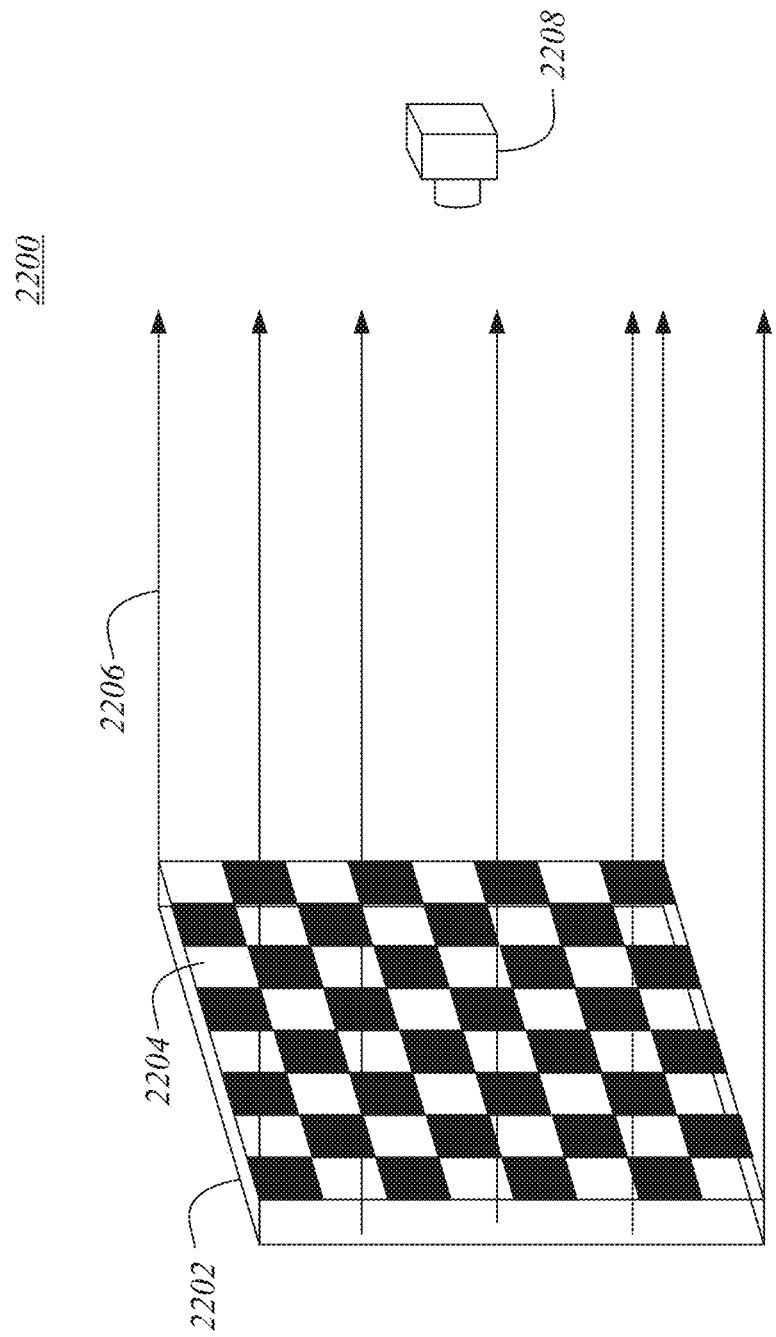
FIG. 22 schematically illustrates an example of a system that uses a calibration pattern to calibrate a display.

FIG. 22 illustrates an example calibration system 2200 using a calibration pattern. A display 2202 can be configured to project the calibration pattern 2204 as a generated light field 2206, which can be captured using an imaging device such as a camera 2208. In some embodiments, the display 2202 comprises a stacked waveguide assembly (e.g., as illustrated in FIG. 4 or 6) or other type of light field display. In some embodiments, the camera 2208 (or the display 2202) is configured to be movable, such that the system 2200 will be able to capture images of the light field 706 from different lateral positions, depths, or angles. In some embodiments, the calibration system 2200 may be similar to the metrology system 1800 of FIG. 18. For example, the display 2202, light field 2206, and camera 2208 may correspond to the display 1802, light field 1804, and camera 1806 of metrology system 1800.

In this example, the calibration pattern 2204 comprises a checkerboard pattern, in which different regions have different (e.g., alternating) optical characteristics such as, e.g., luminance (e.g., bright or dark), chromaticity, hue, saturation, color, etc. The checkerboard pattern can be a regular pattern (e.g., as illustrated in FIG. 22) or an irregular pattern. The calibration pattern 2204 contains a plurality of feature points that may be used to measure distortion amounts in images captured by the camera 2208. For example, feature points of a checkerboard pattern include points on the borders and corners between the checkerboxes of the checkerboard or points in the centers of the checkerboxes. The calibration pattern 2204 can be the same size as or smaller than the display 2202. Smaller calibration patterns can be shifted across the display 2202 and the camera 2208 may take multiple images of the calibration pattern 2204 as it shifts across the display when the system 2200 measures the distortions of the display 2202. In some implementations, the calibration pattern 2204 can be stochastically sampled according to a mathematically optimized sequence.

Due to errors in the display 2202 (e.g., imperfections in one or more waveguides or lenses), the light field 2206 may contain imperfections causing virtual objects or patterns in the light field to appear distorted. This may create deviations between the expected focus positions (lateral or depth) of feature points on the calibration pattern 2204 and their actual measured positions in images captured by the camera 2208. By comparing the actual measured positions of feature points of the calibration pattern 2204 with the expected positions of these feature points, the deviations caused by distortions can be identified and measured. In some implementations, the calibration pattern includes color information so that color errors of the display 2202 can be quantified by the system 2200. In some embodiments, a distortion map may be generated to be used for error correction of spatial or color errors of the display 2202 (e.g., as illustrated in FIG. 8).

In some implementations, each checkerbox 2304 in the calibration pattern 2204 corresponds to a single pixel of the display 2202, which can allow direct measurement of display imperfections on a pixel-by-pixel basis. In other implementations, each checkerbox 2304 corresponds to a plurality of pixels (e.g., an N×M grid of pixels, with at least one of N or M greater than 1). In some such implementations, the coarse quality of the calibration pattern means that distortion information is obtained at sample points and can be interpolated to obtain per-pixel distortion information. For example, in the checkerboard pattern illustrated in FIG. 23A, distortion information may be measured for pattern locations corresponding to feature points 2302, such as points on the borders, corners, or centers of the checkerboxes. Distortion information for other points in the checkerbox regions 2304 of the pattern can be inferred or interpolated from the measured distortion values associated with nearby feature points 2302.

Checkerboard projection-capture procedures identify the feature points (e.g., edges of checkerboxes) and quantify the error in expected versus measured positions for distortion calibration. The feature points may be sparse compared to the number of pixels in the display. For example, a high definition display may comprise millions of pixels (e.g., 2.1 million pixels for a 1920×1080 pixel resolution), while the number of checkerboxes 804 in the calibration pattern may be substantially less (e.g., for a 50×50, 100×100, 500×500 pattern). As such, embodiments of the system 2200 using a single projection-capture approach yield sampled measurements that can be interpolated to estimate per pixel distortions.

In order to obtain accurate per-pixel distortion information for a display, embodiments of the system 2200 can automate the task of obtaining distortion information by implementing different or shifted calibration patterns. Different calibration patterns can be projected or the same pattern can be incrementally shifted so that the entire pixel space of the display 2202 is measured. Automated image projection and capture or different shifted calibration patterns allow for pixel-accurate mapping of distortion of the display 2202.

By automatically repeating the checkerboard projection-capture but with, for example, 1-pixel shifted calibration patterns, the system 2200 can obtain improved distortion information on a per-pixel basis. For example, the camera 2208 can obtain an image of the pattern each time the pattern is shifted. With each repeated image capture, the feature points of the projected calibration pattern correspond to a different set of pixels. This shifting of the calibration pattern can be repeated until a dense sampling of the distortion field of the display is acquired. For example, the checkerboard may be projected and shifted through a number of positions corresponding to the pixels of a checkerbox of the checkerboard, allowing for distortion information to be measured for each pixel of the display. In other implementations, the shift can be different from one pixel, e.g., 2, 3, 4, 5, 8, 16, or more pixels. The shift can be different for different directions of the display, e.g., the x-shift need not be the same as the y-shift.

Figure 23B:
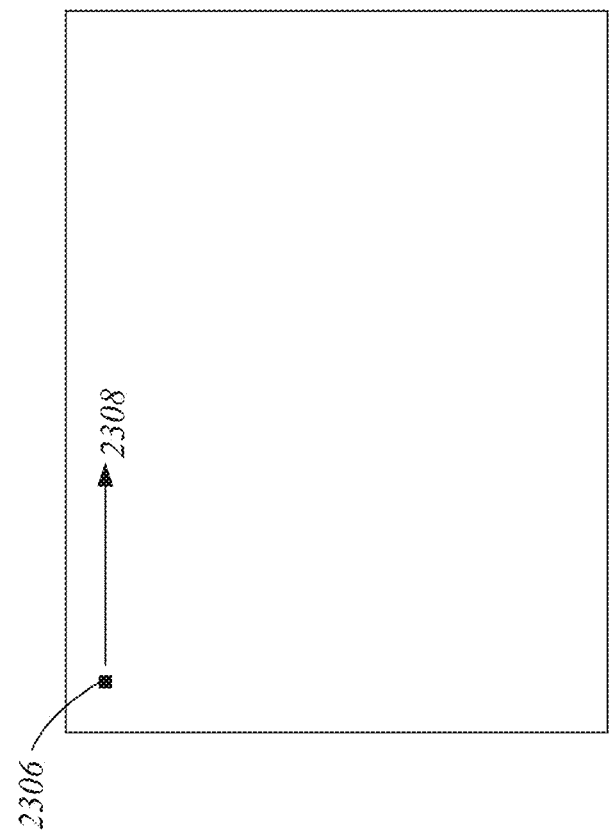
FIG. 23B illustrates an example single-pixel calibration pattern.
Figure 23A:
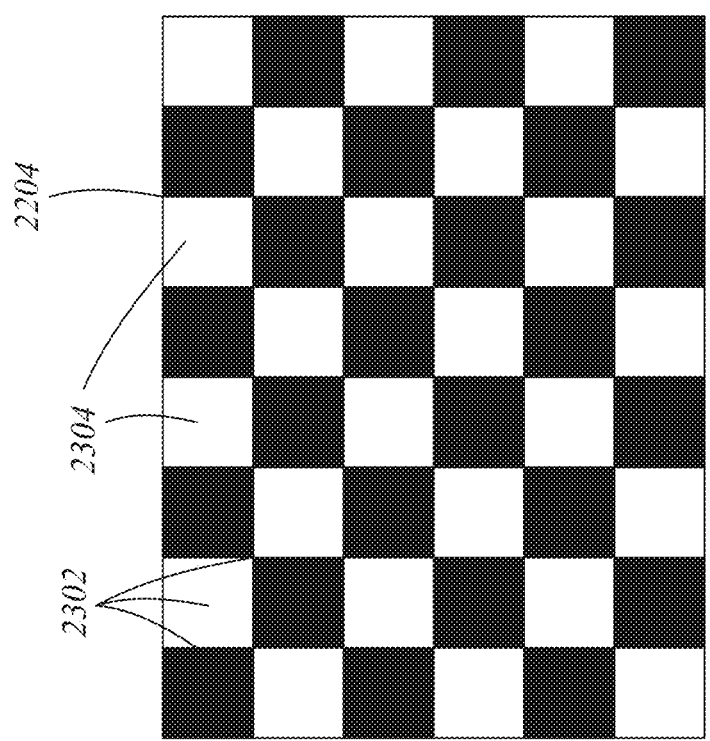
FIG. 23A illustrates an example checkerboard calibration pattern.

Although the present disclosure refers primarily to checkerboard patterns for purposes of example, it is understood that other types of patterns may also be used. For example, other geometric patterns can be used, random stochastic patterns can be used, or any other type of calibration or test pattern can be used. In some embodiments, a calibration pattern where only a single pixel in the display is turned on at a time is used. FIG. 23B illustrates an example single pixel calibration pattern, wherein only a single pixel 2306 has been turned on. From a captured image of each resulting frame, the per-pixel transfer function from display device to viewer scene can be quantified. After each image capture, the location of the displayed pixel 2306 may be shifted across the display (e.g., in a direction indicated by arrow 2308) a set distance (e.g., a single pixel). By automatically sweeping through each pixel of the display, a complete quantification of the quality of the display device can be obtained. In other implementations, the shift of the illuminated pixel can be a different number of pixels, e.g., 2, 3, 4, 5, 8, 16 or more pixels, the shift can be different for different lateral directions on the display, or a plurality of pixels (rather than a single pixel as illustrated in FIG. 23B) can be illuminated in each image capture.

Figure 24:
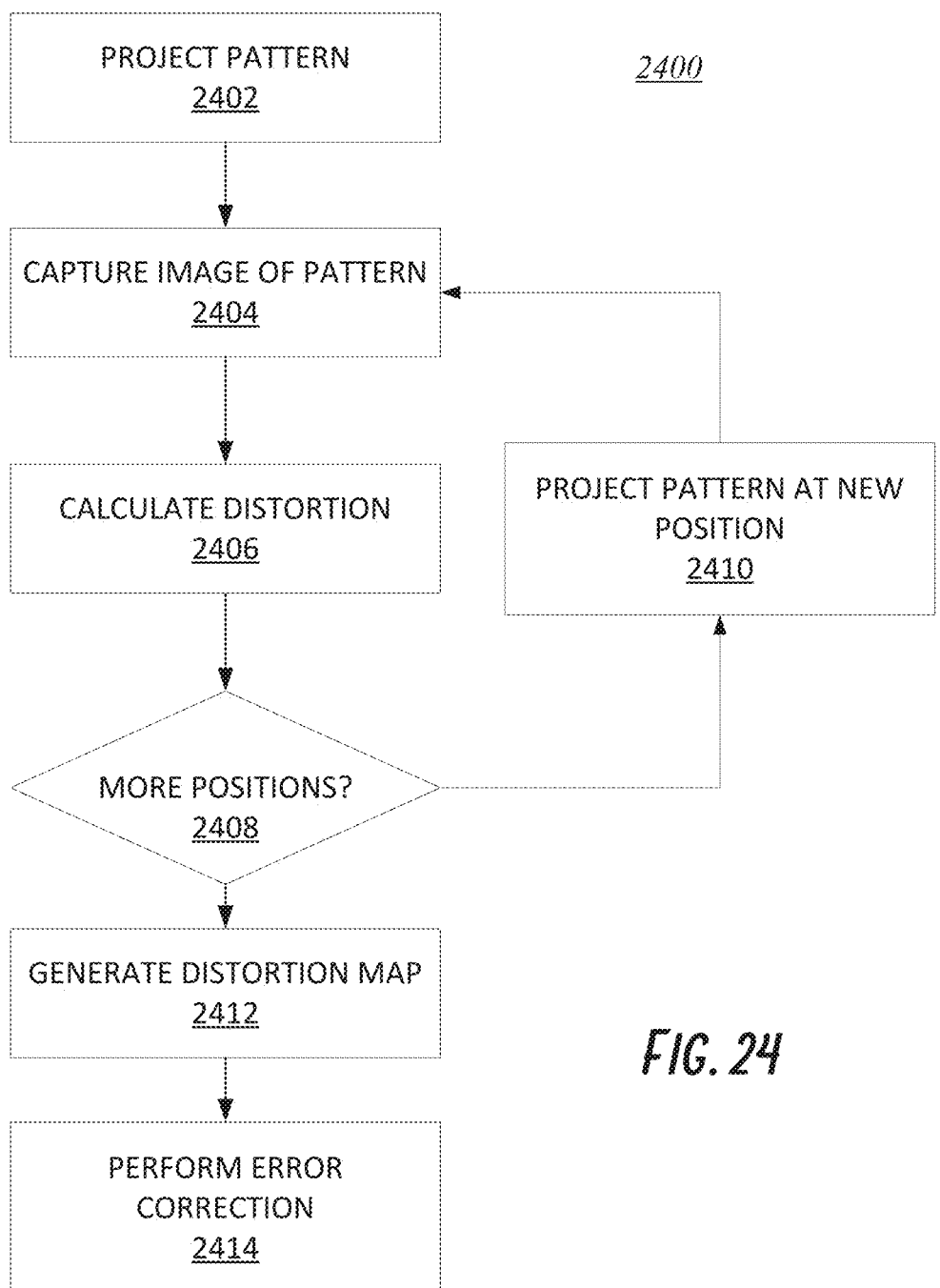
FIG. 24 is a flowchart of an example process for calibrating a projected light field.

FIG. 24 is a flowchart of an example process 2400 for performing automated display calibration. The process 2400 can be performed, for example, as part of the processes 2700 and 2805 described with reference to FIGS. 27 and 28. At block 2402, a calibration pattern is projected by a display. The calibration pattern may comprise any pattern having one or more feature points that may be generated by the display. In some embodiments, the calibration pattern comprises a checkerboard pattern. In other embodiments, other types of calibration patterns, such as a single-pixel pattern, may be used.

At block 2404, an image of the displayed calibration pattern is captured using a camera or other type of image capture device. If errors or imperfections are present in the light field generated by the display, portions of the displayed calibration pattern may become distorted, wherein one or more feature points in the calibration pattern may appear at locations different from what is expected. Luminance or chromaticity of the image may be different from what is expected from the calibration pattern.

At block 2406, distortion corresponding to an error between expected locations of feature points of the calibration pattern and the captured locations of the feature points is determined. For example, for a single-pixel calibration pattern, distortion information can be calculated for the particular pixel location of the pattern. For a checkerboard pattern, distortion information can be calculated for the pixels corresponding to feature points of the checkerboard (e.g., edges, corners, or centers of the checkerboxes). In some implementations, luminance or chromaticity errors between the luminance or chromaticity of the calibration pattern and the corresponding luminance or chromaticity of the captured image of the calibration pattern are determined.

At block 2408, a determination is made as to whether there are any additional positions across the display for which the calibration pattern should be projected. If it is determined that there are additional positions, then at block 2410, the calibration pattern may be shifted and projected at a new position, and an image of the calibration pattern may be captured (block 2404) and used to calculate a distortion amount (block 2406). In some embodiments, the number of different positions for displaying the calibration pattern is based upon the calibration pattern used. For example, for a single-pixel calibration pattern, the number of positions may correspond to the total number of pixels displayable by the display. For a checkerboard pattern, the number of positions may be based upon a number of pixels in each checkerbox.

Once the calibration pattern has been displayed at all desired positions, at block 912, the calculated distortions may be aggregated and used to generate a distortion map comprising distortion information for each pixel (or a group of pixels) of the display. The distortion information can include spatial distortions due to focus errors (e.g., in-plane errors or out-of-plane errors) or color errors (e.g., luminance or chromaticity errors). At block 2414, error correction may be performed on the display using the calculated distortion map. For example, distortion information (e.g., the distortion map) can be stored by the data modules 224, 232 of the wearable display system 200 illustrated in FIG. 2. The processing modules 224, 228 of the wearable display system 200 can use the distortion information to correct for spatial or chromatic errors in the display 208 so that the images perceived by the wearer 204 of the display system 80 are at least partially compensated.

In some embodiments, the process 2400 illustrated in FIG. 24 can be performed for a light field display. As an example, the process 2400 can be performed for each waveguide in the waveguide assembly 405 of the light field display to calibrate each of the waveguides. In some cases, there can be multiple waveguides corresponding to multiple depth planes as well as multiple waveguides corresponding to multiple colors (e.g., red (R), green (G), and blue (B)). For example, for some displays there are three color planes for each depth plane, thus a waveguide assembly with two depth planes can have 2×3=6 waveguides. In addition, in addition to pixel position, color registration and quality may also be calibrated in order to correct chromatic (color) imperfections of the display. For example, the camera 2208 can be a camera that is sensitive to the multiple colors or a combination of cameras, each sensitive to a subset of the colors, and be used to capture images of light field 2208 where deviations between captured color or luminance values of a projected pattern 2204 and expected color or luminance values may be identified.

Example Waveguide Display

FIG. 25A is a top view that schematically illustrates an example of a display 2500 including a waveguide 2505, an incoupling optical element 2507, a light redistributing element 2511, and an outcoupling optical element 2509. FIG. 25B schematically illustrates a cross-sectional view of the display 2500 depicted in FIG. 25A along the axis A-A'.

The waveguide 2505 may be part of the stack of waveguides 405 in the display system 400 shown in FIG. 4. For example, the waveguide 2505 may correspond to one of the waveguides 420, 422, 424, 426, 428, and the outcoupling optical element 2509 may correspond to the light extracting optical elements 460, 462, 464, 466, 468 of the display system 400.

The display 2500 is configured such that incoming incident light of different wavelengths represented by rays 2503$i$1, 2503$i$2 and 2503$i$3 (solid, dashed, and dash-double-dotted lines, respectively) are coupled into the waveguide 2505 by the incoupling optical element 2507. The incoming incident light to the waveguide 2505 can be projected from an image injection device (such as one of the image injection devices 440, 442, 444, 446, 448 illustrated in FIG. 4). The incoupling optical element 2507 can be configured to couple wavelengths of the incident light into the waveguide 2505 at appropriate angles that support propagation through the waveguide 2505 by virtue of total internal reflection (TIR).

A light redistributing element 2511 can be disposed in the optical path along which the different wavelengths of light 2503$i$1, 2503$i$2 and 2503$i$3 propagate through the waveguide 2505. The light distributing element 2511 can be configured to redirect a portion of the light from the incoupling optical element 2507 toward the outcoupling optical element 2509, thereby enlarging the beam size of the interacting light along the direction of propagation. Accordingly, the light distributing element 2511 may be advantageous in enlarging the exit pupil of the display device 2500. In some embodiments, the light distributing element 2511 may thus function as an orthogonal pupil expander (OPE).

The outcoupling optical element 2509 can be configured to redirect incoupled light that is incident on the element 2509 out of the x-y plane of the waveguide 2505 at appropriate angles (e.g., in the z-direction) and efficiencies to facilitate proper overlay of light at different wavelengths and at different depth planes such that a viewer can perceive a color image of good visual quality. The outcoupling optical element 2509 can have an optical power that provides a divergence to the light that exits through the waveguide 2505 such that the image formed by the light that exits through the waveguide 2505 appears (to the viewer) to originate from a certain depth. The outcoupling optical element 2509 can enlarge the exit pupil of the display 2500 and may be referred to as an exit pupil expander (EPE) that directs light to the viewer's eye.

The incoupling optical element 2507, the outcoupling optical element 1009, and the light distributing element 2511 can include a plurality of gratings, such as, for example, an analog surface relief grating (ASR), Binary surface relief structures (BSR), Volume Holographic Optical Elements (VHOE), Digital Surface Relief structures, and/or volume phase holographic material (e.g., holograms recorded in volume phase holographic material), or switchable diffractive optical elements (e.g., a Polymer Dispersed Liquid Crystal (PDLC) grating). In various embodiments, the incoupling optical element 2507 can include one or more optical prisms, or optical components including one or more diffractive elements and/or refractive elements. The various sets of diffractive or grating structures can be disposed on the waveguide by using fabrication methods such as injection compression molding, UV replication, or nano-imprinting of the diffractive structures.

The incoupling optical element 2507, the outcoupling optical element 1009, or the light distributing element 2511 need not be a single element (e.g., as schematically depicted in FIGS. 25A and 25B) and each such element can include a plurality of such elements. These elements can be disposed on one (or both) of the major surfaces 2505a, 2505b of the waveguide 2505. In the example shown in FIGS. 25A and 25B, the incoupling optical element 2507, the outcoupling optical element 2509, and the light distributing element 2511 are disposed on the major surface 2505a of the waveguide 2505.

In some embodiments, one or more wavelength selective filters may be integrated with or disposed adjacent to the incoupling optical elements 2507, the outcoupling optical element 2509, or the light distributing element 2511. The display 2500 illustrated in FIG. 25A includes the wavelength selective filter 2513, which is integrated into or on a surface of the waveguide 2505. The wavelength selective filters can be configured to filter out some portion of light at the one or more wavelengths that may be propagating along various directions in the waveguide 2505. The wavelength selective filters can be absorptive filters such as color band absorbers.

Examples of Dynamic Calibration of AR or VR Displays Based on Eye-Tracking

Display systems can be calibrated (spatially and/or chromatically) to produce an improved quality image. In the case of certain near-eye displays (e.g., the stacked waveguide assembly 405 shown in FIG. 4 as used in the display 208 shown in FIG. 2 or the display 2500 described with reference to FIGS. 25A and 25B), this calibration may be reasonably accurate for a nominally fixed eye position (e.g., the wearer looking straight ahead through the display 208) but less accurate for other eye pose directions or positions. Thus, the calibration for the display might be dependent on eye-position or eye-direction. If a calibration for only a single (e.g., fiducial) position is used, there may be errors that are not corrected for when the wearer is looking toward a different position (e.g., away from the fiducial position).

This disclosure describes also examples of dynamic calibration for wearable display systems 400 that use eye-tracking, where the spatial and/or color calibration can change in response to a change in the eye position (or eye direction in some cases). Certain such calibrations provide a feed-forward calibration system that can result in the maintenance of a high quality image for a wide range of eye-motion. In some implementations, the calibration is performed in real-time via hardware processors (e.g., the processing modules 224, 228 of the wearable display system 200 or the controller 450 of the display system 400) without the addition of specialized hardware.

The calibration can compensate (or correct) for spatial errors and/or chromatic (color) errors in a field of view of the display. For example, spatial errors can include in-plane translation, rotation, scaling, or warping errors as well as out-of-plane (e.g., focal depth) errors. Chromatic errors can include luminance flatness or chromatic uniformity errors for each of the colors that can be displayed (e.g., R, G, and B).

FIG. 26 schematically illustrates an example of a dynamic calibration system 2600 for the display 2500 for which a calibration can be applied to correct for spatial and/or chromatic errors at a grid of reference positions (indicated by dots 2602). The dynamic calibration system 2600 can include the display 2500, an inward-facing imaging system such as the eye-tracking camera 500, and a dynamic calibration processor 2610 (that retrieves and applies the calibration). FIG. 26 schematically illustrates another example of the display 2500, which includes embodiments of optical elements described with reference to FIGS. 25A and 25B. The outcoupling optical element 2509 directs light to the viewer's eye. As the viewer's eye is positioned at different positions 2602 relative to the outcoupling optical element 2509, the optical calibration of the display 2500 for that particular eye position (shown schematically as the dots 2602 in FIG. 26) may be different. For example, the calibration if the eye is positioned over the position 2602a, near the center of the outcoupling optical element 2509, may be different from the calibration if the eye is positioned over the position 2602b, toward the upper left corner of the outcoupling optical element 2509, and similarly for any of the other example positions 2602 on the optical element 2509.

As the user's eye moves relative to the display, the field of view (FOV) of the display remains about the same, but the spatial and/or chromatic distortions in the display can change as the eye translates relative to the display. Since the FOV includes the range of angles over which images are presented to a user, the calibration data (at a given position relative to the display) can account for substantially all orientations or viewing angles of the eye. For example, when the user orients her vision to a different angle (while maintaining the same position relative to the display), the user may merely view a different part of the image, which has the same overall distortion. Therefore, at any given position, as the eye's orientation changes (e.g., eye gaze direction changes), the eye's view generally remains within the FOV of the display and the same calibration (for that given eye position) can be used for substantially all eye orientations. Accordingly, certain embodiments of the calibration system utilize position-dependent calibrations that are not additionally orientation dependent.

Note that the dots 2602, 2602a, 2602b are for reference only and do not form a part of the outcoupling optical element 2509 or the display 2500. Further, although nine positions 2602 in a 3×3 grid are schematically illustrated in FIG. 26, this is for purpose of illustration, and it is to be understood that the number (or arrangement) of the positions for calibration of the display 2500 can be different than shown in FIG. 26. For example, in various implementations, 1, 2, 3, 4, 5, 6, 7, 8, 9, 10, 11, 12, 16, 20, 25, 100, 256 or more calibration positions are used. The calibration positions can be arranged in a 2×2, 3×3, 4×4, 5×5, 6×6, 7×7, 9×9 or other dimension grid or other pattern or arrangement of positions.

The calibration for one or more positions on the display 2500 can be determined using a light field metrology system that measures errors in a calibration pattern (e.g., a checkerboard) that is projected from the display. The calibration can depend on the position across the display from which the display is viewed. For example, the metrology system can sweep an eye-proxy camera relative to the display (e.g., by relatively translating the camera and the display) simulating the range of positions for the user's eye. As the camera is swept relative to the display, at each sample point 2602 the metrology system can build a calibration (correction), thereby resulting in a set of calibrations versus eye-proxy positions. The calibrations for a particular display may be stored as a look up table (LUT) (or other efficient data structure) by the data modules 224, 228 of the wearable display system 200. In other implementations, an analytical model can be fit to the calibration data obtained from the metrology system, and the fitted analytical model can be stored by the wearable display system 200. Other modeling or data referencing methods can be used to store the calibration. As discussed above, the calibration can include spatial and/or chromatic corrections generated for each of the calibration positions of the display (e.g., a 3×3 grid of calibration positions for the example display 2500 shown in FIG. 26). It is noted that in various implementations, to capture the calibrations, the display is swept (translated) relative to a fixed camera, the camera is swept (translated) relative to a fixed display, or the camera and the display are both swept (translated) relative to each other.

In implementations in which the field of view (FOV) of the eye-proxy camera is greater than the FOV of the display, placing the calibration camera at a number of discrete positions relative to the display (e.g., over the positions indicated by the dots 2602) and taking one or more calibration images provides sufficient information regarding the imperfections of the display to determine the calibration for each of the discrete positions. In some such implementations, the camera can capture the full FOV of the display and there may be no need to vary the orientation (e.g., pointing direction) of the camera at each of the positions 2602. In other implementations, the orientation of the calibration camera (at each position 2602) may be varied to obtain additional images to map out the FOV of the display (e.g., when the FOV of the camera is less than the FOV of the display).

The calibration position can represent the eye position relative to the display 2500. For example, a wearer of the display 2500 will typically position the display so that the wearer's eye (in the x-y plane) is approximately near the center of the outcoupling optical element 2509, e.g., the wearer's eye is positioned over the position 2602a. The calibration for the position 2602a (near the center of the optical element 2509) thus corresponds to light propagating approximately perpendicular to the display 2500 (e.g., substantially along the z-direction) and can be applied by the dynamic calibration processor 2610. If the wearer's eye moves upward and to the left over the position 2602b (near the upper left corner of the optical element 2509), the calibration for the position 2602b can be applied by the processor 2510. The eye-tracking camera 500 can image the eye (e.g., in real time), and the dynamic calibration processor 2510 can use the eye-tracking data to determine the position of the eye, select the appropriate calibration (based on the determined eye position), and apply the calibration to the display. In some implementations, eye position is determined from cornea position and gaze direction. Further, in other embodiments, eye orientation (e.g., gaze direction) may be determined and a calibration that is orientation dependent may be used.

Embodiments of the wearable display system 200 can include embodiments of the dynamic calibration system 2600 schematically illustrated in FIG. 8. For example, the eye-tracking camera 500 (described with reference to FIG. 4) can be affixed to a frame of the wearable display system 200 and can dynamically measure the wearer's eye pose (e.g., eye position or eye direction). Images from the camera 500 can be used by the dynamic calibration processor 2610 to determine the wearer's eye pose in real-time or near real-time. When the dynamically calibrated system is in operation, the eye-tracking camera can, in real time or near real-time, inform the dynamic calibration processor 2610 about the wearer's current eye pose. The dynamic calibration processor 2610 can fetch and apply the appropriate calibration (e.g., the appropriate calibration LUT stored in a data module 224, 228) based on the measured eye pose (e.g., position or orientation). In cases where the wearer is not looking directly at a stored calibration position or where the wearer's eye is not located directly above a calibration position, the dynamic calibration processor can interpolate (or extrapolate) among calibrations for nearby calibration positions (e.g., including at least the calibration position closest to the wearer's eye pose) to determine an appropriate calibration to apply for the wearer's current eye pose. Accordingly, the display system 200 (with the dynamic calibration system 2600) can correct for imperfections (spatial or chromatic) in the display and thereby provide a good quality color image to the wearer. As described herein, in some cases the calibration depends on eye position relative to the display, and not eye orientation (e.g., gaze direction), although this is not a limitation.

The dynamic calibration processor 2610 can be implemented as software stored in a memory (e.g., data module 224, 228) and the software instructions can be executed by one or both of the processing modules 224, 228 or by the controller 450. Accordingly, a continuous adjustment of the calibration can result in high quality images over a wide range of input motion of the wearer's eye.

In some implementations, the calibration is stored at a reduced number of calibration positions (e.g., a 2×2 or a 3×3 grid) to reduce the amount of data storage. As described above, the dynamic calibration processor can interpolate or extrapolate to determine a calibration for eye poses that are not directly at a stored calibration position.

In some embodiments, the wearable display system 200 uses a single eye-tracking camera to measure the pose of a single eye of the wearer and the dynamic calibration processor 2610 infers the pose of the wearer's other eye relative to the display system 200 (since both eyes typically point toward the same direction). In other embodiments, the wearable display system 200 uses two eye-tracking cameras (one for each eye) and measures each eye's pose independently. In some embodiments, a separate calibration is stored for each display in the wearable system (in many cases, there are two displays, one in front of each of the wearer's eyes, so two calibrations are stored). In other embodiments, a single calibration (e.g., an average calibration) is stored and used for all of the displays in the wearable system 200.

The eye-tracking camera (or other type of inward-facing imaging system) can image the periocular region of the user's face. The periocular region can include the eyes and the regions around the eyes. For example, the periocular region can include an eye (such as an eye socket) and a region around the eye. The region around the eye may include, for example, an eyebrow, portions of the nose, cheek, and forehead. Periocular regions may have a variety of features, such as the shape of the eyebrows, eye corners, the characteristics of eyelid, and so forth. In some implementations, one or more of these features may be represented by keypoints, point clouds, or other types of mathematical representations. The wearable device can identify these features in the image and use these features to determine relative positions between the wearable display system and the user's face. In certain embodiments, the wearable display system 200 may calculate the relative position separately for each eye. For example, when the wearable device has one or two eye cameras each configured to image one eye of the user, the wearable device may calculate one relative position between the left eye and the wearable display system and another relative position between the right eye and the wearable display system. The wearable device can also track the relative positions for respective eyes separately. Because the relative position between the left eye and the wearable display system may be different from the relative position between the right eye and the wearable display system (such as when the wearable system tilts to one side), the adjustment to the rendering location of a virtual object may be different for the left eye display and the right eye display.

The wearable display system can compute and track periocular features using neural network or visual keypoints techniques such as scale-invariant feature transform (SIFT), speeded up robust features (SURF), oriented FAST and rotated BRIEF (ORB), binary robust invariant scalable keypoints (BRISK), fast retina keypoint (FREAK), etc. In some embodiments, a particular facial feature may be tracked using a detector specifically designed for that particular facial feature. For example, periocular features, such as eye corners, nose features, mouth corners, etc., may be identified and tracked separately using various algorithms. Tracking one or more of these periocular features separately may be advantageous because they are prone to substantial motion while the user is expressing himself or is speaking. The detectors associated with these periocular features may take into account the range of mobility. As an example, some facial features may more likely move in certain directions and are stable in other directions (e.g., eyebrows tend to move up or down but not left or right). The wearable system can analyze the movements of the facial features statistically. These statistics may be used to determine the likelihood that the facial features will move in a certain direction. In some embodiments, one or more facial features may be removed or untracked. For example, the wearable display system may ignore the eye movement when tracking the position of the periocular region.

The wearable display system can also use visual simultaneous location and mapping (vSLAM) techniques, such as sequential Bayesian estimator (e.g., Kalman filter, extended Kalman filter, etc.), bundle adjustment, etc., to identify and track facial features. In some embodiments, the wearable device may be configured to allow depth perceptions. For example, the wearable system can construct a dense map, which encodes at least a portion of the face, from data acquired by one or more cameras. Rather than a keypoint map, the dense map may comprise patches or regions of the face whose 3D shape is measured. The patches or the regions may be used to compute the location of the HMD relative to the face of the user using techniques such as iterative closest algorithm or similar algorithms.

In some implementations, images acquired by eye cameras may be low resolution images because the wearable display system 200 may not need high quality images to track the periocular features. Additionally or alternatively, the resolution of the images obtained from an eye imager may be down-sampled relative to their original resolution or the resolution used in other applications (e.g., eye-tracking).

The wearable display system 200 can analyze the images obtained by one or both eye cameras to determine the relative position between the displays of the display system and the user using a variety of techniques. The relative position between the display and the user's eye(s) may be a normal resting position of the display system 200 with respect to the user's face. The normal resting position of the display system 200 may be determined during the initialization phase of the wearable system. For example, when a user first uses the wearable system, the wearable system may build a face model (e.g., a map of the user's face) and determine the normal resting position of the display(s) relative to the user's eyes based on the face model.

While the user is using the wearable system 200, the wearable system can keep tracking the relative position between the display(s) and the user using a variety of techniques. For example, the wearable device can identify and track visual keypoints associated with periocular features. The wearable system can also match a region of the face as identified in the acquired images relative to a dense map of the user's face to compute the location of the display(s) relative to the face.

Accordingly, various eye-tracking or face-imaging techniques can be used to (statically or dynamically) determine the relative position between an eye of the user and the display of the display system. The display system 200 can then select and apply an appropriate spatial and/or chromatic calibration to the display(s) based at least partly on the determined relative eye position, as further described herein.

Figure 27:
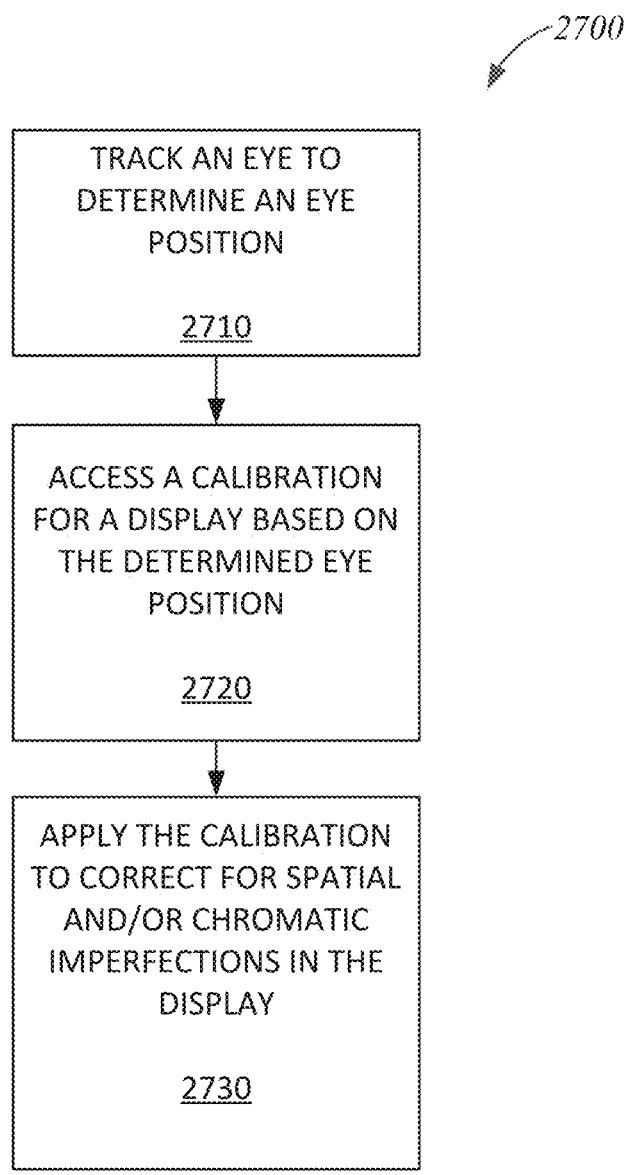
FIG. 27 is a flowchart that illustrates an example method for dynamically calibrating a display based on eye-tracking.

FIG. 27 is a flowchart that illustrates an example method 2700 for dynamically calibrating a display based on eye-tracking. The method 2700 can be performed by the dynamic calibration system 2600. At block 2710, a user's eye is tracked to determine the user's eye position relative to the display. For example, the camera 500 of the display system 2600 can determine the user's eye position. One or both eyes can be tracked. At block 2720, a calibration based on the determined eye position is accessed. At block 2730, the calibration is applied to the display to correct for spatial and/or chromatic imperfections in the display. For example, the dynamic calibration processor 2610 can apply the correction to adjust the nature of the light injected into waveguides of the display so that a desired light beam is output by the display. In some cases, the light may be injected with a slightly different color or position or orientation to adjust for display imperfections. For example, one or more of the RGB color values in an input image that is to be projected by the display can be modified via a corresponding RGB calibration (based on the user's eye position), and the modified RGB value(s) sent to the display for projection. The net effect of the imperfect display projecting the modified RGB values is to produce a projected image that at least partially corrects for the imperfections (spatial and/or chromatic) of the display. In other cases, actively controlled diffractive optical elements in a waveguide assembly can be adjusted by the dynamic calibration processor so that a light beam is projected from the display that at least partially corrects for imperfections in the display. In some implementations, the method 2700 is performed in real time as a feedback loop, such that the eye tracking camera 500 monitors the user's eye and if a change in eye position is detected, a new calibration (for the new eye position) is used to calibrate the display. In some cases, the new calibration is applied if the change in the eye position exceeds a threshold (e.g., a fraction of the spacing between the grid of calibration positions). Some such implementations may advantageously continuously provide a calibrated display for user viewing. In some implementations, the method 2700 may be performed occasionally (e.g., at the time the user places the display over the user's eyes) or periodically (e.g., to correct for occasional slippages between the display and the user's eyes).

Figure 28:
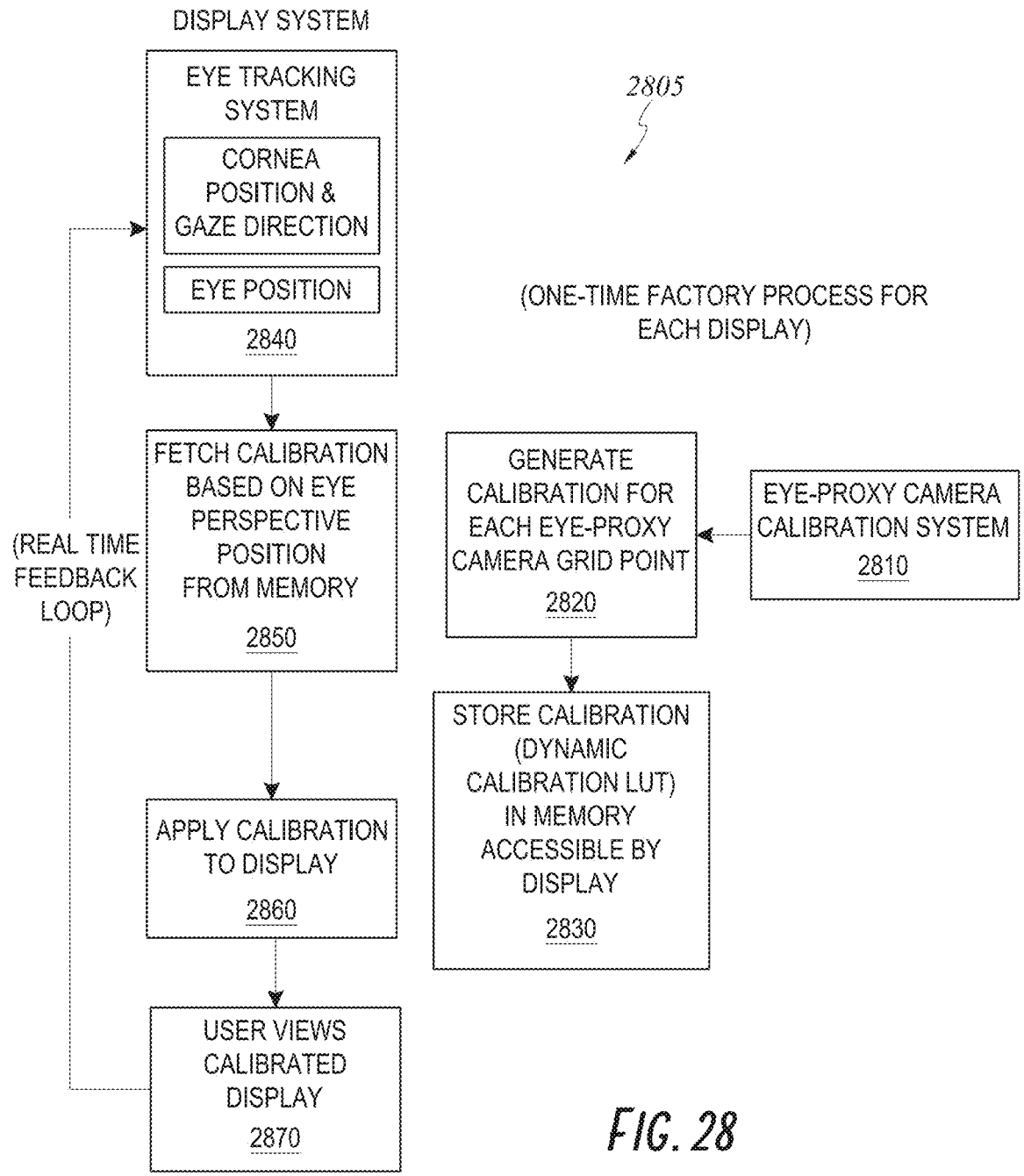
FIG. 28 is a process flow diagram schematically illustrating an example of the interaction of a factory calibration system and a dynamic calibration system associated with a particular display.

FIG. 28 is a process flow diagram 2805 schematically illustrating an example of the interaction of a factory calibration system and a dynamic calibration system associated with a particular display. In this example, an eye-proxy camera calibration system 2810 is used in a factory (manufacturing) setting to determine position-dependent calibrations for displays being manufactured. At block 2820, the process analyzes one or more calibration images for each particular display being manufactured and generates a calibration for each eye-proxy position. At block 2830, the calibration is stored in a memory associated with the particular display so that each display has access to a calibration that is customized for that particular display during the manufacturing process. For example, the calibration may be stored as a look-up-table (LUT) in the data module 224 or the remote data repository 232 of the display 208. This portion of the process flow 2805 may be performed once for each display during manufacturing so as to provide a customized calibration for each display.

In this example, each display system (e.g., embodiments of the wearable display system 200) can perform real-time calibration using the calibration that was stored at block 2830. For example, an eye-tracking system 2840 of the display (which may include the eye-tracking camera 500) may determine the position of the cornea of the eye and the eye's gaze direction to determine the position of the eye. At block 2850, the display system (e.g., via the dynamic calibration processor 2610) may fetch from memory the appropriate calibration based on the determined eye position. At block 2860, the calibration is applied to the display (e.g., via the dynamic calibration processor 2610) to correct for spatial and/or chromatic errors of the display. At block 2870, the wearer is able to view imagery projected by the calibrated display. As the wearer's eye position relative to the display changes, the process flow in the display system may update the calibration, for example, in real time.

Although embodiments of the dynamic calibration system 2600 have been described in the context of a display in a wearable display system, this is not a limitation, and the dynamic calibration system (e.g., eye tracking camera and dynamic calibration processor) can be used for any display (wearable or non-wearable) whose calibration is good only close to a nominal viewing position (e.g., perpendicular to the center of the display). For example, the dynamic calibration system can be used for flat panel displays, liquid crystal displays, light emitting diode displays, microelectromechanical systems (MEMS) displays, etc.

Additional Aspects for Performing Image Correction

In a 1st aspect, a computer-implemented method for performing image correction on a display is disclosed. The method is under control of a display calibration system comprising computer hardware and a camera, and comprises: calibrating the camera; capturing, with the camera, an image of a light field projected by the display, the light field associated with a display layer of the display; generating a vector field based at least in part upon the captured image, the vector field comprising vectors corresponding to deviations between projected positions and expected positions of points of the display layer; using the generated vector field, performing at least one of: centration correction, aggregate rotation correction, aggregate scaling correction, or spatial mapping, for the display; determining, based at least in part upon the captured image, a plurality of luminance values corresponding to a plurality of points on the display layer; and using the determined plurality of luminance values, performing at least one of: luminance flattening or chromatic balancing, for the display.

In a 2nd aspect, the computer-implemented method of aspect 1, wherein performing centration correction comprises: identifying a center point of the projected display layer; and determining a translation vector, wherein the translation vector corresponds to a translation error between the identified center point and an expected center point position.

In a 3rd aspect, the computer-implemented method of aspect 1 or aspect 2, wherein performing aggregate rotation comprises: identifying a center point of the projected display layer; and determining a rotational amount, wherein the rotational amount corresponds to a rotation of the projected display layer about the center point, such that a pixel error amount between the projected positions and the expected positioned is minimized.

In a 4th aspect, the computer-implemented method of any one of aspects 1-3, wherein performing aggregate scaling comprises: identifying a center point of the projected display layer; and determining a scaling amount, wherein the scaling amount corresponds to a scaling of the projected display layer about the center point, such that a pixel error amount between the projected positions and the expected positioned is minimized.

In a 5th aspect, the computer-implemented method of any one of aspects 1-4, wherein performing spatial mapping comprises identifying a non-linear transformation to align the projected positions of the display layer with the expected positions.

In a 6th aspect, the computer-implemented method of any one of aspects 1-5, wherein performing luminance flattening comprises: determining a minimum luminance value of the plurality of luminance values; and lowering all luminance values of the plurality of luminance values to the minimum luminance value.

In a 7th aspect, the computer-implemented method of any one of aspects 1-5, wherein performing luminance flattening comprises: determining a threshold luminance value; and lowering all luminance values of the plurality of luminance values greater than the threshold luminance value to the threshold luminance value.

In a 8th aspect, the computer-implemented method of any one of aspects 1-7, wherein performing chromatic balancing comprises: identifying a color cluster associated with the display layer, the color cluster comprising at least one additional display layer; for each point of the plurality of points on the display layer, comparing the luminance value corresponding to the point on the display layer with a luminance value corresponding to the point on the additional display layer; and lowering each luminance value of the plurality of luminance values to the lowest luminance value associated with its corresponding point.

In a 9th aspect, the computer-implemented method of any one of aspects 1-8, wherein performing aggregate rotation correction comprises calculating a curl of the vector field.

In a 10th aspect, the computer-implemented method of any one of aspects 1-9, wherein performing aggregate scaling correction comprises calculating a divergence of the vector field.

In an 11th aspect, the computer-implemented method of any one of aspects 1-10, wherein the display comprises a light field display.

In a 12th aspect, the computer-implemented method of aspect 11, wherein the light field display comprises a stacked waveguide assembly.

In a 13th aspect, the computer-implemented method of aspect 12, wherein the stacked waveguide assembly comprises two or more waveguides corresponding to two or more depths planes, respectively.

In a 14th aspect, the computer-implemented method of aspect 13, wherein each depth plane is associated with a red display layer, a green display layer, and a blue display layer.

In a 15th aspect, a method of calibrating a display is disclosed. The method is under control of a display calibration system comprising computer hardware, and comprises: accessing an image of a calibration pattern projected by the display; determining spatial distortions between expected positions of calibration points in a projected light field and actual displayed positions in the image; analyzing the spatial distortions to determine a spatial calibration for the display; and storing the spatial calibration in a non-transitory memory associated with the display.

In a 16th aspect, the method of aspect 15, wherein the spatial calibration corrects for one or more of: in-plane spatial errors or out-of-plane spatial errors.

In a 17th aspect, the method of aspect 15 or aspect 16, wherein the spatial calibration corrects for one or more of: translation error, rotation error, scaling error, or pixel warp.

In an 18th aspect, the method of any one of aspects 15-17, further comprising: determining chromatic distortions from the image; analyzing the chromatic distortions to determine a chromatic calibration for the display; and storing the chromatic calibration in the non-transitory memory associated with the display.

In a 19th aspect, the method of aspect 18, wherein the chromatic calibration corrects for luminance flatness or chromatic uniformity of the display.

Additional Aspects of an Optical Metrology System

In a 20th aspect, an optical metrology system for measuring imperfections in a light field generated by a display is disclosed. The optical metrology system comprises a display configured to project a target light field comprising a virtual object having an intended focus position; a camera configured to obtain an image of the target light field; and a processor programmed with executable instructions to: access one or more images corresponding to a portion of the light field; analyze the one or more images to identify a measured focus position corresponding to a position at which the virtual object is in focus; and determine imperfections in the light field based at least in part on a comparison of the measured focus position and the intended focus position.

In a 21st aspect, the optical metrology system of aspect 20, wherein the display comprises a light field display.

In a 22nd aspect, the optical metrology system of aspect 20 or aspect 21, wherein the display comprises a stack of waveguides configured to output light to project the virtual object to a particular depth plane.

In a 23rd aspect, the optical metrology system of any one of aspects 20-22, wherein the camera comprises a digital camera having a small depth of focus.

In a 24th aspect, the optical metrology system of aspect 23, wherein the camera has a focus, and the system is configured to sweep the focus of the camera over a range of focuses to obtain the one or more images.

In a 25th aspect, the optical metrology system of any one of aspects 20-22, wherein the camera comprises a light field camera.

In a 26th aspect, the optical metrology system of any one of aspects 20-25, wherein the virtual object comprises a checkerboard pattern, a geometric pattern, or a stochastic pattern.

In a 27th aspect, the optical metrology system of any one of aspects 20-26, wherein the display comprises a plurality of pixels, and the target light field corresponds to a subset of less than all of the plurality of pixels being illuminated.

In a 28th aspect, the optical metrology system of any one of aspects 20-27, wherein the measured focus position includes a depth of focus.

In a 29th aspect, the optical metrology system of aspect 28, wherein the measured focus position further includes a lateral focus position.

In a 30th aspect, the optical metrology system of aspect 29, wherein the determined imperfections are based at least in part on an error vector between the intended focus position and the measured focus position.

In a 31st aspect, the optical metrology system of any one of aspects 20-30, wherein the determined imperfections comprise spatial imperfections.

In a 32nd aspect, the optical metrology system of any one of aspects 20-31, wherein the determined imperfections comprise chromatic imperfections.

In a 33rd aspect, the optical metrology system of any one of aspects 20-32, wherein the processor is further programmed to determine an error correction for the display based at least in part on the determined imperfections.

In a 34th aspect, a method for measuring imperfections in a light field is disclosed, the method comprising: accessing one or more images corresponding to a portion of a light field projected by a display, the portion of the light field having an intended focus position; analyzing the one or more images to identify a measured focus position corresponding to a position at which the portion of the light field is in focus; and determining imperfections in the light field based at least in part on a comparison of the measured focus position and the intended focus position.

In a 35th aspect, the method of aspect 34, comprising sweeping a focus of a camera to obtain the one or more images.

In a 36th aspect, the method of aspect 34, comprising using a light field camera to obtain the one or more images.

In a 37th aspect, the method of any one of aspects 34-36, further comprising projecting a light field image comprising a checkerboard pattern.

In a 38th aspect, the method of any one of aspects 34-37, further comprising determining an error correction for the light field based at least in part on the determined imperfections.

Additional Aspects of Calibrating a Display

In a 39th aspect, a calibration system for a display is provided. The calibration system comprises: a camera configured to acquire an image of a display; and a hardware processor in communication with the camera, the hardware processor programmed to: receive an image of the display; determine a calibration for the display; and store the calibration in a memory associated with the display.

In a 40th aspect, the calibration system of aspect 39, wherein the calibration comprises a spatial calibration to correct for spatial imperfections in the display.

In a 41st aspect, the calibration system of aspect 39, wherein the calibration comprises a chromatic calibration to correct for color imperfections in the display.

In a 42nd aspect, the calibration system of any one of aspects 39-41, wherein the display comprises a plurality of pixels in a field of view, and wherein to determine the calibration, the hardware processor is programmed to: determine a global transformation parameter that is independent of the pixels in the field of view of the display; and determine a local transformation parameter that is dependent on the pixels in the field of view of the display.

In a 43rd aspect, the calibration system of aspect 42, wherein the global transformation parameter comprises one or more nonlinear gamma corrections.

In a 44th aspect, the calibration system of aspect 42 or aspect 43, wherein the local transformation comprises a linear function.

In a 45th aspect, the calibration system of any one of aspects 39 to 44, wherein to determine the calibration, the hardware processor is programmed to iteratively solve for the calibration using feedback from images acquired by the camera.

In a 46th aspect, the calibration system of any one of aspects 39 to 45, wherein the calibration comprises a chromatic calibration, the display comprises a plurality of color levels that can provide a white point, and to determine the calibration, the hardware processor is programmed to tune intensities of the color levels such that the white point is substantially uniform across a field of view of the display.

In a 47th aspect, the calibration system of aspect 46, wherein to determine the calibration, the hardware processor is programmed to: solve for a first gamma correction that maps color levels sent to the display to a first intermediate color representation; solve for a pixel-dependent coupling function that maps the first intermediate color representation to a second intermediate color representation; and solve for a second gamma correction that maps the second intermediate color representation to color levels registered by the camera.

In a 48th aspect, the calibration system of aspect 47, wherein the hardware processor is programmed to solve for the first gamma correction and the second gamma correction prior to solving for the pixel-dependent coupling function.

In a 49th aspect, the calibration system of any one of aspects 39 to 48, wherein the display comprises a light field display.

In a 50th aspect, the calibration system of any one of aspects 39 to 49, wherein the display comprises a stackable waveguide assembly comprising a plurality of waveguides.

In a 51st aspect, the calibration system of any one of aspects 39 to 50, wherein the display is configured for a wearable display system.

In a 52nd aspect, a method for calibrating a display is provided. The method is under control of a dynamic calibration system performed by computer hardware and comprises: accessing a calibration for the display; determining, based at least in part on the accessed calibration, a correction to apply to the display to at least partially correct for an imperfection in the display; and applying the correction to the display.

In a 53rd aspect, the method of aspect 52, wherein accessing the calibration comprises a chromatic calibration.

In a 54th aspect, the method of aspect 53, wherein the display comprises a plurality of pixels in a field of view, and the chromatic calibration comprises a plurality of pixel-independent nonlinear gamma corrections and a pixel-dependent coupling function.

In a 55th aspect, the method of any one of aspects 52 to 54, wherein the display comprises a light field display.

In a 56th aspect, a head mounted display is provided, comprising: a display; a memory configured to store the calibration; and a hardware processor in communication with the non-transitory memory and programmed to perform the method of any one of aspects 14 to 17.

Additional Aspects of Calibration Patterns

In a 57th aspect, an optical system for calibrating a light field generated by a display, comprising: a display configured to project a target light field comprising a calibration pattern containing a feature point; a camera configured to obtain an image of the target light field; a processor programmed with executable instructions to: for each of a plurality of positions: cause the display to project the calibration pattern at a position in the plurality of positions; cause the camera to obtain an image of the projected calibration pattern; calculate a distortion of the feature point, wherein the distortion corresponds to an error between an expected location of the feature point and a measured location of the feature point or an error between an expected luminance or chromaticity of the calibration pattern and a measured luminance or chromaticity of the calibration pattern; and in response to a determination of a next position in the plurality of positions, shift the calibration pattern to be displayed at the next position.

In a 58th aspect, the optical system of aspect 57, wherein the calibration pattern comprises a checkerboard pattern.

In a 59th aspect, the optical system of aspect 57, wherein a number of the plurality of positions corresponds to a number of pixels in a checkerbox of the checkerboard pattern.

In a 60th aspect, the optical system of aspect 57, wherein the calibration pattern comprises a single-pixel pattern.

In a 61st aspect, the optical system of aspect 60, wherein a number of the plurality of positions corresponds to a number of pixels displayed.

In a 62nd aspect, the optical system of any one of aspects 57-61, wherein the processor is further programmed to generate a distortion map based at least in part upon the calculated distortions corresponding to the plurality of positions.

In a 63rd aspect, the optical system of any one of aspects 57-62, wherein the processor is further programmed to determine an error correction for the display based at least in part upon the calculated distortions corresponding to the plurality of positions.

In a 64th aspect, the optical system of any one of aspects 57-63, wherein the display comprises separate red, green, and blue color layers.

In a 65th aspect, the optical system of any one of aspects 57-64, wherein the display comprises a light field display.

In a 66th aspect, the optical system of aspect 65, wherein the light field display comprises a stacked waveguide assembly.

In a 67th aspect, the optical system of aspect 66, wherein the stacked waveguide assembly comprises two or more waveguides corresponding to two or more depths planes, respectively.

In a 68th aspect, the optical system of any one of aspects 57-67, wherein the calculated distortion further comprises a luminance distortion or a chromatic distortion.

In a 69th aspect, a method for calibrating a light field generated by a display is provided. The method comprises, for each of a plurality of positions: causing the display to project the calibration pattern at a position in the plurality of positions; causing the camera to obtain an image of the projected calibration pattern; calculating a distortion of the feature point, wherein the distortion corresponds to an error between an expected location of the feature point and a measured location of the feature point or an error between an expected luminance or chromaticity of the feature point and a measured luminance or chromaticity of the feature point; and in response to a determination of a next position in the plurality of positions, shifting the calibration pattern to be displayed at the next position.

In a 70th aspect, the method of aspect 69, wherein the calibration pattern is a checkerboard pattern.

In a 71st aspect, the method of aspect 70, wherein a number of the plurality of positions corresponds to a number of pixels in a checkerbox of the checkerboard pattern.

In a 72nd aspect, the method of aspect 69, wherein the calibration pattern comprises a single-pixel pattern, a stochastic pattern, or a geometric pattern.

In a 73rd aspect, the method of aspect 72, wherein a number of the plurality of positions corresponds to a number of pixels displayed.

In a 74th aspect, the method of any one of aspects 69-73, further comprising generating a distortion map based at least in part upon the calculated distortions corresponding to the plurality of positions.

In a 75th aspect, the method of any one of aspects 69-74, further comprising determining an error correction for the display based at least in part upon the calculated distortions corresponding to the plurality of positions.

In a 76th aspect, the optical system of any one of aspects 69-75, wherein the display comprises separate red, green, and blue color layers.

In a 77th aspect, the optical system of any one of aspects 69-76, wherein the display comprises a light field display.

In a 78th aspect, the optical system of aspect 77, wherein the light field display comprises a stacked waveguide assembly.

In a 79th aspect, the optical system of aspect 78, wherein the stacked waveguide assembly comprises two or more waveguides corresponding to two or more depths planes, respectively.

In a 80th aspect, the optical system of any one of aspects 69-79, wherein the calculated distortion further comprises a luminance distortion or a chromatic distortion.

Additional Aspects of Performing Dynamic Calibration

In a 81st aspect, a display system is provided. The display system comprises: an eye-tracking camera; a display; non-transitory data storage configured to store a plurality of calibrations for the display, each calibration in the plurality of calibrations associated with a calibration position relative to the display; and a hardware processor in communication with the eye-tracking camera, the display, and the non-transitory data storage, the hardware processor programmed to: determine an eye position, relative to the display, for a user of the display; access, based at least partly on the determined eye position, one or more of the plurality of calibrations; determine, based at least in part on the one or more of the plurality of calibrations, a correction to apply to the display to at least partially correct for an imperfection in the display; and apply the correction to the display.

In a 82nd aspect, the display system of aspect 81, wherein a number of calibration positions is 2, 3, 4, 5, 6, 7, 8, 9, or more.

In a 83rd aspect, the display system of aspect 81 or aspect 82, wherein the calibration positions are distributed across the display in a grid.

In a 84th aspect, the display system of aspect 83, wherein the grid comprises a 2×2, a 3×3, a 5×5, or a 9×9 grid.

In a 85th aspect, the display system of any one of aspects 81 to 84, wherein the one or more of the plurality of calibrations comprises a calibration associated with a calibration position that is closest to the eye position.

In a 86th aspect, the display system of any one of aspects 81 to 85, wherein to determine the correction, the hardware processor is programmed to interpolate or to extrapolate among the one or more of the plurality of calibrations.

In a 87th aspect, the display system of any one of aspects 81 to 86, wherein each calibration in the plurality of calibrations corrects for a spatial imperfection of the display, a chromatic imperfection of the display, or both the spatial imperfection and the chromatic imperfection.

In a 88th aspect, the display system of any one of aspects 81 to 87, wherein the display comprises a light field display.

In a 89th aspect, the display system of any one of aspects 81 to 88, wherein the display comprises a stackable waveguide assembly comprising a plurality of waveguides.

In a 90th aspect, the display system of any one of aspects 81 to 89, wherein the display is configured as a wearable display system.

In a 91st aspect, a head mounted display is provided, comprising the display system of any one of aspects 81 to 90.

In a 92nd aspect, a method for calibrating a display is provided. The method is under control of a dynamic calibration system performed by computer hardware and comprises: determining an eye position for a user of the display; accessing, based at least partly on the determined eye position, a calibration for the display, the calibration associated with a calibration position that is near the determined eye position; determining, based at least in part on the accessed calibration, a correction to apply to the display to at least partially correct for an imperfection in the display; and applying the correction to the display.

In a 93rd aspect, the method of aspect 92, wherein accessing the calibration comprises selecting one or more calibrations from a plurality of calibrations, wherein each calibration is associated with a different calibration position relative to the display.

In a 94th aspect, the method of aspect 93, wherein the calibration positions are arranged in a grid across the display.

In a 95th aspect, the method of any one of aspects 92 to 94, wherein the calibration corrects for a spatial imperfection of the display, a chromatic imperfection of the display, or both the spatial imperfection and the chromatic imperfection.

In a 96th aspect, the method of any one of aspects 92 to 95, wherein determining the correction comprises interpolating or extrapolating among one or more calibrations associated with calibration positions near the eye pose.

In a 97th aspect, the method of any one of aspects 92 to 96, wherein the display comprises a light field display.

In a 98th aspect, a head mounted display is provided, comprising an eye-tracking system and a hardware processor programmed to perform the method of any one of aspects 92 to 97.

Additional Aspects of an Optical Metrology System

In a 99th aspect, an optical metrology system for measuring imperfections in a light field generated by a display is provided. The optical metrology system comprises: a display configured to project a target light field comprising a virtual object having an intended focus position; a camera configured to obtain images of the target light field; a hardware processor programmed with executable instructions to: access one or more images corresponding to a portion of the light field; analyze the one or more images to identify a measured focus position corresponding to a position at which the virtual object is in focus; and determine imperfections in the light field based at least in part on a comparison of the measured focus position and the intended focus position.

In a 100th aspect, the optical metrology system of aspect 99, wherein the display comprises a stack of waveguides configured to output light to project the virtual object to at least one depth plane.

In a 101st aspect, the optical metrology system of any of aspects 99 to 100, wherein the camera comprises a digital camera having a small depth of focus.

In a 102nd aspect, the optical metrology system of aspect 101, wherein the camera has a focus, and the system is configured to sweep the focus of the camera over a range of focuses to obtain the one or more images.

In a 103rd aspect, the optical metrology system of any of aspects 99 to 102, wherein the camera comprises a light field camera.

In a 104th aspect, the optical metrology system of any of aspects 99 to 103, wherein the virtual object comprises a checkerboard pattern, a geometric pattern, or a stochastic pattern.

In a 105th aspect, the optical metrology system of any of aspects 99 to 104, wherein the display comprises a plurality of pixels, and the target light field corresponds to a subset of less than all of the plurality of pixels being illuminated.

In a 106th aspect, the optical metrology system of any of aspects 99 to 105, wherein the measured focus position includes a depth of focus.

In a 107th aspect, the optical metrology system of aspect 106, wherein the measured focus position further includes a lateral focus position.

In a 108th aspect, the optical metrology system of any of aspects 99 to 107, wherein the determined imperfections are based at least in part on an error vector between the intended focus position and the measured focus position.

In a 109th aspect, the optical metrology system of any of aspects 99 to 108, wherein the hardware processor is further programmed to determine an error correction for the display based at least in part on the determined imperfections.

In a 110th aspect, the optical metrology system of any of aspects 99 to 109, wherein the hardware processor is further programmed to apply a display-to-camera pixel mapping to transfer pixel values of the display to pixel values of the camera.

In a 111th aspect, the optical metrology system of aspect 110, wherein the display-to-camera pixel mapping comprises: a first gamma correction that maps color levels of the display to a first intermediate color representation; a pixel-dependent coupling function that maps the first intermediate color representation to a second intermediate color representation; and a second gamma correction that maps the second intermediate color representation to color levels registered by the camera.

In a 112th aspect, the optical metrology system of any of aspects 99 to 111, wherein the determined imperfections comprise a spatial imperfection.

In a 113th aspect, the optical metrology system of aspect 112, wherein the spatial imperfection comprises one or more of an in-plane translation, rotation, scaling, or warping error or an out-of-plane or focal depth error.

In a 114th aspect, the optical metrology system of any of aspects 99 to 113, wherein the determined imperfections comprise a chromatic imperfection.

In a 115th aspect, the optical metrology system of aspect 114, wherein the chromatic imperfection comprises one or more of a luminance flatness or a chromatic uniformity error associated with a color displayable by the display.

In a 116th aspect, an optical metrology system for performing image correction on a display is provided. The system comprises: a camera configured to capture an image of a light field projected by a display, the light field associated with a display layer of the display; a hardware processor programmed with executable instructions to: generate a vector field based at least partly on the image captured by the camera, the vector field comprising vectors corresponding to deviations between projected positions and expected positions of points of the display layer; calculate, based at least partly on the vector field, at least one of: a centration correction, an aggregate rotation correction, an aggregate scaling correction, or a spatial mapping, for the display; calculate, based at least partly upon the image captured by the camera, luminance values corresponding to a plurality of points on the display layer; and calculate, based at least partly on the determined luminance values, a luminance flattening correction or a chromatic balancing correction, for the display.

In a 117th aspect, the optical metrology system of aspect 116, wherein the display layer of the display comprises a color layer or a depth layer.

In a 118th aspect, the optical metrology system of any of aspects 116 to 117, wherein the camera comprises a light field camera or a digital camera having a small depth of focus.

In a 119th aspect, the optical metrology system of any of aspects 116 to 118, wherein to calculate the centration correction, the hardware processor is programmed to determine a translation vector corresponding to a translation error between an identified center point of the projected display layer and an expected center point position.

In a 120th aspect, the optical metrology system of any of aspects 116 to 119, wherein to calculate the aggregate rotation correction, the hardware processor is programmed to determine a rotational amount corresponding to a rotation of the projected display layer about a center point, such that a pixel error amount between the projected positions and the expected positioned is reduced or minimized.

In a 121st aspect, the optical metrology system of any of aspects 116 to 120, wherein to calculate the aggregate rotation correction, the hardware processor is programmed to calculate a curl of the vector field.

In a 122nd aspect, the optical metrology system of any of aspects 116 to 121, wherein to calculate the aggregate scaling correction, the hardware processor is programmed to determine a scaling amount corresponding to a scaling of the projected display layer about a center point, such that a pixel error amount between the projected positions and the expected positioned is reduced or minimized.

In a 123rd aspect, the optical metrology system of any of aspects 116 to 122, wherein to calculate the aggregate scaling correction, the hardware processor is programmed to calculate a divergence of the vector field.

In a 124th aspect, the optical metrology system of any of aspects 116 to 123, wherein to calculate the spatial mapping, the hardware processor is programmed to determine a non-linear transformation to align the projected positions of the display layer with the expected positions.

In a 125th aspect, the optical metrology system of any of aspects 116 to 124, wherein to calculate the luminance flattening correction, the hardware processor is programmed to: determine a threshold luminance value; and calculate an amount that lowers each luminance value greater than the threshold luminance value to the threshold luminance value.

In a 126th aspect, the optical metrology system of any of aspects 116 to 125, wherein to calculate the chromatic balancing correction, the hardware processor is programmed to: identify a color cluster associated with the display layer, the color cluster comprising at least one additional display layer; for each point of the display layer, compare the luminance value corresponding to the point on the display layer with a luminance value corresponding to the point on the additional display layer; and calculate an amount that lowers each luminance value to the lowest luminance value associated with its corresponding point.

Additional Aspects of Dynamic Display Calibration

In a 127th aspect, a display system is provided. The display system comprises: an eye-tracking camera; a display; non-transitory data storage configured to store a plurality of calibrations for the display, each calibration in the plurality of calibrations associated with a calibration position relative to the display; and a hardware processor in communication with the eye-tracking camera, the display, and the non-transitory data storage, the hardware processor programmed to: determine, based on information from the eye-tracking camera, an eye position, relative to the display, of the user of the display; access, based at least partly on the determined eye position, one or more of the plurality of calibrations; calculate, based at least in part on the one or more of the plurality of calibrations, a correction to apply to the display to at least partially correct for an imperfection in the display; and apply the correction to the display.

In a 128th aspect, the display system of aspect 127, wherein a number of calibration positions is 2, 3, 4, 5, 6, 7, 8, 9, or more.

In a 129th aspect, the display system of any of aspects 127 to 128, wherein the calibration positions are distributed across the display in a grid.

In a 130th aspect, the display system of aspect 129, wherein the grid comprises a 2×2, a 3×3, a 5×5, or a 9×9 grid.

In a 131st aspect, the display system of any of aspects 127 to 130, wherein the one or more of the plurality of calibrations comprises a calibration associated with a calibration position that is closest to the eye position.

In a 132nd aspect, the display system of any of aspects 127 to 131, wherein to calculate the correction, the hardware processor is programmed to interpolate or to extrapolate among the one or more of the plurality of calibrations, based at least in part on the calibration positions of the one or more of the plurality of calibrations and the determined eye position.

In a 133rd aspect, the display system of any of aspects 127 to 132, wherein the display comprises a first display associated with a first eye of the user and a second display associated with a second eye of the user, and the hardware processor is programmed to determine the eye position of the user relative to the first display and to apply the determined eye position for calculating the correction for the second display.

In a 134th aspect, the display system of any of aspects 127 to 133, wherein the display comprises a first display associated with a first eye of the user and a second display associated with a second eye of the user, and wherein at least some of the plurality of calibrations represent an average calibration for the first display and the second display.

In a 135th aspect, the display system of any of aspects 127 to 134, wherein the display comprises a light field display.

In a 136th aspect, the display system of any of aspects 127 to 135, wherein the display comprises a stackable waveguide assembly comprising a plurality of waveguides.

In a 137th aspect, the display system of any of aspects 127 to 136, wherein the display is configured as a head-mounted wearable display system.

In a 138th aspect, the display system of any one of aspects 127 to 137, wherein each calibration in the plurality of calibrations corrects for a spatial imperfection of the display, a chromatic imperfection of the display, or both the spatial imperfection and the chromatic imperfection.

In a 139th aspect, the display system of aspect 138, wherein the spatial imperfection comprises one or more of an in-plane translation, rotation, scaling, or warping error or an out-of-plane or focal depth error.

In a 140th aspect, the display system of aspect 138, wherein the chromatic imperfection comprises one or more of a luminance flatness or a chromatic uniformity error associated with a color displayable by the display.

In a 141st aspect, a method for calibrating a display is provided. The method is under control of a dynamic calibration system performed by computer hardware and comprises: determining an eye position for a user of the display; accessing, based at least partly on the determined eye position, a calibration for the display, wherein the calibration is selected based upon an associated calibration position and the determined eye position; calculating, based at least in part on the accessed calibration, a correction to apply to the display to at least partially correct for an imperfection in the display; and applying the correction to the display.

In a 142nd aspect, the method of aspect 141, wherein accessing the calibration comprises selecting one or more calibrations from a plurality of calibrations, wherein each calibration is associated with a different calibration position relative to the display.

In a 143rd aspect, the method of aspect 142, wherein the calibration positions are arranged in a grid across the display.

In a 144th aspect, the method of any of aspects 142 to 143, wherein calculating the correction comprises interpolating or extrapolating among the one or more of the plurality of calibrations, based upon the associated calibration positions of the one or more of the plurality of calibrations and the determined eye position.

In a 145th aspect, the method of any of aspects 141 to 144, further comprising accessing an image of an eye of the user of the display, and determining the eye position based at least in part upon the image of the eye.

In a 146th aspect, the method of any one of aspects 141-145, wherein calculating the calibration comprises calibrating for a spatial imperfection of the display, a chromatic imperfection of the display, or both the spatial imperfection and the chromatic imperfection.

In a 147th aspect, a wearable display system is provided, comprising: an inward-facing imaging system; a display;

non-transitory data storage configured to store a plurality of calibrations for the display, each calibration in the plurality of calibrations associated with a calibration position relative to the display; and a hardware processor in communication with the inward-facing imaging system, the display, and the non-transitory data storage, the hardware processor programmed to: determine, using the inward-facing imaging system, an eye position relative to the display of the user of the display; calculate, based at least partly on the determined eye position and one or more of the plurality of calibrations, a correction to apply to the display to at least partially correct for one or more of a spatial imperfection in the display or a chromatic imperfection in the display; and apply the correction to the display.

In a 148th aspect, the wearable display system of aspect 147, wherein the hardware processor is programmed to apply the correction via a feedback loop that monitors change in the eye position.

In a 149th aspect, the wearable display system of any of aspects 147 to 148, wherein the hardware processor is programmed to determine a change in the eye position relative to a previous eye position, and to calculate the correction if the change exceeds a threshold.

In a 150th aspect, the wearable display system of any one of aspects 147 to 149, wherein the spatial imperfection comprises one or more of an in-plane translation, rotation, scaling, or warping error or an out-of-plane or focal depth error.

In a 151st aspect, the wearable display system of any one of aspects 147 to 150, wherein the chromatic imperfection comprises one or more of a luminance flatness or a chromatic uniformity error associated with a color displayable by the display.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head-mounted display system comprising:
a wearable display configured to be disposed in front of an eye of a wearer of the head-mounted display system, the wearable display configured to present virtual image content to the eye of the wearer, the wearable display having a plurality of depth planes associated therewith, wherein the wearable display is configured to present different virtual images at different depth planes, the wearable display comprising a plurality of waveguides comprising a first waveguide and a second waveguide configured to output first and second colors, respectively;
non-transitory data storage configured to store a calibration associated with the first and second waveguides of the wearable display, wherein the calibration comprises a chromatic calibration; and
a hardware processor in communication with the wearable display and the non-transitory data storage, the hardware processor programmed to:
access the chromatic calibration associated with the first and second waveguides of the wearable display; and
apply correction to the wearable display based on the chromatic calibration.

2. The head-mounted display system of claim 1, wherein the wearable display comprises a light field display.

3. The head-mounted display system of claim 1, wherein the plurality of waveguides are configured to direct light to the wearer's eye to form images in said wearer's eye.

4. The head-mounted display system of claim 3, wherein different depth planes in the plurality of depth planes are associated with different waveguides of the plurality of waveguides.

5. The head-mounted display system of claim 1, wherein the correction is configured to correct for a chromatic non-uniformity.

6. The head-mounted display system of claim 1, wherein the correction is configured to provide color balancing.

7. The head-mounted display system of claim 1, wherein the correction comprises balancing a white point.

8. The head-mounted display system of claim 1, wherein the hardware processor is further programmed to correct for luminance flattening.

9. The head-mounted display system of claim 1, wherein the calibration further comprises a spatial calibration, the spatial calibration associated with a vector field comprising vectors corresponding to deviations between projected positions and expected positions of points of at least one of the virtual images at least one of the plurality of depth planes.

10. The head-mounted display system of claim 9, wherein the spatial calibration is associated with a divergence or a curl of the vector field.

11. The head-mounted display system of claim 9, wherein the vector field comprises a three-dimensional (3D) vector field corresponding to in-plane and out-of-plane deviations between projected positions and expected positions of points of the virtual images.

12. The head-mounted display system of claim 1, wherein the correction further corrects for at least one of an in-plane translation, rotation, scaling, warping error, or an out-ofplane focal depth error for at least one of the plurality of depth planes of the wearable display.

13. The head-mounted display system of claim 1, wherein the wearable display comprises a first display associated with a first eye of the wearer and a second display associated with a second eye of the wearer, and wherein the calibration comprises a first calibration for the first display and a second calibration for the second display.

14. The head-mounted display system of claim 1, wherein the chromatic calibration is configured to correct for a chromatic imperfection of the wearable display that comprises a chromatic mismatch between the first waveguide and second waveguide.

15. The head-mounted display system of claim 1, wherein the chromatic calibration comprises an adjustment in luminance for at least one of the plurality of depth planes.

16. The head-mounted display system of claim 1, wherein the calibration comprises a plurality of calibrations, and wherein different calibrations of the plurality of calibrations is associated with a corresponding calibration position relative to the wearable display.

17. The head-mounted display system of claim 1, wherein the hardware processor is programmed to apply the correction via a feedback loop that monitors change in eye position.

18. The head-mounted display system of claim 1, wherein the hardware processor is programmed to determine a change in eye position relative to a previous eye position, and to calculate the correction if the change exceeds a threshold.

19. The head-mounted display system of claim 1, wherein the calibration further comprises a spatial calibration.

* * * * *

UNITED STATES PATENT AND TRADEMARK OFFICE
CERTIFICATE OF CORRECTION

| | | |
|---|---|---|
| PATENT NO. | : 11,454,495 B2 | |
| APPLICATION NO. | : 16/744108 | |
| DATED | : September 27, 2022 | |
| INVENTOR(S) | : Lionel Ernest Edwin et al. | |

It is certified that error appears in the above-identified patent and that said Letters Patent is hereby corrected as shown below:

On the Title Page

On Page 3, Column 2, Lines 8-9, Item (56) under Other Publications, delete "Visualiztion," and insert --Visualization,--.

In the Specification

In Column 4, Line 30, delete "real world" and insert --real-world--.

In Column 7, Line 49, delete "(460," and insert --460,--.

In Column 9, Line 33, delete "4452)" and insert --452--.

In Column 15, Line 43, delete "meters)" and insert --meters.--.

In Column 25, Line 37, delete "accomodation" and insert --accommodation--.

In Column 27, Line 15, delete "15)" and insert --15).--.

In Column 33, Line 15, delete "$\equiv_2$)" and insert --$\gamma_2$)--.

In Column 45, Line 11, delete "eye tracking" and insert --eye-tracking--.

In the Claims

In Column 60, Claim 9, Line 56, delete "at least one of" and insert --in at least one of--.

Signed and Sealed this
Seventeenth Day of January, 2023

Katherine Kelly Vidal
*Director of the United States Patent and Trademark Office*